US012738071B2

(12) United States Patent
Mazumder et al.

(10) Patent No.: US 12,738,071 B2
(45) **Date of Patent: *Sep. 15, 2026**

(54) METHODS FOR CREATING TRAINING DATA FOR DETERMINING VEHICLE FOLLOWING DISTANCE

(71) Applicant: Geotab Inc., Oakville (CA)

(72) Inventors: Joy Mazumder, Etobicoke (CA); Shashank Saurav, Toronto (CA); Javed Siddique, York (CA); Mohammed Sohail Siddique, Milton, CA (US)

(73) Assignee: Geotab Inc., Oakville (CA)

( * ) Notice: Subject to any disclaimer, the term of this patent is extended or adjusted under 35 U.S.C. 154(b) by 397 days.

This patent is subject to a terminal disclaimer.

(21) Appl. No.: 18/133,752

(22) Filed: Apr. 12, 2023

(65) Prior Publication Data

US 2024/0331398 A1 Oct. 3, 2024

Related U.S. Application Data

(60) Provisional application No. 63/456,179, filed on Mar. 31, 2023.

(51) Int. Cl.
*G06V 20/58* (2022.01)
*G06T 7/73* (2017.01)

(52) U.S. Cl.
CPC ................ *G06V 20/58* (2022.01); *G06T 7/73* (2017.01); *G06T 2207/20081* (2013.01); *G06T 2207/30252* (2013.01)

(58) Field of Classification Search
CPC . G06V 20/58; G06T 7/73; G06T 2207/20081; G06T 2207/30252
(Continued)

(56) References Cited

U.S. PATENT DOCUMENTS 6,950,788 B2 9/2005 Faghri
7,505,841 B2 3/2009 Sun et al.
(Continued)

FOREIGN PATENT DOCUMENTS

CA 3008091 A1 8/2018
CN 110745140 B 1/2021
(Continued)

OTHER PUBLICATIONS

Meftah et al., "A Virtual Simulation Environment Using Deep Learning for Autonomous Vehicles Obstacle Avoidance," 2020 IEEE International Conference on Intelligence and Security Informatics (ISI), 2020, 7 Pages.
(Continued)

*Primary Examiner* — Andrew W Bee
(74) *Attorney, Agent, or Firm* — Mark J. Pringle-Rigby

(57) ABSTRACT

Systems, methods, models, and training data for models are discussed, for determining vehicle positioning, and in particular identifying tailgating. Simulated training images showing vehicles following other vehicles, under various conditions, are generated using a virtual environment. Models are trained to determine following distance between two vehicles. Trained models are used to in detection of tailgating, based on determined distance between two vehicles. Results of tailgating are output to warn a driver, or to provide a report on driver behavior.

20 Claims, 27 Drawing Sheets

(58) Field of Classification Search
USPC .......................................................... 382/104
See application file for complete search history.

(56) References Cited

U.S. PATENT DOCUMENTS

| | | | |
|---|---|---|---|
| 7,676,087 | B2 | 3/2010 | Dhua et al. |
| 9,405,970 | B2 | 8/2016 | Israel et al. |
| 9,489,635 | B1 | 11/2016 | Zhu |
| 10,395,540 | B2 | 8/2019 | Surpi et al. |
| 10,431,089 | B1 | 10/2019 | Nguyen |
| 10,496,891 | B2 | 12/2019 | Sai |
| 10,728,420 | B2 | 7/2020 | Popa |
| 10,766,489 | B2 | 9/2020 | Tuncali et al. |
| 10,818,109 | B2 | 10/2020 | Palmer et al. |
| 10,997,434 | B2 | 5/2021 | Kurian et al. |
| 11,017,244 | B2 | 5/2021 | Xue |
| 11,138,751 | B2 | 10/2021 | Guizilini et al. |
| 11,257,272 | B2 | 2/2022 | Rowell et al. |
| 11,336,867 | B2 | 5/2022 | Meier et al. |
| 11,373,411 | B1 | 6/2022 | Goh |
| 11,390,276 | B2 | 7/2022 | Yamada et al. |
| 11,521,009 | B2 | 12/2022 | Peake et al. |
| 11,544,935 | B2 | 1/2023 | Chen |
| 11,615,628 | B2 | 3/2023 | Tsurumi |
| 11,643,102 | B1 | 5/2023 | Calmer et al. |
| 11,683,579 | B1 | 6/2023 | Symons et al. |
| 11,704,910 | B2 | 7/2023 | Endo et al. |
| 11,758,096 | B2 | 9/2023 | Shah et al. |
| 11,866,055 | B1 | 1/2024 | Srinivasan et al. |
| 11,989,001 | B1 | 5/2024 | Eihattab et al. |
| 11,989,949 | B1 | 5/2024 | Mazumder et al. |
| 11,995,546 | B1 | 5/2024 | Srinivasan et al. |
| 12,125,222 | B1 | 10/2024 | Ivascu et al. |
| 12,330,821 | B2 | 6/2025 | Xu et al. |
| 12,423,864 | B2 | 9/2025 | Mazumder et al. |
| 12,586,230 | B2 | 3/2026 | Siddique et al. |
| 2005/0090983 | A1 | 4/2005 | Isaji et al. |
| 2005/0125121 | A1 | 6/2005 | Isaji et al. |
| 2005/0259033 | A1 | 11/2005 | Levine |
| 2006/0273922 | A1 | 12/2006 | Bhogal et al. |
| 2010/0110176 | A1 | 5/2010 | Aoyama |
| 2012/0119894 | A1 | 5/2012 | Pandy |
| 2012/0239268 | A1 | 9/2012 | Chen et al. |
| 2013/0057397 | A1 | 3/2013 | Cutler et al. |
| 2013/0107051 | A1 | 5/2013 | Maruoka et al. |
| 2014/0195093 | A1 | 7/2014 | Litkouhi et al. |
| 2014/0222280 | A1 | 8/2014 | Salomonsson et al. |
| 2016/0019791 | A1 | 1/2016 | Lin |
| 2016/0167514 | A1 | 6/2016 | Nishizaki et al. |
| 2016/0170487 | A1 | 6/2016 | Saisho |
| 2016/0280132 | A1 | 9/2016 | Palanimuthu |
| 2016/0343145 | A1 | 11/2016 | Israel et al. |
| 2017/0261747 | A1 | 9/2017 | Acklin |
| 2017/0305419 | A1 | 10/2017 | Liebinger Portela et al. |
| 2017/0326981 | A1 | 11/2017 | Masui et al. |
| 2017/0327037 | A1 | 11/2017 | Prakah-Asante et al. |
| 2017/0369055 | A1 | 12/2017 | Saigusa et al. |
| 2018/0001899 | A1 | 1/2018 | Shenoy et al. |
| 2019/0001977 | A1 | 1/2019 | Lin et al. |
| 2019/0232961 | A1 | 8/2019 | Baier et al. |
| 2019/0256105 | A1 | 8/2019 | Parat et al. |
| 2019/0389487 | A1 | 12/2019 | Gowda et al. |
| 2020/0020121 | A1 | 1/2020 | Rawashdeh |
| 2020/0238991 | A1 | 7/2020 | Aragon et al. |
| 2020/0342760 | A1 | 10/2020 | Vassilovski et al. |
| 2021/0224560 | A1 | 7/2021 | Kim et al. |
| 2021/0356696 | A1 | 11/2021 | Kamada et al. |
| 2021/0365696 | A1 | 11/2021 | He et al. |
| 2021/0366144 | A1 | 11/2021 | Magistri et al. |
| 2021/0370969 | A1 | 12/2021 | Hegde et al. |
| 2022/0009488 | A1 | 1/2022 | Li |
| 2022/0161798 | A1 | 5/2022 | Kienitz et al. |
| 2022/0172396 | A1 | 6/2022 | Okuma |
| 2022/0244142 | A1 | 8/2022 | Breton |
| 2022/0245955 | A1 | 8/2022 | Freeman et al. |
| 2022/0284623 | A1 | 9/2022 | Kumar et al. |
| 2022/0371534 | A1 | 11/2022 | Zheng |
| 2022/0379889 | A1 | 12/2022 | Akella et al. |
| 2023/0038842 | A1 | 2/2023 | Yu et al. |
| 2023/0077207 | A1 | 3/2023 | Hassan et al. |
| 2023/0102113 | A1 | 3/2023 | Magistri |
| 2023/0159031 | A1 | 5/2023 | Hu et al. |
| 2023/0169793 | A1 | 6/2023 | Ogino |
| 2023/0206466 | A1 | 6/2023 | Todoran et al. |
| 2023/0227058 | A1 | 7/2023 | Julian et al. |
| 2023/0273033 | A1 | 8/2023 | Kim et al. |
| 2023/0286498 | A1 | 9/2023 | Oguri et al. |
| 2023/0290002 | A1 | 9/2023 | Yang et al. |
| 2023/0382380 | A1 | 11/2023 | Herrero Zarzosa |
| 2023/0394843 | A1 | 12/2023 | Lee et al. |
| 2024/0005675 | A1 | 1/2024 | Lelowicz et al. |
| 2024/0059291 | A1 | 2/2024 | Saylor et al. |
| 2024/0174218 | A1 | 5/2024 | Kuepfer |
| 2024/0312343 | A1 | 9/2024 | Ali et al. |
| 2024/0331399 | A1 | 10/2024 | Mazumder et al. |
| 2025/0191190 | A1 | 6/2025 | Ivascu |

FOREIGN PATENT DOCUMENTS

| | | | | |
|---|---|---|---|---|
| CN | 113421298 | A | 9/2021 | |
| CN | 113591518 | A | 11/2021 | |
| CN | 115035251 | A | 9/2022 | |
| DE | 102022208020 | * | 2/2023 | ............. G08G 1/163 |
| EP | 3855409 | * | 7/2021 | ............... G08G 1/16 |
| EP | 3855409 | A1 | 7/2021 | |
| JP | H04205825 | * | 7/1992 | |
| JP | 4205825 | B2 | 1/2009 | |
| KR | 20120021445 | A | 3/2012 | |
| KR | 201200221445 | * | 4/2017 | ............ B60W 30/16 |
| KR | 20220119396 | A | 8/2022 | |
| WO | 2015134376 | A1 | 9/2015 | |
| WO | 2021253245 | A1 | 12/2021 | |

OTHER PUBLICATIONS

Tram et al ("Vehicle to Vehicle Distance Estimation Using Camera based Visible Light Communications", IEEE 2017, pp. 517-519) (Year: 2017).

Extended European Search Report for European Application No. 24165655.2, mailed Aug. 27, 2024, 134 pages.

Extended European Search Report for European Application No. 24165653.7, mailed Sep. 12, 2024, 8 pages.

Cao, et al. "A geometry-driven car-following distance estimation algorithm robust to road slopes," Transportation Research Part C: Emerging Technologies, vol. 102, 2019, pp. 274-288, Issn 0968-090X, (https://www. sciencedirect. com/science/article/pii/ S0968 (Year: 2019).

J. W. Ro, P. S. Roop and A. Malik, "A New Safety Distance Calculation for Rear-End Collision Avoidance," in IEEE Transactions on Intelligent Transportation Systems, vol. 22, No. 3, pp. 1742-1747, Mar. 2021, doi: 10.1109/ TITS.2020.2975015. (Year: 2021).

L.-C. Liu, C-Y. Fang and S.-W. Chen, "A Novel Distance Estimation Method Leading a Forward Collision Avoidance Assist System for Vehicles on Highways," in IEEE Transactions on Intelligent Transportation Systems, vol. 18, No. 4, pp. 937-949, Apr. 2017, doi: 10.1109/TITS.2016.2597299. (Year: 2017).

* cited by examiner

| Parameter | Range |
|---|---|
| Camera Height | *0.6 to 3m*<br>*+/-0.5m from top of vehicle* |
| Camera Angle | 5 degree is Yaw,<br>5 degree is pitch,<br>5 degree is roll |
| Camera Position-x direction | From 0 m |
| Camera Position-y direction | 1 m from the center of the vehicle |
| Color of the vehicle | random |
| Vehicle Model | random |
| Sun altitude | -32 to 92 degrees |
| Sun azimuth | 2 to 362 |
| Clouds | 2 to 22 |
| Rain amount | 2 to 62 |
| Wind Intensity | 2 to 122 |
| Fog intensity | 2 to 12 |
| Wetness Intensity | 2 to 52 |
| Scattering intensity | 2 to infinity |
| Rayleigh Scattering Scale | 2 to 2 |
| Mie Scattering Scale | 2 to 5 |
| Number of vehicles | **32** |
| Fog Distance | 2 to 122 |
| Fog Fall | 2 to infinity |
| Puddles amount | 2 to 122 |

Figure 18

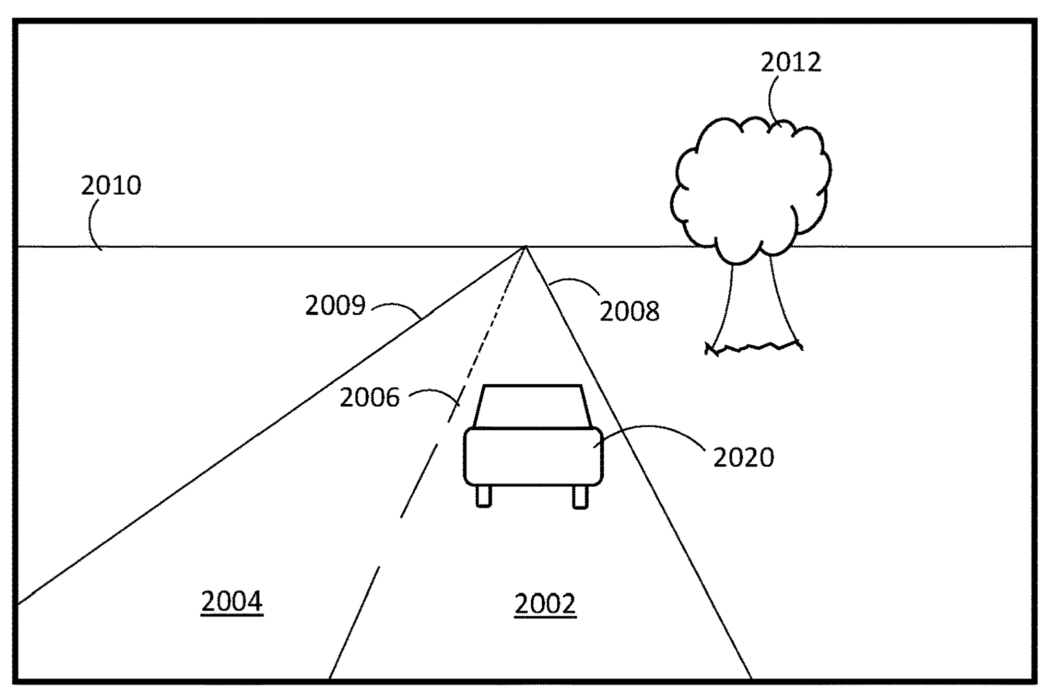
Figure 20A
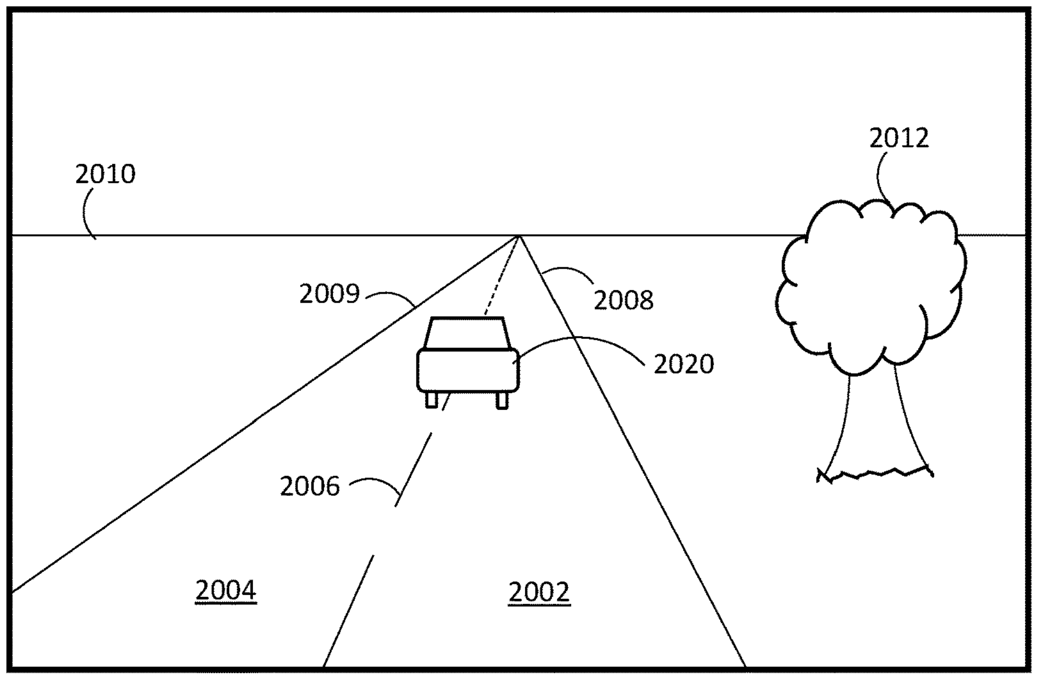
Figure 20B

METHODS FOR CREATING TRAINING DATA FOR DETERMINING VEHICLE FOLLOWING DISTANCE

PRIOR APPLICATION DATA

This application claims priority to U.S. Provisional Patent Application No. 63/456,179, titled "Systems and Methods for Detecting Vehicle Following Distance", filed on Mar. 31, 2023.

TECHNICAL FIELD

The present disclosure generally relates to systems and methods for determining vehicle positioning, and in particular relate to determining vehicle following distance.

BACKGROUND

Monitoring vehicle movement and positioning is advantageous for fleet managers for a variety of reasons, including improving the safety of their fleet. Via real time monitoring, inappropriate behavior or dangerous situations can be identified, and a driver can be immediately alerted of the dangerous situation. Reports can be prepared indicating or summarizing dangerous situations. Such alerts or reports may reduce occurrence of traffic accidents. Further, monitoring vehicle movement and positioning is also useful in self-driving (autonomous) vehicles.

SUMMARY

According to a broad aspect, the present disclosure describes a method for creating training data for training an artificial intelligence to predict a distance between two vehicles, the method comprising: for each instance in a first plurality of instances: accessing respective parameter data, the respective parameter data indicating at least a first position of a first vehicle and a second position of a virtual camera, the first position and the second position specific to the instance, the virtual camera representing a perspective from a second vehicle positioned behind the first vehicle, facing towards the first vehicle; simulating, by at least one processor in a virtual environment, the first vehicle at the first position and the virtual camera at the second position; rendering, by the at least one processor in the virtual environment, at least one image for the instance from the perspective represented by the virtual camera; and outputting the at least one image for the instance, associated with a label indicative of a distance between the first vehicle and the second vehicle; and storing, by at least one non-transitory processor-readable storage medium, a first plurality of images including each at least one image output for each instance of the plurality of instances associated with the respective label indicating distance between the first vehicle and the second vehicle for the respective instance.

The method may further comprise: for each instance in a second plurality of instances: accessing respective parameter data, the respective parameter data indicating at least a third position of a virtual camera representing a perspective from a third vehicle; simulating, by the at least one processor in the virtual environment, the virtual camera at the third position; rendering, by the at least one processor in the virtual environment, at least one image for the instance from a perspective represented by the virtual camera at the third position; and outputting the at least one image for the instance, associated with a label indicative of a distance between two vehicles which is a null value; and storing, by the at least one non-transitory processor-readable storage medium, a second plurality of images including each at least one image output for each instance of the second plurality of instances associated with the respective label indicating a distance between two vehicles which is a null value.

For each instance in the first plurality of instances: the respective parameter data may further indicate the distance between the first vehicle and the second vehicle; and the label indicative of the distance between the first vehicle and the second vehicle may indicate the distance between the first vehicle and the second vehicle as included in the respective parameter data.

The method may further comprise, for each instance in the first plurality of instances: determining, by the at least one processor, the distance between the first vehicle and the second vehicle by determining a difference between the first position and the second position.

For each instance in the first plurality of instances, accessing the respective parameter data may comprise receiving the respective parameter data as user input via a user input device.

For each instance in the first plurality of instances, accessing the respective parameter data may comprise autonomously generating, by the at least one processor, the respective parameter data. For each instance in the first plurality of instances, autonomously generating the respective parameter data may comprise: autonomously determining random values for the first position and the second position, within a defined distance threshold.

For each instance in the first plurality of instances, outputting the at least one image for the instance may comprise outputting the at least one image for the instance associated with a distance label indicative of a distance between the first vehicle and the second vehicle and associated with a vehicle presence label indicative of whether the first vehicle is within a vehicle presence threshold of the second vehicle. The method may further comprise, for each instance in the first plurality of instances: generating, by the at least one processor, the vehicle presence label indicative of whether the first vehicle is within a vehicle presence threshold of the second vehicle, based on relative positions of the first vehicle and the second vehicle.

For each instance in the first plurality of instances: the respective parameter data may further indicate a resolution for the virtual camera; and rendering, by the at least one processor in the virtual environment, at least one image for the instance from the perspective represented by the virtual camera may comprise rendering the at least one image for the instance at the resolution for the virtual camera.

For each instance in the first plurality of instances, the respective parameter data may further indicate at least one parameter selected from a group of parameters consisting of: type of the first vehicle; type of the second vehicle; dimensions of the first vehicle; dimensions of the second vehicle; properties of the first vehicle; properties of the second vehicle; position and orientation of the virtual camera relative to the second vehicle; lens attributes of the virtual camera; weather conditions; lighting conditions; time of day; and date.

The method may further comprise: selecting a subset of instances from the first plurality of instances; for each instance in the subset of instances: autonomously applying a distortion effect to the at least one image output for the instance. The distortion effect may include at least one distortion effect selected from a group of distortion effects comprising: image compression loss; pixel value distribution; adversarial effect; image noise; image saturation; and image blur.

The method may further comprise: selecting a subset of instances from the first plurality of instances; for each instance in the subset of instances: autonomously applying an environmental effect to the at least one image output for the instance. The environmental effect may include at least one environmental effect selected from a group of environmental effects comprising: rain; snow; and fog.

For each instance in the first plurality of instances, rendering, by the at least one processor in the virtual environment, at least one image for the instance from the perspective represented by the virtual camera may comprise: rendering, by the at least one processor in the virtual environment, a single image for the instance from the perspective represented by the virtual camera.

For each instance in the first plurality of instances, rendering, by the at least one processor in the virtual environment, at least one image for the instance from the perspective represented by the virtual camera may comprise: rendering, by the at least one processor in the virtual environment, a plurality of images for the instance from the perspective represented by the virtual camera, each image of the plurality of images for the instance representing a respective moment in time. For each instance in the first plurality of instances, simulating, by at least one processor in a virtual environment, the first vehicle at the first position and the virtual camera at the second position may comprise: simulating, by the at least one processor in the virtual environment, movement of the first vehicle and movement of the virtual camera over each respective moment in time represented by the plurality of images for the instance.

For each instance in the first plurality of instances, the first position of the first vehicle may indicate a longitudinal position and lateral position of the first vehicle.

For each instance in the first plurality of instances, the second position of the virtual camera may indicate a longitudinal position and a lateral position of the virtual camera within a road lane and a height of the virtual camera.

According to another broad aspect, the present disclosure describes a system for creating training data for training an artificial intelligence to predict a distance between two vehicles, the system comprising: at least one processor; at least one non-transitory processor-readable storage medium communicatively coupled to the at least one processor and storing processor-executable instructions which when executed by the at least one processor cause the system to: for each instance in a first plurality of instances: access respective parameter data, the respective parameter data indicating at least a first position of a first vehicle and a second position of a virtual camera, the first position and the second position specific to the instance, the virtual camera representing a perspective from a second vehicle positioned behind the first vehicle, facing towards the first vehicle; simulate, by the at least one processor in a virtual environment, the first vehicle at the first position and the virtual camera at the second position; render, by the at least one processor in the virtual environment, at least one image for the instance from the perspective represented by the virtual camera; and output the at least one image for the instance, associated with a label indicative of a distance between the first vehicle and the second vehicle; and store, by the at least one non-transitory processor-readable storage medium, a first plurality of images including each at least one image output for each instance of the plurality of instances associated with the respective label indicating distance between the first vehicle and the second vehicle for the respective instance.

The processor-executable instructions may further cause the system to: for each instance in a second plurality of instances: access respective parameter data, the respective parameter data indicating at least a third position of a virtual camera representing a perspective from a third vehicle; simulate, by the at least one processor in the virtual environment, the virtual camera at the third position; render, by the at least one processor in the virtual environment, at least one image for the instance from a perspective represented by the virtual camera at the third position; and output the at least one image for the instance, associated with a label indicative of a distance between two vehicles which is a null value; and store, by the at least one non-transitory processor-readable storage medium, a second plurality of images including each at least one image output for each instance of the second plurality of instances associated with the respective label indicating a distance between two vehicles which is a null value.

For each instance in the first plurality of instances: the respective parameter data may further indicate the distance between the first vehicle and the second vehicle; and the label indicative of the distance between the first vehicle and the second vehicle may indicate the distance between the first vehicle and the second vehicle as included in the respective parameter data.

The processor-executable instructions may further cause the system to, for each instance in the first plurality of instances: determine, by the at least one processor, the distance between the first vehicle and the second vehicle by determining a difference between the first position and the second position.

For each instance in the first plurality of instances, the processor-executable instructions which cause the system to access the respective parameter data may cause the system to receive the respective parameter data as user input via a user input device.

For each instance in the first plurality of instances, the processor-executable instructions which cause the system to access the respective parameter data may cause the at least one processor to autonomously generate the respective parameter data. For each instance in the first plurality of instances, the processor-executable instructions which cause the at least one processor to autonomously generate the respective parameter data cause the at least one processor to: autonomously determine random values for the first position and the second position, within a defined distance threshold.

For each instance in the first plurality of instances, the processor-executable instructions which cause the system to output the at least one image for the instance may cause the system to: output the at least one image for the instance associated with a distance label indicative of a distance between the first vehicle and the second vehicle and associated with a vehicle presence label indicative of whether the first vehicle is within a vehicle presence threshold of the second vehicle. The processor-executable instructions may further cause the system to, for each instance in the first plurality of instances: generate, by the at least one processor, the vehicle presence label indicative of whether the first vehicle is within the vehicle presence threshold of the second vehicle, based on relative positions of the first vehicle and the second vehicle.

For each instance in the first plurality of instances: the respective parameter data may further indicate a resolution for the virtual camera; and the processor-executable instructions which cause the system to render, by the at least one processor in the virtual environment, at least one image for the instance from the perspective represented by the virtual camera may cause the at least one processor to: render the at least one image for the instance at the resolution for the virtual camera.

For each instance in the first plurality of instances, the respective parameter data may further indicate at least one parameter selected from a group of parameters consisting of: type of the first vehicle; type of the second vehicle; dimensions of the first vehicle; dimensions of the second vehicle; properties of the first vehicle; properties of the second vehicle; position and orientation of the virtual camera relative to the second vehicle; lens attributes of the virtual camera; weather conditions; lighting conditions; time of day; and date.

The processor-executable instructions may further cause the at least one processor to: select a subset of instances from the first plurality of instances; for each instance in the subset of instances: autonomously apply a distortion effect to the at least one image output for the instance. The distortion effect may include at least one distortion effect selected from a group of distortion effects comprising: image compression loss; pixel value distribution; adversarial effect; image noise; image saturation; and image blur.

The processor-executable instructions may further cause the at least one processor to: select a subset of instances from the first plurality of instances; for each instance in the subset of instances: autonomously apply an environmental effect to the at least one image output for the instance. The environmental effect may include at least one environmental effect selected from a group of environmental effects comprising: rain; snow; and fog.

For each instance in the first plurality of instances, the processor-executable instructions which cause the system to render, by the at least one processor in the virtual environment, at least one image for the instance from the perspective represented by the virtual camera may cause the system to: render, by the at least one processor in the virtual environment, a single image for the instance from the perspective represented by the virtual camera.

For each instance in the first plurality of instances, the processor-executable instructions which cause the system to render, by the at least one processor in the virtual environment, at least one image for the instance from the perspective represented by the virtual camera may cause the system to: render, by the at least one processor in the virtual environment, a plurality of images for the instance from the perspective represented by the virtual camera, each image of the plurality of images for the instance representing a respective moment in time. For each instance in the first plurality of instances, the processor-executable instructions which cause the system to simulate, by the at least one processor in the virtual environment, the first vehicle at the first position and the virtual camera at the second position may cause the system to: simulate, by the at least one processor in the virtual environment, movement of the first vehicle and movement of the virtual camera over each respective moment in time represented by the plurality of images for the instance.

For each instance in the first plurality of instances, the first position of the first vehicle may indicate a longitudinal position and lateral position of the first vehicle.

For each instance in the first plurality of instances, the second position of the virtual camera may indicate a longitudinal position and a lateral position of the virtual camera within a road lane and a height of the virtual camera.

According to yet another broad aspect, the present disclosure describes a method for training a model for determining a distance between a first vehicle and second vehicle comprising: accessing image data, the image data including at least a first set of images, each image in the first set of images including a representation of a respective first vehicle from a perspective of a second respective vehicle behind the first respective vehicle, and each image in the first set of images associated with a distance label indicating a distance between the respective first vehicle and the respective second vehicle; evaluating a following distance loss function for each image in the first set of images, the following loss function including a first term representing a difference between a distance indicated in a respective distance label and a determined distance between the first vehicle and the second vehicle by the model for each respective image; and training the model by minimizing the following distance loss function over the first set of images.

Each image in the first set of images may be further associated with a vehicle presence label indicating whether the distance between the first vehicle is within a vehicle presence threshold of the second vehicle. The following distance loss function may further include a second term representing a difference between the vehicle presence label and a determined vehicle presence for each respective image.

The method may further comprise determining, for each image in the first set of images, whether the first vehicle is within a vehicle presence threshold of the second vehicle, and generating a vehicle presence label associated with each image indicating whether the first vehicle is within the vehicle presence threshold of the second vehicle. The following distance loss function may further include a second term representing a difference between the vehicle presence label and a determined vehicle presence for each respective image.

The method may further comprise determining whether auxiliary criteria are satisfied over the first set of images; and further evaluating the following distance loss function for at least one image in the first set of images, if the auxiliary criteria are not satisfied. The auxiliary criteria may require that the following distance loss function be within a maximum loss threshold for each image in the first set of images. The auxiliary criteria may require that the following distance loss function be within a maximum loss threshold for a defined quantity of images in the first set of images, where the defined quantity of images is smaller than a total quantity of images in the first set of images. The auxiliary criteria may require that the following distance loss function be evaluated for each image in the first set of images. The auxiliary criteria may require that the following distance loss function be evaluated for a defined quantity of images in the first set of images, where the defined quantity of images is smaller than a total quantity of images in the first set of images.

According to yet another broad aspect, the present disclosure describes a system for training a model for determining a distance between a first vehicle and second vehicle, the system comprising: at least one processor; at least one non-transitory processor-readable storage medium communicatively coupled to the at least one processor and storing processor-executable instructions which when executed by the at least one processor cause the system to: access image data, the image data including at least a first set of images, each image in the first set of images including a representation of a respective first vehicle from a perspective of a second respective vehicle behind the first respective vehicle, and each image in the first set of images associated with a distance label indicating a distance between the respective first vehicle and the respective second vehicle; evaluate a following distance loss function for each image in the first set of images, the following loss function including a first term representing a difference between a distance indicated in a respective distance label and a determined distance between the first vehicle and the second vehicle by the model for each respective image; and train the model by minimizing the following distance loss function over the first set of images.

Each image in the first set of images may be further associated with a vehicle presence label indicating whether the first vehicle is within the vehicle presence threshold of the second vehicle. The following distance loss function may further include a second term representing a difference between the vehicle presence label and a determined vehicle presence for each respective image.

The processor-executable instructions may further cause the system to: determine, for each image in the first set of images, whether the first vehicle is within a vehicle presence threshold of the second vehicle, and generate a vehicle presence label associated with each image indicating whether the first vehicle is within the vehicle presence threshold of the second vehicle. The following distance loss function may further include a second term representing a difference between the vehicle presence label and a determined vehicle presence for each respective image.

The processor-executable instructions may further cause the system to: determine whether auxiliary criteria are satisfied over the first set of images; and further evaluate the following distance loss function for at least one image in the first set of images, if the auxiliary criteria are not satisfied. The auxiliary criteria may require that the following distance loss function be within a maximum loss threshold for each image in the first set of images. The auxiliary criteria may require that the following distance loss function be within a maximum loss threshold for a defined quantity of images in the first set of images, where the defined quantity of images is smaller than a total quantity of images in the first set of images. The auxiliary criteria may require that the following distance loss function be evaluated for each image in the first set of images. The auxiliary criteria may require that the following distance loss function be evaluated for a defined quantity of images in the first set of images, where the defined quantity of images is smaller than a total quantity of images in the first set of images.

According to yet another broad aspect, the present disclosure describes a method for identifying tailgating between a first vehicle and second vehicle comprising: accessing image data, the image data including at least at least one image, each image in the image data including a representation of a first vehicle from a perspective of a second vehicle behind the first vehicle; applying, by at least one processor, a following distance determination model to determine a following distance between the first vehicle and the second vehicle; determining, by the at least one processor, whether the following distance is within a tailgating distance criteria; identifying, by the at least one processor, that the second vehicle is not tailgating the first vehicle if the following distance is outside of the tailgating distance criteria; and identifying, by the at least one processor, that the second vehicle is tailgating the first vehicle if tailgating criteria are met, wherein the tailgating criteria includes the following distance being within the tailgating distance criteria.

The method may further comprise: identifying, by the at least one processor, a left-distance indicating a horizontal distance of the first vehicle from a left boundary of the at least one image; identifying, by the at least one processor, a right-distance indicating a horizontal distance of the first vehicle from a right boundary of the at least one image; determining, by the at least one processor, a difference between the left-distance and the right-distance; determining, determining whether the difference between the left-distance and the right-distance is within a horizontal distance criteria, wherein the tailgating criteria includes the difference between the left-distance and the right-distance being within the horizontal distance criteria; and identifying, by the at least one processor, that the second vehicle is not tailgating the first vehicle if the determined difference is outside of the horizontal distance criteria.

Identifying the left-distance may comprise identifying, by the at least one processor, a horizontal distance between a left edge of a bounding box delineating the first vehicle in the at least one image and a left edge of the at least one image; and identifying the right-distance may comprise identifying, by the at least one processor, a horizontal distance between a right edge of a bounding box delineating the first vehicle in the at least one image and a right edge of the at least one image.

Accessing the image data may comprise capturing, by at least one image capture device, the image data.

Accessing the image data may comprise receiving, by at least one communication interface communicatively coupled to the at least one processor, the image data.

Accessing the image data may comprise accessing the image data as stored in at least one non-transitory processor-readable storage medium.

Determining whether the following distance is within the tailgating distance criteria may comprise: determining a first stopping distance for the first vehicle; determining a second stopping distance for the second vehicle; determining that the following distance is within the tailgating distance criteria if the second stopping distance is greater than the first stopping distance plus the following distance; and determining that the following distance is not within the tailgating distance criteria if the second stopping distance is not greater than the first stopping distance plus the following distance. Determining the first stopping distance may comprise estimating the first stopping distance as a minimum distance for the first vehicle to stop; and determining the second stopping distance may comprise estimating the second stopping distance as a maximum distance for the second vehicle to stop.

Determining whether the determined following distance is within the tailgating distance criteria may comprise determining whether the following distance is within a tailgating distance threshold. The tailgating distance threshold may represent a safe following distance limit as a function of speed of the second vehicle.

According to yet another broad aspect, the present disclosure describes a system for identifying tailgating between a first vehicle and second vehicle, the system comprising: at least one processor; at least one non-transitory processor-readable storage medium communicatively coupled to the at least one processor and storing processor-executable instructions which when executed by the at least one processor cause the system to: access image data, the image data including at least at least one image, each image in the image data including a representation of a first vehicle from a perspective of a second vehicle behind the first vehicle; apply, by the at least one processor, a following distance determination model to determine a following distance between the first vehicle and the second vehicle; determine, by the at least one processor, whether the following distance is within a tailgating distance criteria; identify, by the at least one processor, that the second vehicle is not tailgating the first vehicle if the following distance is outside of the tailgating distance criteria; and identify, by the at least one processor, that the second vehicle is tailgating the first vehicle if tailgating criteria are met, wherein the tailgating criteria includes the following distance being within the tailgating distance criteria.

The processor-executable instructions may further cause the system to: identify, by the at least one processor, a left-distance indicating a horizontal distance of the first vehicle from a left boundary of the at least one image; identify, by the at least one processor, a right-distance indicating a horizontal distance of the first vehicle from a right boundary of the at least one image; determine, by the at least one processor, a difference between the left-distance and the right-distance; determine, by the at least one processor, whether the difference between the left-distance and the right-distance is within a horizontal distance criteria, wherein the tailgating criteria includes the difference between the left-distance and the right-distance being within the horizontal distance criteria; and identify, by the at least one processor, that the second vehicle is not tailgating the first vehicle if the determined difference is outside of the horizontal distance criteria.

The processor-executable instructions which cause the system to identify the left-distance may cause the at least one processor to: identify a horizontal distance between a left edge of a bounding box delineating the first vehicle in the at least one image and a left edge of the at least one image; and the processor-executable instructions which cause the system to identify the right-distance cause the at least one processor to: identify a horizontal distance between a right edge of a bounding box delineating the first vehicle in the at least one image and a right edge of the at least one image.

The processor-executable instructions which cause the system to access the image data may cause at least one image capture device of the system to capture the image data.

The processor-executable instructions which cause the system to access the image data may cause the system to receive, by at least one communication interface of the system communicatively coupled to the at least one processor, the image data.

The processor-executable instructions which cause the system to access the image data may cause the system to access the image data as stored in the at least one non-transitory processor-readable storage medium.

The processor-executable instructions which cause the system to determine whether the following distance is within the tailgating distance criteria may cause the at least one processor to: determine a first stopping distance for the first vehicle; determine a second stopping distance for the second vehicle; determine that the following distance is within the tailgating distance criteria if the second stopping distance is greater than the first stopping distance plus the following distance; and determine that the following distance is not within the tailgating distance criteria if the second stopping distance is not greater than the first stopping distance plus the following distance. The processor-executable instructions which cause the at least one processor to determine the first stopping distance may cause the at least one processor to estimate the first stopping distance as a minimum distance for the first vehicle to stop; and the processor-executable instructions which cause the at least one processor to determine the second stopping distance may cause the at least one processor to estimate the second stopping distance as a maximum distance for the second vehicle to stop.

The processor-executable instructions which cause the system to determine whether the following distance is within the tailgating distance criteria may cause the at least one processor to: determine whether the following distance is within a tailgating distance threshold. The tailgating distance threshold may represent a safe following distance limit as a function of speed of the second vehicle.

BRIEF DESCRIPTION OF THE DRAWINGS

Exemplary non-limiting embodiments are described with reference to the accompanying drawings in which:

FIG. 18 is a table showing a list of parameter ranges, for automated generation of images.

FIGS. 20A, 20B, and 20C illustrate a sequence of image data representing moments in time, in accordance with at least one exemplary implementation.

FIG. 26 illustrates an alert via a user interface, in accordance with at least one exemplary implementation.

DETAILED DESCRIPTION

Figure 1A:
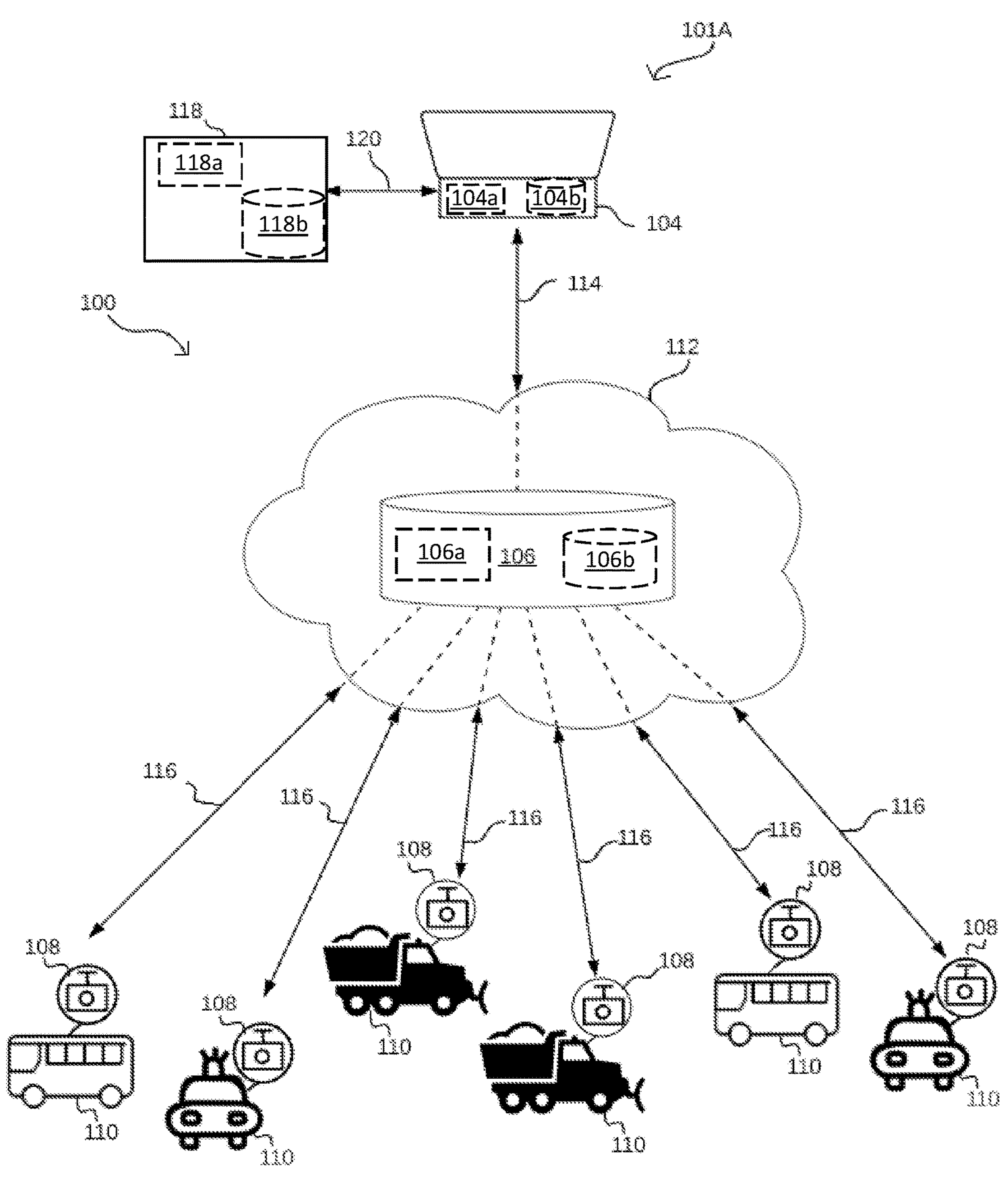
FIG. 1A illustrates a block diagram of an exemplary mobile image system.

The present disclosure details systems and methods for creating training data, for training machine learning models, and for applying machine learning models, for identifying vehicle movement and positioning. The present disclosure sees particular value in detecting travel lane of vehicles, determining distance between vehicles, and identifying when a vehicle is tailgating another vehicle.

Throughout this disclosure, a "following" situation refers to a situation where a "following vehicle" is travelling behind a "lead vehicle", in the same direction as the lead vehicle. In this context, "following" does not necessarily mean that the following vehicle is actively pursuing the lead vehicle (e.g. to the destination of the lead vehicle), but rather that the following vehicle is travelling behind the lead vehicle, for at least a moment in time. Lead vehicles and following vehicles are commonly referred to as first and second vehicles throughout this disclosure.

"Tailgating" generally refers to a situation involving two vehicles travelling in the same direction, where one vehicle is following the other vehicle at an unsafe distance (e.g. too close for the following vehicle to reliably safely stop if needed). In particular, if a following vehicle is tailgating a lead vehicle, sudden braking of the lead vehicle may result in an accident where the following vehicle hits the lead vehicle from behind. For instance, delayed reaction time of the driver of the following vehicle may prevent the following vehicle from decelerating at a sufficient rate so as to avoid rear-ending the lead vehicle. However, if the driver of the following vehicle was alerted of this dangerous circumstance, an accident may be avoided, by causing the driver of the following vehicle to alter operation of the following vehicle to increase the following distance from the lead vehicle.

Models (e.g. artificial intelligence and/or machine learning models) for identifying vehicle positioning and movement, based on data captured by one or more image capture devices (e.g. video cameras or smart video cameras) are disclosed herein. Generally, a machine learning model is trained based on a set of training data, after which the model becomes able to analyze input data and reliably detect features or make determinations based on the input data. In some implementations, a trained model is deployed to an image capture device or a proximate device communicatively coupled to the image capture device, and captured image data is analyzed by the trained model. Such implementations are optimal for alerting the driver to dangerous situations, as analysis can be performed quickly without the need for communication with a remote server. In alternative implementations, captured image data is analyzed in accordance with the trained model remote from the image capture device (e.g. at a central server or processing station). Such implementations are useful for identifying dangerous situations after-the-fact, such as for driver evaluation or collision reconstruction. However, such implementations could also be used to alert the driver to dangerous situations as they happen, albeit after communication of image data to the central server, followed by a message from the server to a device at the vehicle to output an alert to the driver. In yet other implementations, captured image data can be analyzed at an image capture device or a proximate device communicatively coupled to the image capture device, and results can be sent to a remote device (e.g. a central server or processing station), such as for driver evaluation or collision reconstruction. In yet other implementations, captured image data can be analyzed at an image capture device or a proximate device communicatively coupled to the image capture device, for immediate driver feedback, and captured image data can be analyzed at a remote device such as for driver evaluation or collision reconstruction.

Figure 1B:
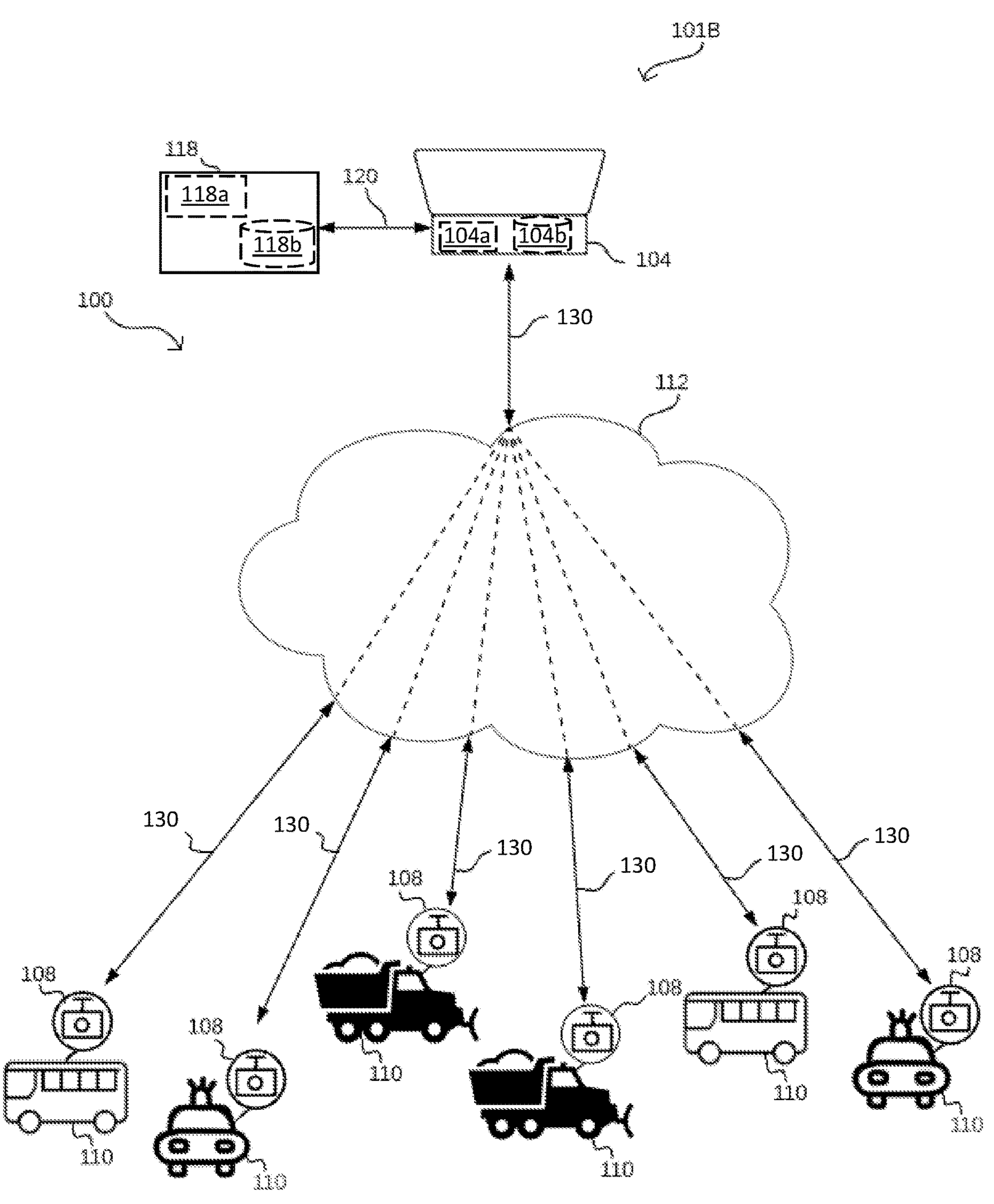
FIG. 1B illustrates a block diagram of another exemplary mobile image system.

FIG. 1A and FIG. 1B illustrate block diagrams of exemplary mobile image systems 101A and 101B, respectively, and exemplary communication network 100 through which mobile image systems 101A and 101B operate. In many of the implementations discussed herein, communication network 100 is optional. That is, in some implementations identification of vehicle positioning and movement can be performed entirely at a device local to a vehicle. Models executed at the device local to the vehicle can be distributed physically (e.g. by connecting the device to another device to transfer the model, or by using a portable storage medium to transfer the model), thus obviating the need for communication network 100. Alternatively, communication network 100 can be used to distribute models to vehicle devices (e.g. by sending models to vehicle devices for download).

Communication network 100 may include one or more computing systems and may be any suitable combination of networks or portions thereof to facilitate communication between network components. Some examples of networks include, Wide Area Networks (WANs), Local Area Networks (LANs), Wireless Wide Area Networks (WWANs), data networks, cellular networks, voice networks, among other networks, which may be wired and/or wireless. Communication network 100 may operate according to one or more communication protocols, such as, General Packet Radio Service (GPRS), Universal Mobile Telecommunications Service (UMTS), GSM®, Enhanced Data Rates for GSM Evolution (EDGE), LTE™, CDMA, LPWAN, Wi-Fi®, Bluetooth®, Ethernet, HTTP/S, TCP, and CoAP/DTLS, or other suitable protocol. Communication network 100 may take other forms as well.

Mobile image system 101A includes a plurality of image capture devices 108, which can comprise (and be referred to herein) as smart video cameras (SVCs), though are not strictly limited as such. The plurality of image capture devices 108 are positioned at (e.g. mounted in/on, or placed within or on) a plurality of vehicles 110. Image capture system 101A also includes cloud server 106, client device 104 and local server 118. Client device 104 is communicatively coupled to local server 118 via communication link 120. Client device 104 is also shown as including at least one processor 104*a* and at least one non-transitory processor-readable storage medium 104*b*. The at least one processor 104*a* can perform acts such as determinations, identification, data analysis, processing, and other appropriate acts, such as acts in the methods described herein. The at least one non-transitory processor-readable storage medium 104*b* can store any appropriate data, including processor-executable instructions which when executed by the at least one processor 104*a* cause the client device 104 to perform acts, such as acts of the methods described herein. An exemplary client device may include a personal computer, server, a system, a combination of subsystems, and devices. Specific and non-limiting examples of an image capture device or smart video camera include a Netradyne® video camera and a Nauto® video camera. Reference to a "camera" in this disclosure can include a smart video camera, but may also include a more basic camera. In this regard, the term "camera" can be used interchangeably with "image capture device". Each image capture device 108 is communicatively coupled to cloud server 106 in cloud 112 via a respective communication link 116. For example, each image capture device 108 and the cloud server 106 are configured to wirelessly communicate to each other. Cloud server 106 is also shown as including at least one processor 106*a* and at least one non-transitory processor-readable storage medium 106*b*. The at least one processor 106*a* can perform acts such as determinations, identification, data analysis, processing, and other appropriate acts, such as acts in the methods described herein. The at least one non-transitory processor-readable storage medium 106*b* can store any appropriate data, including processor-executable instructions which when executed by the at least one processor 106*a* cause the cloud server 106 to perform acts, such as acts of the methods described herein. Cloud server 106 is communicatively coupled to client device 104 via communication link 114. For example, each cloud server 106 and client device 104 are configured to wirelessly communicate to each other. As another example, cloud server 106 and client device 104 are configured to communicate with each over a wired connection. In some implementations, local server 118 may be a remote server from client device 104. Local server 118 is also shown as including at least one processor 118*a* and at least one non-transitory processor-readable storage medium 118*b*. The at least one processor 118*a* can perform acts such as determinations, identification, data analysis, processing, and other appropriate acts, such as acts in the methods described herein. The at least one non-transitory processor-readable storage medium 118*b* can store any appropriate data, including processor-executable instructions which when executed by the at least one processor 118*a* cause the local server 118 to perform acts, such as acts of the methods described herein.

Mobile image system 101B in FIG. 1B includes a plurality of image capture devices 108, positioned at a plurality of vehicles 110, similar to in FIG. 1A. Image system 101B also includes client device 104 and local server 118, similar to in FIG. 1A. In the example of FIG. 1B, client device 104 is communicatively coupled to local server 118 via communication link 120. An exemplary client device may include a personal computer, server, a system, a combination of systems subsystems, and devices. Specific and non-limiting examples of an image capture device include a Netradyne® video camera and a Nauto® video camera. Each image capture device 108 is communicatively coupled to client device 104 via a respective communication link 130. For example, each image capture device 108 is configured to wirelessly communicate with client device 104. In some implementations, local server 118 may be a remote server from client device 104. The description of components in mobile image system 101A in FIG. 1A is applicable to similarly labelled components in mobile surveillance system 101B in FIG. 1B.

Specific and non-limiting examples of vehicle types which each of vehicles 110 can be include: a government owned and operated vehicle, (e.g., as a vehicle for snow clearing, infrastructure maintenance, police enforcement), a public transportation vehicle, (e.g., bus, train), and a privately owned vehicle, (e.g., taxi, courier vehicle), among others.

An image capture device 108 may be mounted to or positioned at a vehicle 110 in a manner such that image capture device 108 captures image data of the environment outside the vehicle 110, e.g., towards the windshield, towards a window, atop the vehicle, etc. Additionally, and/or optionally, an image capture device 108 may be mounted to or positioned at a vehicle 110 in a manner such that the image capture device 108 captures image data of the interior of the vehicle. Interior-facing image capture devices 108 may be useful for detecting an event including detecting a person(s) of interest.

Alternatively, and/or optionally, mobile image systems 101A, 101B further include one or more image capture devices 108 coupled to a person and/or object wherein the object is not a vehicle. For example, an image capture device 108 can be coupled to a person, e.g., a helmet of a motorcycle driver.

Figure 2A:
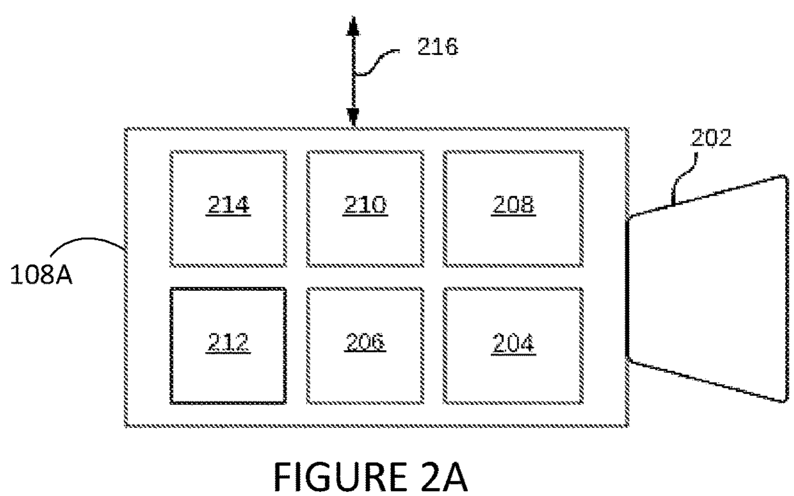
FIG. 2A is a simplified block diagram of an image capture device according to at least one exemplary implementation.

Now referring to FIG. 2A, shown is a simplified block diagram of exemplary image capture device 108A according to one implementation (as a smart video camera). Image capture device 108A as shown in FIG. 2A can be implemented as any of the image capture devices 108 shown in FIGS. 1A and 1B. Image capture device 108A includes lens 202, optoelectronics 204, at least one processor 206, location module 208 (e.g., including a GPS receiver), wireless communication module 210 (e.g., including a 4G or 5G communication module for providing cellular connectivity) and at least one non-transitory processor-readable storage medium 212. Optionally, the at least one non-transitory processor-readable storage medium 212 includes another non-transitory processor-readable storage medium 214 (or includes any appropriate number of additional non-transitory processor-readable storage mediums). In the context of this disclosure, the term "datastore" refers to a non-transitory processor-readable storage medium. In some implementations, a single non-transitory processor-readable storage medium corresponds to a single datastore. In other implementations, a non-transitory processor-readable storage medium can be virtually partitioned to include a plurality of "datastores". Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B).

Figure 2B:
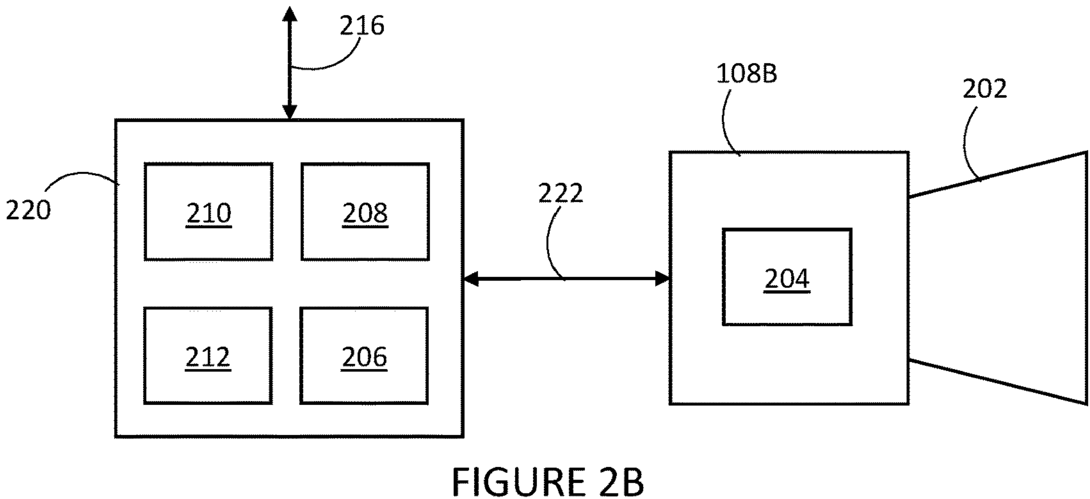
FIG. 2B is a simplified block diagram of an image capture device according to at least one other exemplary implementation.

Now referring to FIG. 2B, shown is a simplified block diagram of exemplary image capture device 108B according to one implementation (as a camera which is coupled to a peripheral device, such as a vehicle device). FIG. 2B includes many components with the same reference number as components discussed with reference to FIG. 2A. The description of such components in FIG. 2A is applicable to the similarly numbered components in FIG. 2B. In FIG. 2B, image capture device 108B includes lens 202 and optoelectronics 204. In this implementation, image capture device 108B is itself directed to capturing image data, which is in turn provided to a peripheral device 220 via a communication interface 222 (e.g. a wired or wireless communication interface). In some implementations, peripheral device 220 is vehicle device, such as a telematics monitoring device positioned at a vehicle. In other implementations, peripheral device 220 comprises a collection of components integrated into a vehicle which communicate with each other (e.g. OEM integrated electronics). In FIG. 2B, peripheral device 220 is shown as including the at least one processor 206, the location module 208, the wireless communication module 210, and the at least one non-transitory processor-readable storage medium 212, similar to the components included in image capture device 108A in FIG. 2A. While not illustrated in FIG. 2B to reduce clutter, the at least one non-transitory processor-readable storage medium 212 optionally includes any appropriate number of additional non-transitory processor-readable storage mediums. Wireless communication module 210 is operable to communicate (shown as communication interface 216) with other devices (e.g. cloud device 106 or client device 104 discussed with reference to FIGS. 1A and 1B) over a communication network (e.g. cloud 112 discussed with reference to FIGS. 1A and 1B).

Collectively, reference to an image capture device 108 or a plurality of image capture devices 108 can include image capture device 108A in FIG. 2A or image capture device 108B in FIG. 2B. Further, reference to an image capture device performing acts (such as in the methods discussed herein) can also refer to the peripheral device 220 performing such acts. For example, reference to an image capture device performing processing, determination, identification, storing of data, transmission, or similar acts can refer to an image capture device and peripheral device in combination performing these acts.

Figure 3:
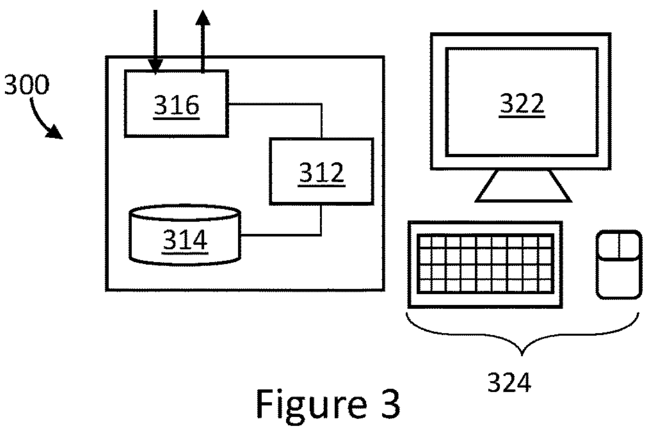
FIG. 3 is a schematic view of an operator device in accordance with at least one exemplary implementation.

FIG. 3 is a schematic view of an operator device 300, which could be used for model management and use in any of the implementations discussed herein, and in particular is useful as a server-side device. For example, device 300 could be used as client device 104 in FIGS. 1A and 1B, or as a user interface device to provide input to these devices. Device 300 as illustrated includes at least one processor 312, at least one non-transitory processor-readable storage medium 314, and a communication interface 316. The non-transitory processor-readable storage medium 314 can have processor-readable instructions stored thereon which, when executed by the at least one processor 312 cause the device 300 to perform appropriate operations for the methods described herein. Communication interface 316 can be a wired or wireless interface, through which data and inputs can be provided to device 300, and through which data and outputs can be provided by device 300. For example, location data for a plurality of vehicles can be received from a telematics device or system by communication interface 316, for processing and analysis by the at least one processor 312. Resulting analysis can also be output by communication interface 316.

FIG. 3 also illustrates exemplary input and output devices through which a user or operator can interact with device 300. In particular, FIG. 3 shows a display 322, which can display outputs from device 300. Other output devices could be provided such as speakers, or any other appropriate output device. FIG. 3 also shows a keyboard and mouse 324, which can be used to provide inputs to the device 300. Other input devices could also be used, such as a touchscreen, microphone, trackpad, or any other appropriate input device. Although the input and output devices illustrated in FIG. 3 appear in the form of those used with a desktop computer, other forms of devices could also be used, such as portable devices like a laptop, smartphone, PDA, tablet, or any other appropriate device. Further, a device to which a user provides input and receives output can be remote from the device 300. For example, the device including the at least one processor 312, the at least one non-transitory processor-readable storage medium 314, and the communication interface 316 can be a server, which is remote from a workstation or device with which the user interacts.

Figure 4:
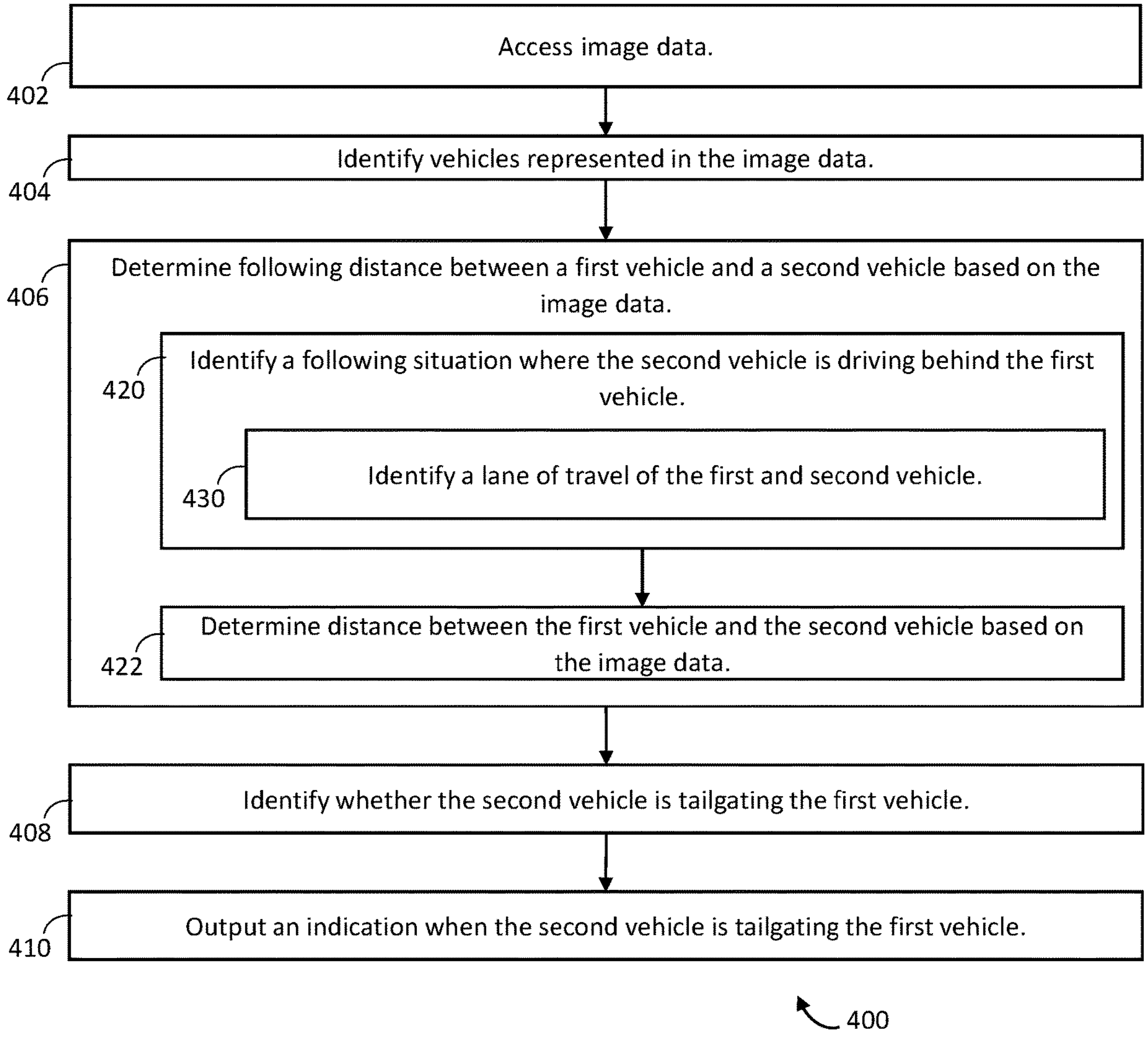
FIG. 4 is a flowchart diagram which illustrates a method for identifying and reporting a tailgating situation in accordance with at least one exemplary implementation.

FIG. 4 is a flowchart diagram which illustrates an exemplary method 400 for identifying and reporting a tailgating situation. Method 400 as illustrated includes acts 402, 404, 406 (including sub-acts 420, 422, and 430), 408, and 410. One skilled in the art will appreciate that additional acts could be added, acts could be removed, or acts could be reordered as appropriate for a given application. With reference to the examples illustrated in FIGS. 1A, 1B, 2A, 2B, and 3, acts can be performed by appropriate components of the discussed systems or devices. For example, method 400 can be performed at an image capture device such as image capture device 108A discussed with reference to FIG. 2A, and/or a peripheral device such as peripheral device 220 discussed with reference to FIG. 2B. As another example, method 400 can be performed at a device remote from a vehicle, such as client device 104 and/or local server 118 discussed with reference to FIGS. 1A and 1B, and/or cloud device 106 discussed with reference to FIG. 1A.

Reference to "at least one processor" or "a processor" performing acts of any of the methods herein can refer to any appropriate processor. Further, at least one non-transitory processor-readable storage medium can store processor-executable instructions, which when executed by a respective at least one processor cause the corresponding system or device to perform a given act of any of the methods discussed herein.

At 402, image data is accessed. The image data is captured by an image capture device (such as image capture device 108A or 108B discussed with reference to FIGS. 2A and 2B), and stored by an appropriate non-transitory processor-readable storage medium (e.g. medium 212 in FIGS. 2A and 2B). In some implementations the image data is transferred from the image capture device to another device (such as from any of image capture device 108 in FIGS. 1A and 1B, to cloud device 106, client device 104, or local server 118, via communication interfaces 114, 116, 120, or 130) as appropriate. The image data is stored by a corresponding non-transitory processor-readable storage medium (e.g. any of mediums 104*b*, 118*b*, or 106*b*, as appropriate), and accessed in accordance with act 402 when method 400 is carried out.

At 404, at least one processor (e.g. processor 206, 104*a*, 118*a*, 106*a*, or 312 as appropriate) analyzes the image data to identify vehicles represented in the vehicle data (if any). For example, the at least one processor can run an object detection model (such as a vehicle detection model) trained to detect vehicles in image data. The YOLO models are exemplary models which are effective in this task.

At 406, a following distance is determined between two vehicles based on the image data. In particular, a following distance is determined between a first vehicle (a lead vehicle) and a second vehicle (a following vehicle) where the image capture device is positioned. The perspective of the image data thus represents a perspective from the second vehicle. Act 406 in method 400 is shown as including sub-acts 420 and 422. Sub-acts 420 and 422 show one exemplary implementation for determining following distance between the two vehicles, and could be replaced by any other appropriate means for determining following distance.

At 420, a following situation is identified where the second vehicle is driving behind the first vehicle. In some implementations, this entails determining a lane of travel of the first vehicle and of the second vehicle, as shown in sub act 430. If the determined lane of travel of the first vehicle is the same as the determined lane of travel of the second vehicle, the first and second vehicle are identified as travelling in the same lane. Alternatively, in some implementations, lanes do not need to be explicitly determined, nor does lane of travel of each vehicle need to be explicitly identified. Instead, a determination is made regarding whether the first vehicle and the second vehicle are travelling in a manner which indicates that the second vehicle is travelling behind the first vehicle. Such implementations are discussed later with reference to FIGS. 24A, 24B, 24C, 25A, and 25B.

At 422, a distance is determined between the first vehicle and the second vehicle. Throughout this disclosure, means for determining distance between two vehicles are discussed. For example, FIG. 21 describes a method for training a machine learning model to estimate distance between two vehicles based on image data. Further, FIGS. 5, 6, 7, 8, 9, 10A, 10B, 11A, 11B, 12A, 12B, 13A, 13B, 14A, 14B, 15A, 15B, 16A, 16B, 16C, 16D, 17A, 17B, 18, 19, 20A, 20B, and 20C pertain to generation of training image data, for use in training such a machine learning model.

At 408, a determination is made as to whether the second vehicle is tailgating the first vehicle. Generally, this entails determining whether the distance between the first vehicle and the second vehicle determined at 422 is within tailgating criteria. Such tailgating criteria can be static or dynamic, and is discussed in more detail later with reference to FIG. 23.

At 410, an indication is output when the second vehicle is tailgating the first vehicle. For example, an alert can be output by a device in the second vehicle, informing the driver of the tailgating situation to encourage the driver to increase following distance. As another example, a notification could be triggered at a management device (e.g. client device 104), or sent to the management device from an in-vehicle device, indicating the tailgating situation, for a fleet manager to take corrective action such as enforcing driver training. Such a notification could optionally include any of a timestamp, geographic position data of the vehicle for the tailgating event, speed or acceleration data for the vehicle for the tailgating event, image data for the tailgating event, or any other appropriate data.

To generate a predictive model which determines distance between vehicles based on image data, training image data is generated. Such predictive models are trained based on the generated training data. This disclosure describes generation of simulated training data (in the form of computer-rendered image data). Image data representing real-world tailgating situations, as captured by real-world image capture devices, would be good training data; however, such real-world image data is dangerous to collect. In particular, vehicles would need to engage in tailgating in order to capture image data representing tailgating, and thus said vehicles would need to engage in dangerous situations which the present disclosure aims to avoid. Generating simulated training data avoids such dangerous situations, while still providing reasonably accurate data for training predictive models.

Figure 5:
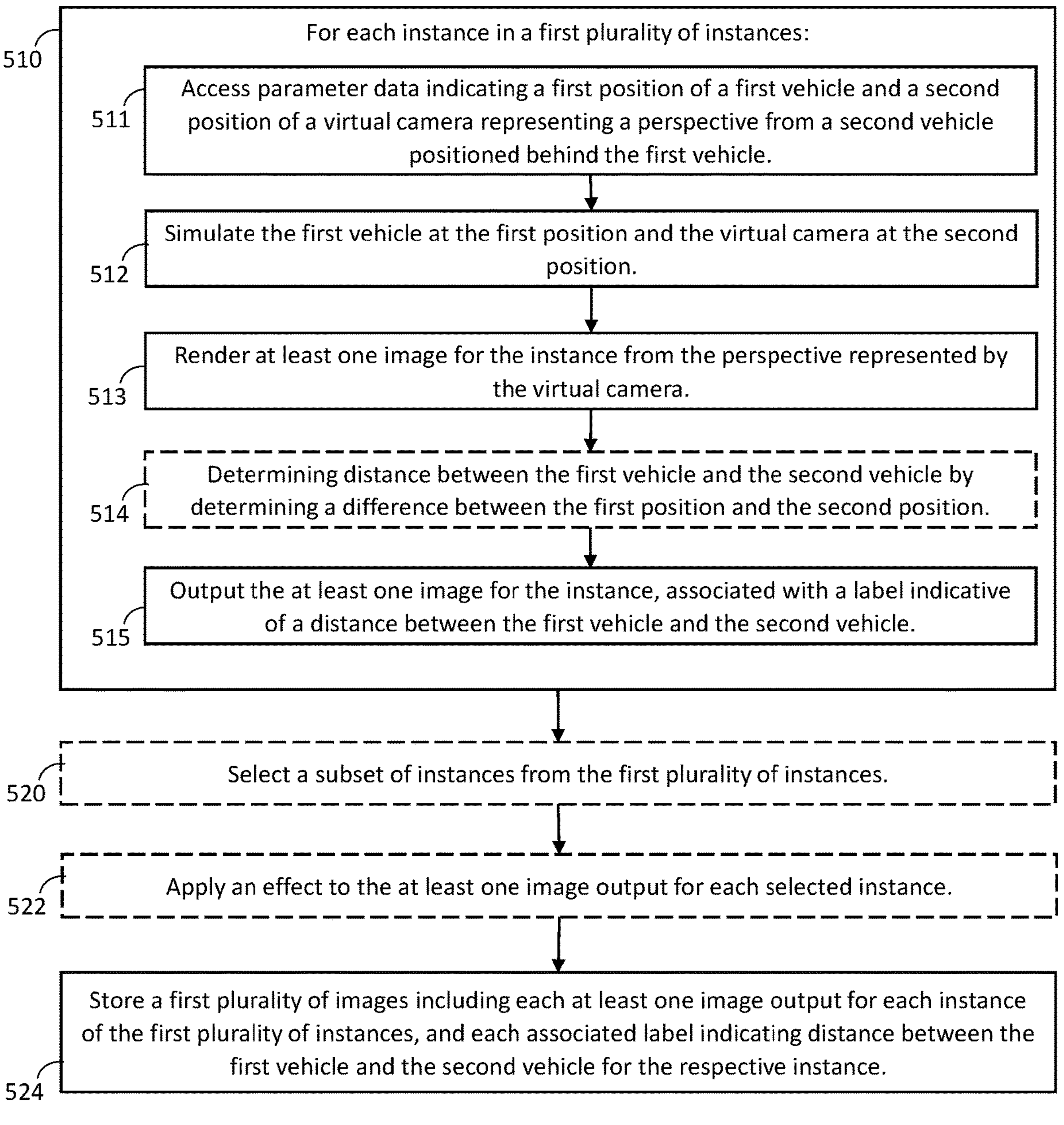
FIG. 5 is a flowchart diagram which illustrates a method for generating simulated training data in accordance with at least one exemplary implementation.

FIG. 5 is a flowchart diagram which illustrates an exemplary method 500 for generating simulated training data in line with the above. Method 500 as illustrated includes acts 510 (including sub-acts 511, 512, 513, 514, and 515), 520, 522, and 524. One skilled in the art will appreciate that additional acts could be added, acts could be removed, or acts could be reordered as appropriate for a given application. Acts of method 500 can be performed by appropriate components of the systems or devices discussed earlier. For example, method 500 can be performed at a device remote from a vehicle, such as client device 104 or local server 118 discussed with reference to FIGS. 1A and 1B, and/or cloud device 106 discussed with reference to FIG. 1A. As another example, method 500 can be performed at a device separate from systems 101A or 101B; for example, device 300 in FIG. 3 could be used to generate simulated training data in accordance with method 500 (even where device 300 is separate from systems 101A and 101B). Such training data could then provided to systems 101A or 101B for training of a predictive model. Alternatively, the predictive model can be trained separately from systems 101A and 101B, with the resulting predictive model being provided to systems 101A and 101B for use.

Reference to "at least one processor" or "a processor" performing acts of any of the methods herein can refer to any appropriate processor. Further, at least one non-transitory processor-readable storage medium can store processor-executable instructions, which when executed by a respective at least one processor cause the corresponding system or device to perform a given act of any of the methods discussed herein.

In method 500, a plurality of instances are simulated where a first vehicle has a respective first position, and a second vehicle is simulated as following the first vehicle. In 510, a number of sub-acts (illustrated as sub-acts 511, 512, 513, 514, and 515) are performed for each instance in a plurality of instances.

At 511, parameter data indicating the first position of the first vehicle, and the second position of a virtual camera representing a perspective from a second vehicle positioned behind the first vehicle is received. The first position and the second position are specific to the instance, such that each instance represents a specific scenario (within the overall context of the dataset) where the first vehicle is being followed by the second vehicle at a specific distance, and each instance is generally different from other instances. Differences between instances can include differences in the following distance between the first vehicle and the second vehicle (due to differences between the first position and the second position for the instance). However, following distance between the first vehicle and the second vehicle is not necessarily unique to the instance in the data set. In particular, the first position and the second position represent positions in space within a virtual environment. Even if the first position and the second position for different instances are the same distance apart (same following distance), respective first positions and second positions can be at different locations within the virtual environment. As a result, a perspective represented by the virtual camera for an instance will be different from other instances, even if following distance is the same.

Positions of vehicles (or cameras in vehicles), such as the first position, second position, and the third position discussed later with reference to FIGS. 8, 9, 10A, and 10B, or any other vehicle position discussed herein, generally refer to a longitudinal position and a lateral position of the vehicle (or camera). Longitudinal and lateral positions do not necessarily need to match global positioning standards, but rather indicate position of the vehicle in different directions, so that the relative positioning between vehicles can be specified. This is particularly pertinent to virtual environments, where a standardized global positioning does not necessarily exist (since the entire world is likely not simulated in the virtual environment). A position of a camera may also specify a height of the camera. Such a height may be specified for example relative to a road surface from which the camera is positioned. Alternatively, such a height may be specified relative to an average, standard, or baseline height where a camera is expected to be positioned or is commonly positioned. As discussed later with reference to FIGS. 11A, 11B, 12A, 12B, 13A, 13B, 14A, and 14B, camera position within a vehicle can have an impact on images captured by said camera, and thus can be important to simulate and/or model.

Figure 6:
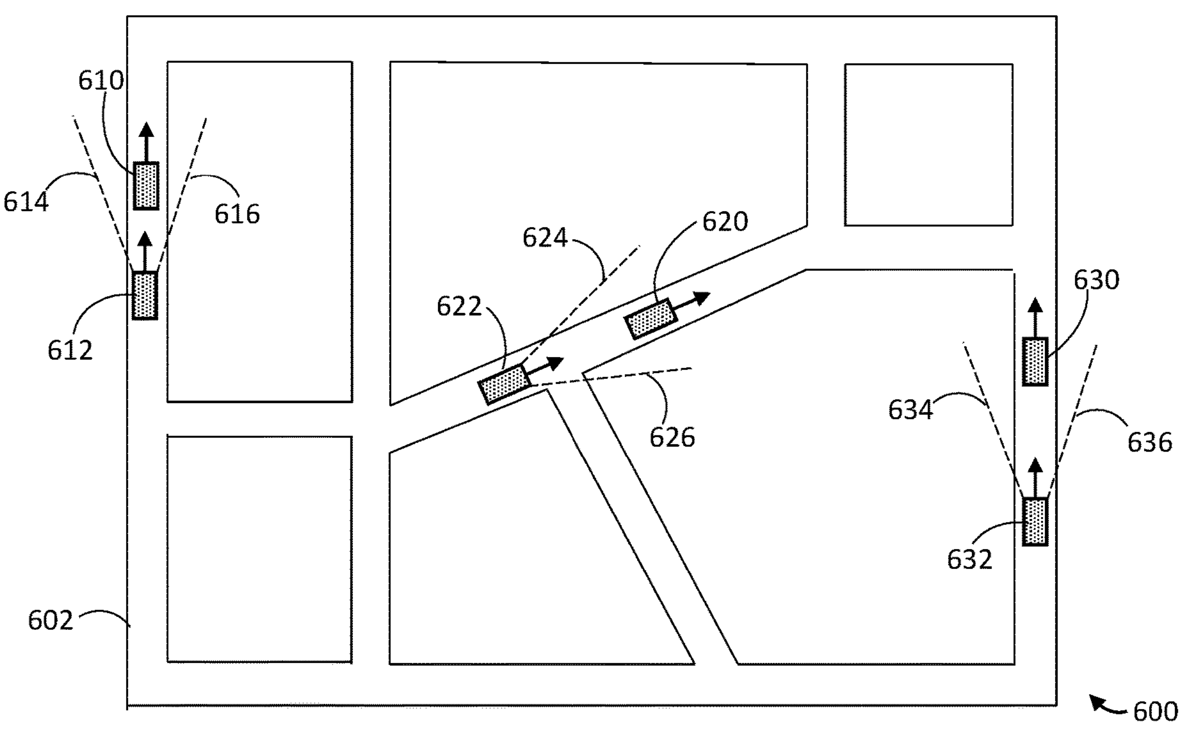
FIG. 6 is a top view of a virtual environment, in accordance with at least one exemplary implementation.

At 512, for each instance, the first vehicle at the first position, and the virtual camera at the second position, are simulated in a virtual environment. An example of this is illustrated in FIG. 6, which is a top view of a virtual environment 600, including roadways 602. In environment 600 as shown in FIG. 6, three instances are simulated. In a first instance, a first vehicle 610 is simulated as being followed by a second vehicle 612. A virtual camera is simulated at the position of the second vehicle 612, as shown by field of view lines 614 and 616. In a second instance, a first vehicle 620 is simulated as being followed by a second vehicle 622. A virtual camera is simulated at the position of the second vehicle 622, as shown by field of view lines 624 and 626. In a third instance, a first vehicle 630 is simulated as being followed by a second vehicle 632. A virtual camera is simulated at the position of the second vehicle 632, as shown by field of view lines 634 and 636.

For the first instance, the first position of vehicle 610 and the second position of the virtual camera of the second vehicle 612 are such that the second vehicle 612 is following the first vehicle 610 at a close distance. For the second instance, the first position of vehicle 620 and the second position of the virtual camera of the second vehicle 622 are such that the second vehicle 622 is following the first vehicle 620 at a distance which is greater than the following distance in the first instance. For the third instance, the first position of vehicle 630 and the second position of the virtual camera of the second vehicle 632 are such that the second vehicle 632 is following the first vehicle 630 at a distance which is equal to the following distance in the second instance. However, because the respective second position for the second instance and the third instance is different, a perspective of the virtual camera for the second instance is different from a perspective of the virtual camera for the third instance. Consequently, image data generated for the second instance is different from image data generated for the third instance.

Although FIG. 6 illustrates three simulated instances, one skilled in the art will appreciate that many more instances can be simulated in practice, to generate a large library of simulated instances and consequently a large library of training image data.

Figure 7:
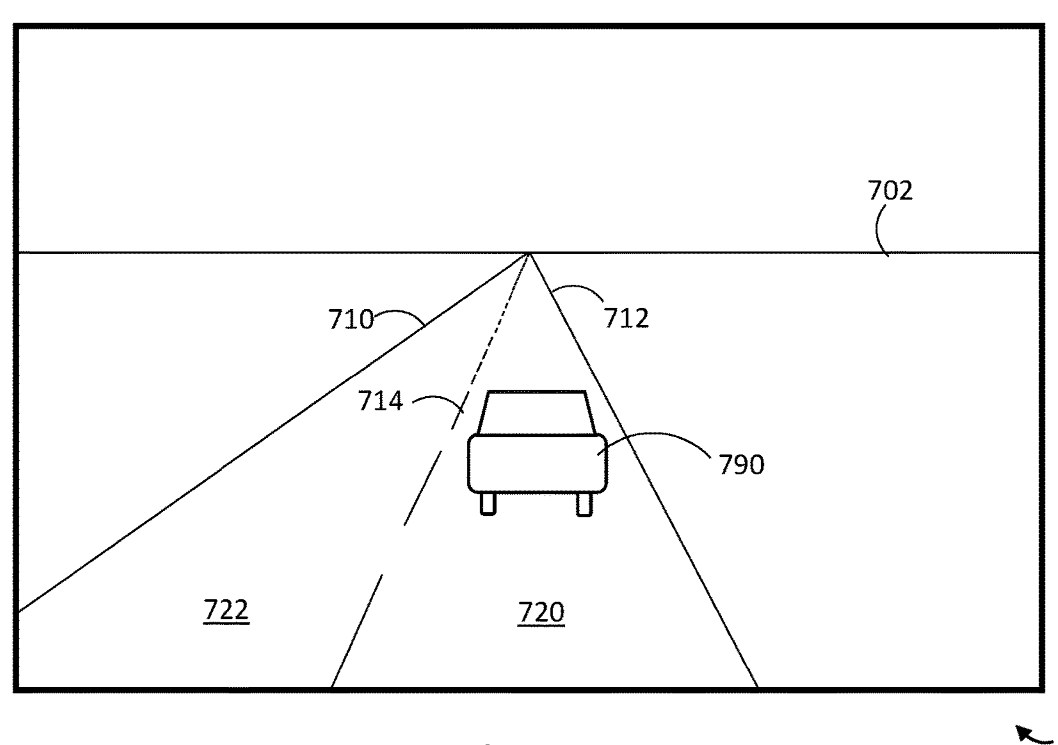
FIG. 7 illustrates an image rendered based on the virtual environment shown in FIG. 6.

Returning to method 500 in FIG. 5, at 513 at least one image is rendered for each instance, from the perspective represented by the virtual camera for that instance. FIG. 7 illustrates an exemplary rendered image 700 in this regard.

Image 700 is rendered from the perspective of a virtual camera positioned in a second vehicle which is following a first vehicle 790. Rendered image 700 shows a horizon 702 and a roadway delineated by road edges 710 and 712. The illustrated roadway includes two separate lanes 720 and 722, separated by dashed center line 714. In the illustrated example, vehicle 790 and the following vehicle are represented as driving in the right-hand lane, though image data can be rendered with vehicles travelling in any appropriate lane.

The virtual environment can be modelled and rendered using any appropriate technology. In some implementations, autonomous vehicle operation software is used to modelled and render the image data. Such software can include, for example, CARLA™, Simulator for Urban Driving in Massive Mixed Traffic (SUMMIT), Procedural Generation Drive (PGDrive), LG Silicon Valley Lab (LGSVL), and NVIDIA DRIVE Sim™.

Based on the first position and second position for an instance, as well as the surrounding environment features, exactly what appears in rendered image data such as image 700 varies per instance. Generally, the closer the first vehicle and the second vehicle are, the larger the first vehicle (vehicle 790 in FIG. 7) will appear in the image data. Conversely, the farther apart the first vehicle and the second vehicle are, the smaller the first vehicle (vehicle 790 in FIG. 7) will appear in the image data.

Returning to method 500 in FIG. 5, at 514 a distance between the first vehicle and the second vehicle (specific to an instance) is determined, by determining a distance between the first position and the second position (for the instance). For example, the at least one processor can determine a vector between the first position and the second position, and determine a length of said vector as the distance between the first position and the second position. Act 514 is drawn in dashed lines, to illustrate that act 514 is optional. In some implementations, instead of act 514, the parameter data accessed at 511 includes an indication of distance between the first position and the second position for the instance.

At 515, the at least one image for the instance (as rendered in act 513) is output. The output at least one image is also associated with a label indicative of the distance between the first vehicle and the second vehicle for the instance. In implementations where the distance between the first position and the second position is determined in act 514, the at least one image is output associated with a label indicative of the determined distance. In implementations where the distance between first position and the second position is included in the parameter data accessed in act 511, the at least one image is output associated with a label which indicates the distance between the first vehicle and the second vehicle (first position and second position) as included in the parameter data for the instance.

Acts 520 and 522 are shown in dashed lines, to illustrate that these acts are optional. Acts 520 and 522 are discussed in detail later, with reference to FIGS. 15A, 15B, 16A, 16B, 16C, 16D, 17A, 17B, 18, and 19.

At 524, a first plurality of images are stored at a non-transitory processor-readable storage medium, which includes each at least one image output for each instance of the plurality of instances. Each of the stored images is stored associated with the respective label indicating distance between the first vehicle and the second vehicle for the respective instance. As a result, the first plurality of images includes a plurality of images representing different instances where a second vehicle is positioned behind a first vehicle, labelled with a distance between the first vehicle and the second vehicle for each instance. In this way, the first plurality of images is an effective set of training data where distance between the first vehicle and the second vehicle is known, so that a machine learning model can be trained to determine distance between the first vehicle and the second vehicle, using the associated distance labels as validation.

Figure 8:
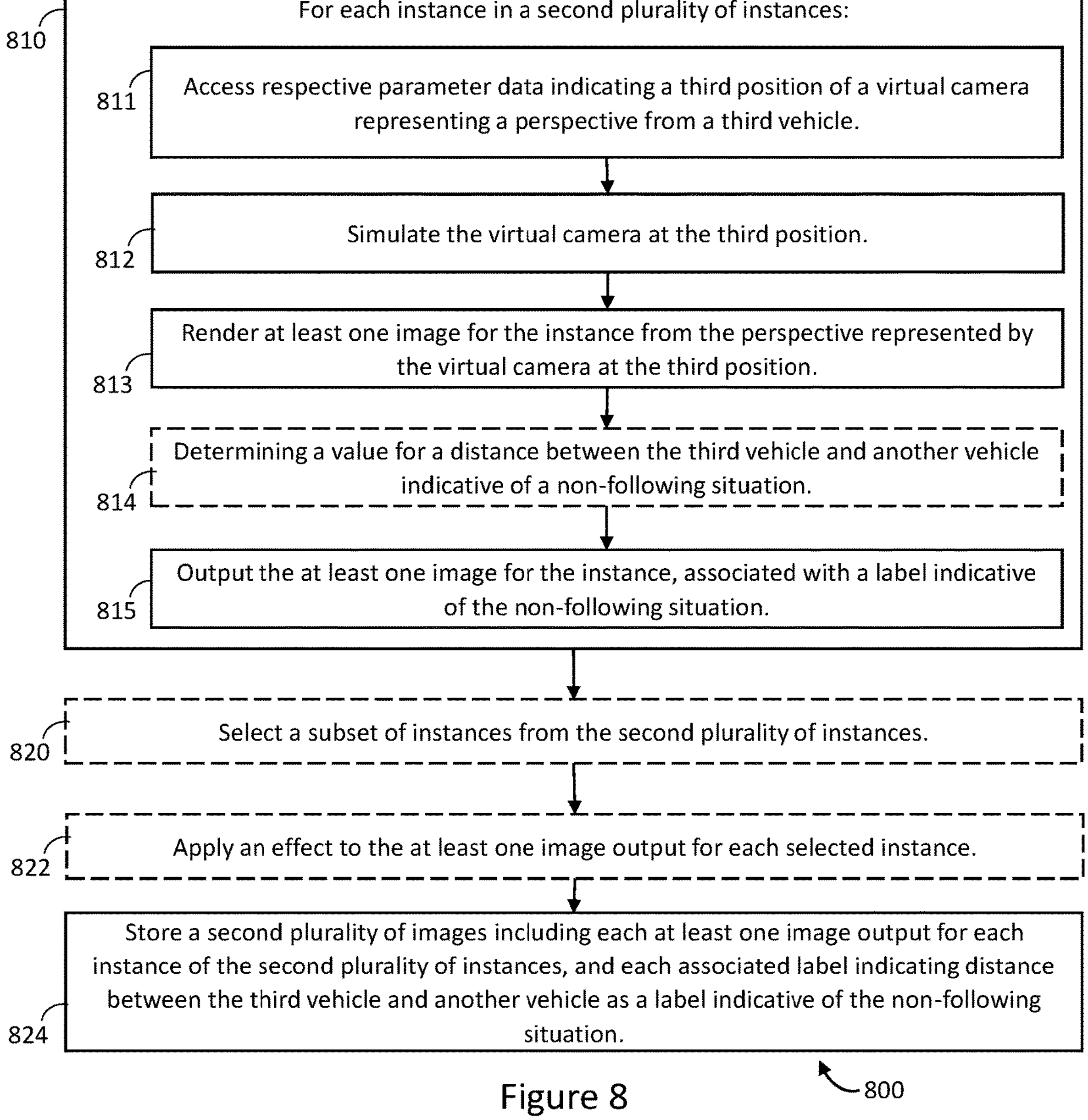
FIG. 8 is a flowchart diagram which illustrates a method for generating simulated training data in accordance with at least one other exemplary implementation.

Method 500 in FIG. 5 is useful for creating training data where a second vehicle is positioned behind a first vehicle, for determining distance therebetween. In some implementations however, it is useful to also generate training data where the second vehicle is not following the first vehicle (or not at a distance close enough to be accurately determinable or important). FIG. 8 is directed to creation of such training data.

FIG. 8 is a flowchart diagram which illustrates an exemplary method 800 for generating simulated training data in line with the above. Method 800 as illustrated includes acts 810 (including sub-acts 811, 812, 813, 814, and 815), 820, 822, and 824. One skilled in the art will appreciate that additional acts could be added, acts could be removed, or acts could be reordered as appropriate for a given application. Acts of method 800 can be performed by appropriate components of the systems or devices discussed earlier, similar to as discussed with reference to method 500 in FIG. 5, and not repeated for brevity.

In method 800, a plurality of instances are simulated where a third vehicle has a third position, as is not following another vehicle (or not at a distance close enough to be accurately determinable or important). In 810, a number of sub-acts (illustrated as sub-acts 811, 812, 813, and 815) are performed for each instance in a plurality of instances.

At 811, parameter data indicating the third position of a virtual camera representing a perspective from the third vehicle is received. The third position is specific to the instance, such that each instance represents a specific scenario (within the overall context of the dataset). As a result, a perspective represented by the virtual camera for an instance will be different from other instances.

Figure 9:
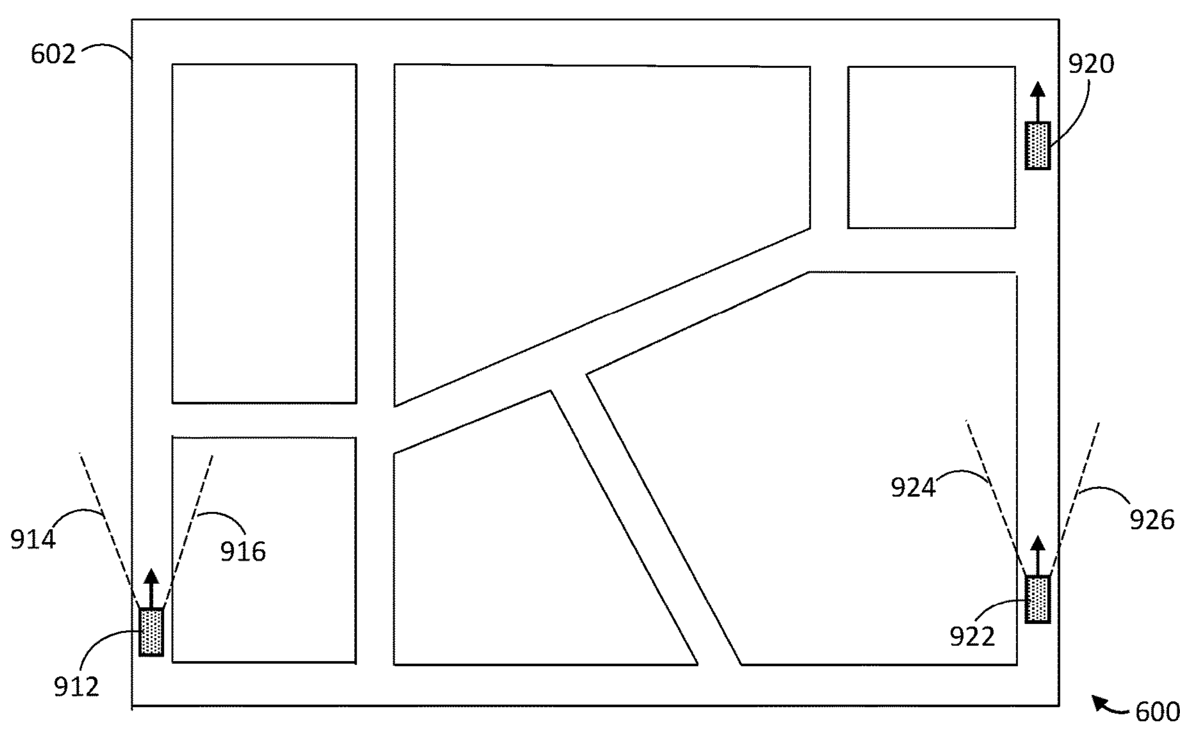
FIG. 9 is a top view of a virtual environment, in accordance with at least one other exemplary implementation.

At 812, for each instance, the virtual camera at the third position is simulated in a virtual environment. An example of this is illustrated in FIG. 9, which is a top view of the virtual environment 600 (similar to as in FIG. 6), including roadways 602. In environment 600 as shown in FIG. 9, two instances are simulated. In a first instance, a third vehicle 912 is not positioned behind (following) another vehicle. A virtual camera is simulated at the position of the third vehicle 912, as shown by field of view lines 914 and 916. In a second instance, a vehicle 920 is simulated as being followed by a third vehicle 922. A virtual camera is simulated at the position of the third vehicle 922, as shown by field of view lines 924 and 926.

For the first instance, the third vehicle 912 is not positioned behind (following) another vehicle. For the second instance, the third vehicle 922 is positioned behind first vehicle 920, but at a great distance. The distance between first vehicle 920 and third vehicle 922 is so great that it is not important for detection of tailgating, and further is possibly not accurately determinable based on image data.

Although FIG. 9 illustrates two simulated instances, one skilled in the art will appreciate that many more instances can be simulated in practice, to generate a large library of simulated instances and consequently a large library of training data.

Figure 10A:
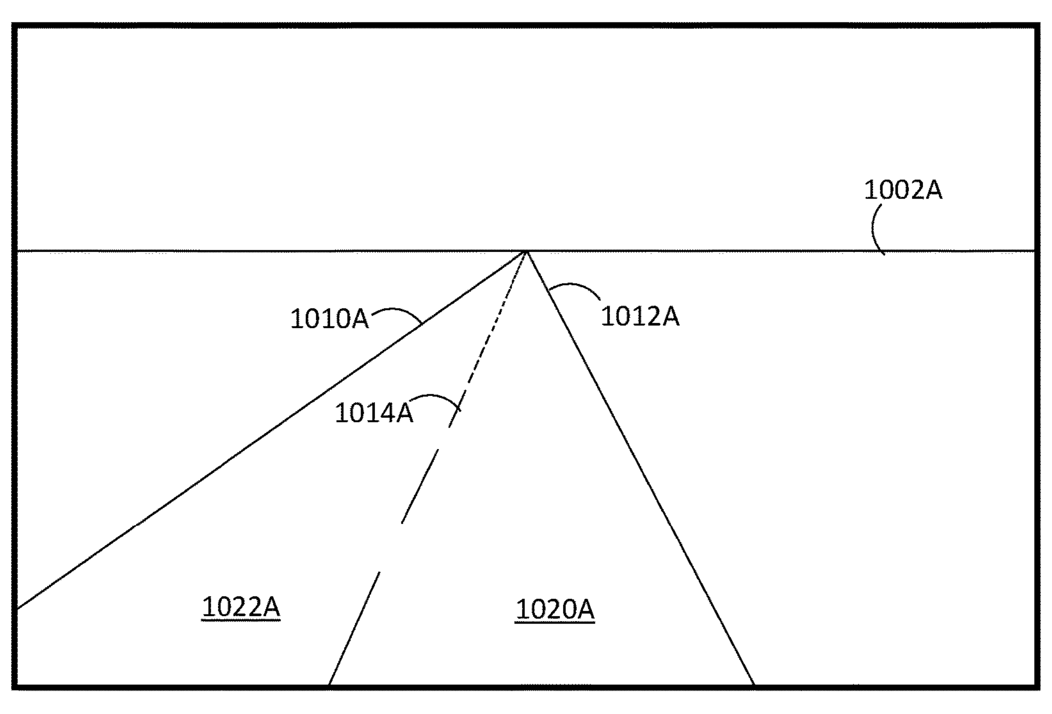
FIGS. 10A and 10B illustrate images rendered based on the virtual environment shown in FIG. 9.
Figure 10B:
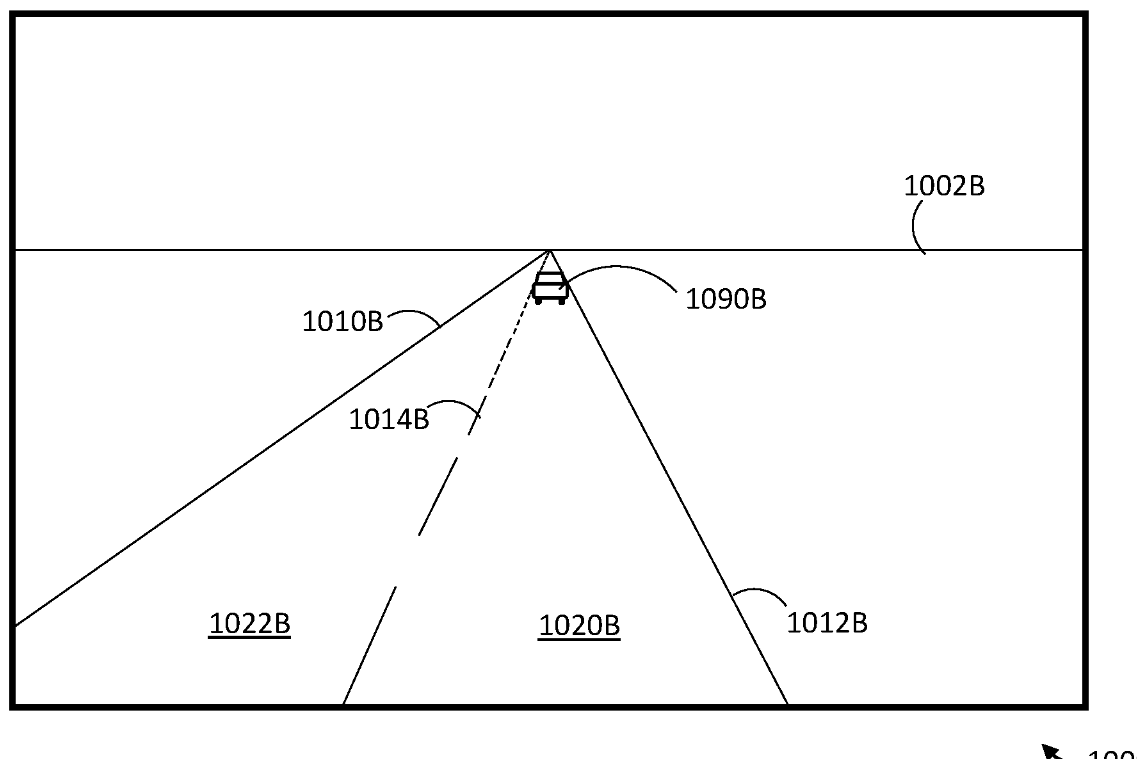

Returning to method 800 in FIG. 8, at 813 at least one image is rendered for each instance, from the perspective represented by the virtual camera for that instance. FIGS. 10A and 10B illustrate exemplary rendered images 1000A and 1000B in this regard.

Image 1000A is rendered from the perspective of a virtual camera positioned in a third vehicle (e.g. third vehicle 912 in FIG. 9) which is not positioned behind or following a first vehicle. Rendered image 1000A shows a horizon 1002A and a roadway delineated by road edges 1010A and 1012A. The illustrated roadway includes two separate lanes 1020A and 1022A, separated by dashed center line 1014A. In the illustrated example, the perspective of the third vehicle is rendered for the third vehicle driving in the right-hand lane, though image data can be rendered with the vehicle travelling in any appropriate lane.

The virtual environment can be modelled and rendered using any appropriate technology, as discussed above with reference to FIG. 7.

Based on the third position for an instance, as well as the surrounding environment features, exactly what appears in rendered image data such as image 1000A varies per instance.

Image 1000B is rendered from the perspective of a virtual camera positioned in a third vehicle (e.g. third vehicle 922 in FIG. 9) which is positioned behind or following a first vehicle (e.g. vehicle 920). Rendered image 1000B shows a horizon 1002B and a roadway delineated by road edges 1010B and 1012B. The illustrated roadway includes two separate lanes 1020B and 1022B, separated by dashed center line 1014B. Image 1000B also includes a rendering of a vehicle 1090B (e.g. corresponding to vehicle 920 in FIG. 9). In image 1000B, the rendering of vehicle 1090B is small, and features thereof are difficult to discern, because vehicle 1090B is a great distance from the position from where the image is rendered (e.g. position of third vehicle 922, and therefore the virtual camera therein, in FIG. 9). As a result, even with a well trained model, distance to the vehicle 920 may not be accurately determinable based on image data. In the illustrated example, the perspective of the third vehicle is rendered for the third vehicle driving in the right-hand lane, though image data can be rendered with the vehicle travelling in any appropriate lane.

The virtual environment can be modelled and rendered using any appropriate technology, as discussed above with reference to FIG. 7.

Based on the third position for an instance, as well as the surrounding environment features, exactly what appears in rendered image data such as image 1000B varies per instance.

Returning to method 800 in FIG. 8, at 814 a value for distance between the third vehicle and another vehicle is determined, which is indicative of a non-following situation for the third vehicle. In this context, a "non-following situation" refers to the third vehicle being in a situation where another vehicle is not being followed (or at least not being followed closely enough for distance to be accurately determinable based on image data, or not being followed closely enough to be relevant to detecting tailgating). In the example of image 1000A in FIG. 10A, the at least one processor determines that the third vehicle is not positioned behind or following another vehicle, and therefore distance to such another vehicle can be determined as any of: a null value, an "infinity" label, as a value so high as to be irrelevant to tailgating detection (e.g. 1 km or higher), or any other appropriate value. In the example of image 1000B in FIG. 10B, a distance between third vehicle 922 and 920 can be determined (e.g. by determining a length of a vector between vehicles 922 and 920). In one implementation, the determined distance can be compared to a threshold, and if the distance exceeds the threshold, the distance between vehicle 920 and 922 is identified as any of: the actual determined distance between vehicle 922 and 920 (which is too great to be relevant to tailgating detection), a null value, an "infinity" label, as a value so high as to be irrelevant to tailgating detection (e.g. 1 km or higher), or any other appropriate value. Such a threshold can be set for example as a limit for meaningful estimations of distance based on image data, or a limit for usefulness in detecting tailgating.

Act 814 is drawn in dashed lines, to illustrate that act 814 is optional. In some implementations, instead of act 814, the parameter data accessed at 811 includes an indication of distance between the third position and another vehicle as corresponding to a non-following situation for the instance.

At 815, the at least one image for the instance (as rendered in act 813) is output. The output at least one image is also associated with a label indicative of the non-following situation (whether this value is determined in act 814, or is included in the parameter data at 811).

Acts 820 and 822 are shown in dashed lines, to illustrate that these acts are optional. Acts 820 and 822 are discussed in detail later, with reference to FIGS. 15A, 15B, 16A, 16B, 16C, 16D, 17A, 17B, 18, and 19.

At 824, a second plurality of images are stored at a non-transitory processor-readable storage medium, which includes each at least one image output for each instance of the plurality of instances. Each of the stored images is stored associated with the respective label indicating the non-following situation for distance between the third vehicle and another vehicle for each instance. As a result, the second plurality of images includes a plurality of images representing different instances where a third vehicle is positioned a great distance from (or not even within sight of) another vehicle, labelled with non-following situation value indicating the third vehicle is not (within the context of the models to be trained) following another vehicle. In this way, the second plurality of images is an effective set of training data where it is known that the third vehicle is not (within the context of models to be trained) following another vehicle, so that a machine learning model can be trained to account for such scenarios, using the associated non-following situation labels as validation.

With reference to acts 511 in method 500 and 811 in method 800, in some implementations accessed parameter is provided/received as user input. For example, in device 300 in FIG. 3, input devices 324 are illustrated (a mouse and keyboard, in the example). A user can use such input devices to input different scenarios for vehicle positions; e.g. a user can manually input positions for vehicles 610, 612, 620, 622, 630, 632, 912, 920, 922, or any other appropriate vehicles simulated in the virtual environment.

In other implementations, with reference to acts 511 in method 500 and 811 in method 800, accessed parameter data is autonomously generated by at least one processor. For example, for each instance in the first plurality of instances (as discussed with reference to method 500 in FIG. 5), the at least one processor autonomously generates the respective parameter data by automatically determining random values for the first position and the second position, within at least one defined distance threshold. The defined distance threshold can be, for example, received as a user input (such as via input devices 324). The distance threshold defines a threshold beyond which distance between two vehicles as determined by image analysis is insufficiently accurate, or beyond which distance between two vehicles is not relevant to tailgating determination. Further, parameter data can be generated based on multiple thresholds for the same nature of parameter data. As one example, multiple distance thresholds can be received, and parameter data can be generated between each received distance threshold. In an example case, a first distance threshold is 1 meter to 5 meters; a second distance threshold is 5 meters to 10 meters; a third distance threshold is 10 meters to 20 meters; a fourth distance threshold is 20 meters to 30 meters; a fifth distance threshold is 30 meters to 40 meters; and a sixth distance threshold is 40 meters to 80 meters. Any appropriate number of thresholds could be implemented for a given application (e.g. a threshold for each 1 meter spacing). In the example, a plurality of situations are simulated, and corresponding image data generated per method 500, for each respective threshold (e.g. for the first distance threshold, the second distance threshold, the third distance threshold, the fourth distance threshold, the fifth distance threshold, the sixth distance threshold, and any other appropriate distance thresholds).

In an exemplary scenario, the at least one processor can autonomously determine a random position within the virtual environment, and randomly determine another position within the virtual environment which is within the distance threshold from the random position. These two randomly generated positions are the first and second positions, and can be determined in either order (i.e. first position is determined first, or second position is determined first). Further, autonomous determination of positions can be constrained based on features of the virtual environment. For example, random determination of positions can be limited to positions which are on roadways of the virtual environment. Further, random determinations of first and second positions of two vehicles can be constrained to positions in a same lane of a roadway of the virtual environment.

In another example, for each instance in the second plurality of instances (as discussed with reference to method 800 in FIG. 8), the at least one processor autonomously generates the respective parameter data by automatically determining a random value for the third position, and randomly generating distance as a null value, or generating distance as a value beyond the defined distance threshold.

With further reference to acts 511 in method 500 and 811 in method 800, in some implementations accessed parameter data further indicates a resolution for the virtual camera. For example, a user can input a camera resolution via input devices 324, or a resolution may be stored in the system based on known camera hardware which the training data is being created for. Regardless, in acts 513 in method 500 and 813 in method 800, rendering an image for a particular instance entails rendering the image at the resolution of the virtual camera specified in the parameter data.

With further reference to acts 511 in method 500 and 811 in method 800, in some implementations accessed parameter data further indicates vehicle types (type of the first vehicle, type of the second vehicle, and/or type of the third vehicle). Such vehicle types can be specific to a particular instance, but are not necessarily unique to an instance. Alternatively or additionally, accessed parameter data further indicates vehicle dimensions or properties (e.g. size and/or weight of the first, second, or third vehicles). Vehicle type, properties (particularly weight), and dimensions can all have an impact on distance determination and tailgating detection. As one example, different vehicles have different dimensions from where a dashcam is mounted and a front of the vehicle (e.g., different vehicles have different lengths of hood). As another example, a heavier vehicle will take typically take longer to stop that a lighter vehicle, and thus unsafe tailgating distance is different between vehicles. By including these vehicle parameters in the respective parameter data, training data can be created which covers a broader range of vehicles and circumstances, and thus when said training data is used to train models, the resulting models should be more robust.

With further reference to acts 511 in method 500 and 811 in method 800, in some implementations accessed parameter data further indicates position and/or orientation of the virtual camera relative to the second vehicle. Position and orientation of a camera impact a resulting image captured by said camera, and thus including such information with the parameter data results in more accurate training data, and thus more accurate models trained based on said data. This principle is illustrated with reference to FIGS. 11A, 11B, 12A, 12B, 13A, 13B, 14A, and 14B discussed below.

Figure 11A:
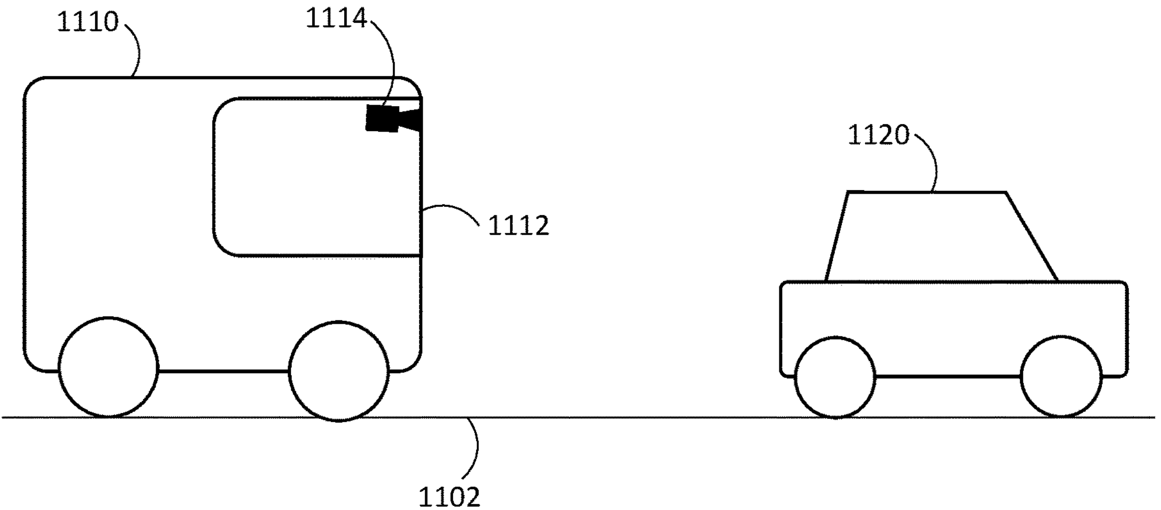
FIGS. 11A and 11B are side views of a vehicle being followed by another vehicle, in accordance with at least two exemplary implementations.
Figure 11B:
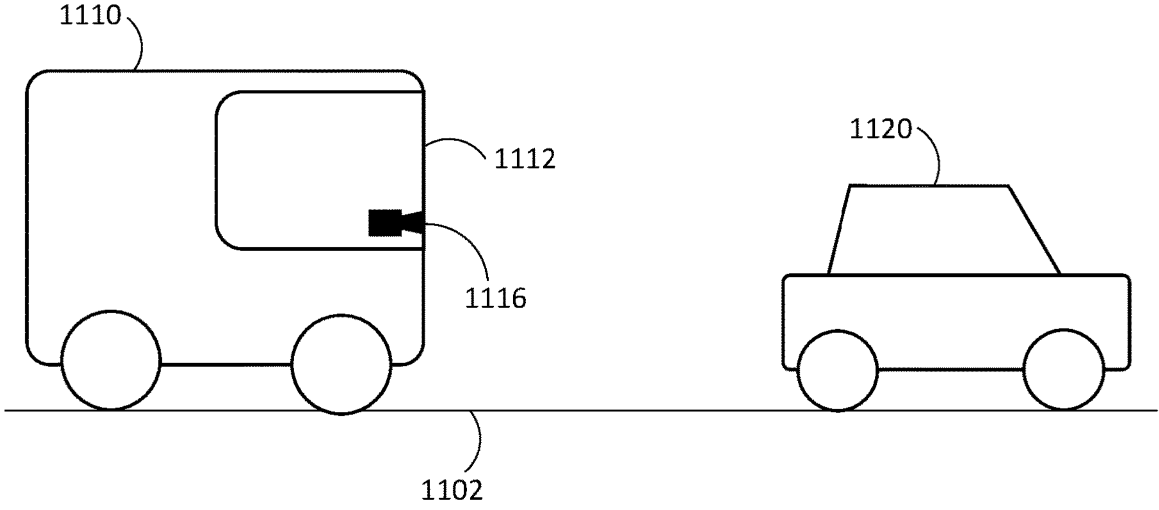

FIGS. 11A and 11B are a side views of a vehicle 1120 being followed by a vehicle 1110. Vehicles 1110 and 1120 are driving on road surface 1102. Vehicle 1110 has a windshield 1112. In FIG. 11A, an image capture device 1114 (a dashcam) is positioned high in vehicle 1110, near the top of windshield 1112. In contrast, in FIG. 11B, an image capture device 1116 is positioned low in vehicle 1110, near the bottom of windshield 1112. Resulting captured images are shown in FIGS. 12A and 12B, discussed below.

Figure 12A:
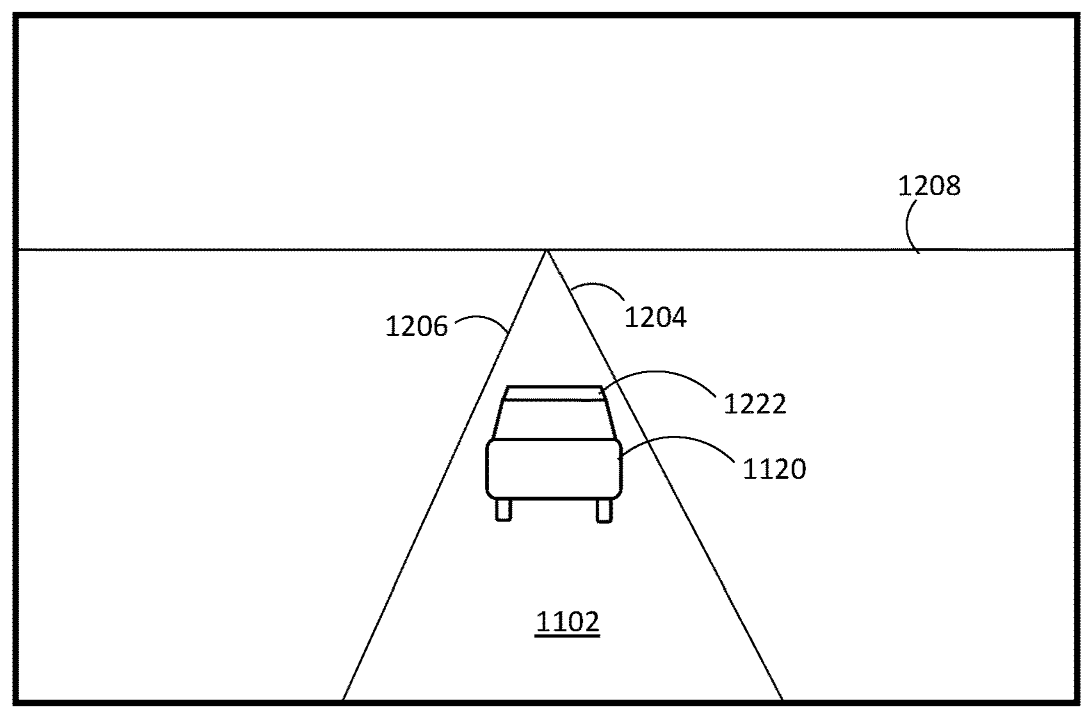
FIGS. 12A and 12B illustrate exemplary images for cameras in the scenarios illustrated in FIGS. 11A and 11B.
Figure 12B:
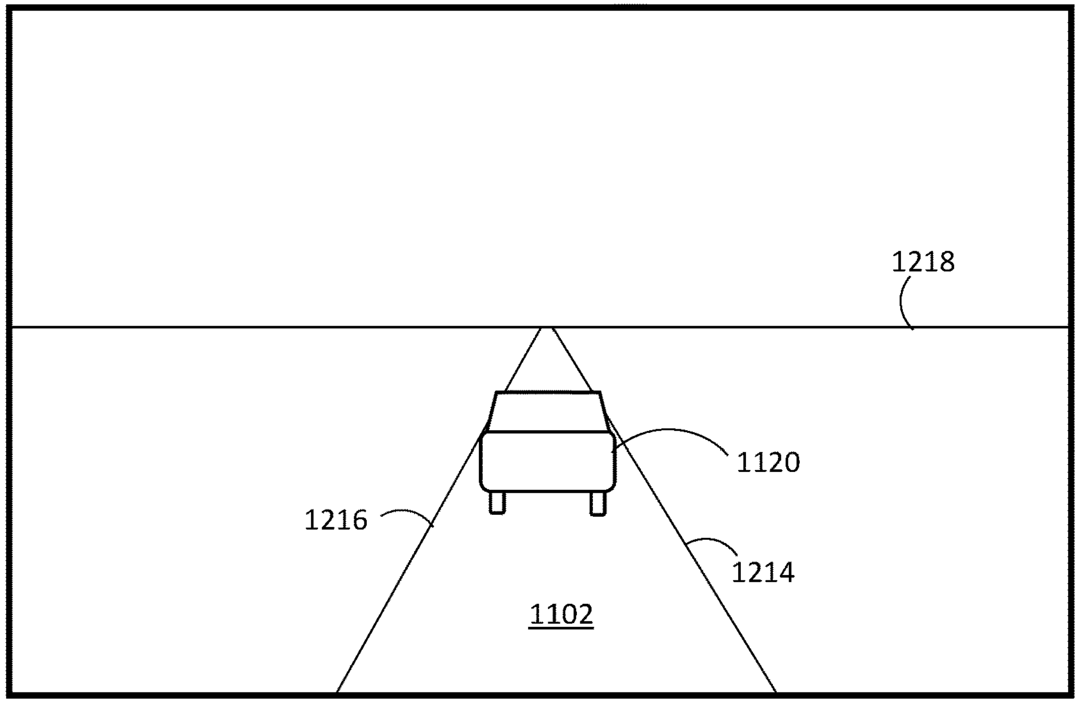

FIG. 12A shows an image 1200 captured by image capture device 1114 in FIG. 11A; that is, an image captured by an image capture device positioned high in vehicle 1110. In image 1200, vehicle 1120 can be seen, driving on roadway 1102 (as bounded by edges 1204 and 1206), toward horizon 1208. Due to the perspective of image capture device 1114, rooftop 1222 of vehicle 1120 can be seen. FIG. 12B shows an image 1210 captured by an image capture device 1116 in FIG. 11B; that is, an image captured by an image capture device positioned low in vehicle 1110. In image 1210, vehicle 1120 can be seen, driving on roadway 1102 (as bounded by edges 1214 and 1216), toward horizon 1218. In contrast to image 1200, in image 1210 the roof 1222 of vehicle 1120 is not as visible due to the perspective of image capture device 1116. Further, horizon 1218 appears lower in image 1210 compared to horizon 1208 in image 1200, due to the perspective of image capture device 1116 compared to the perspective of image capture device 1114.

Figure 13A:
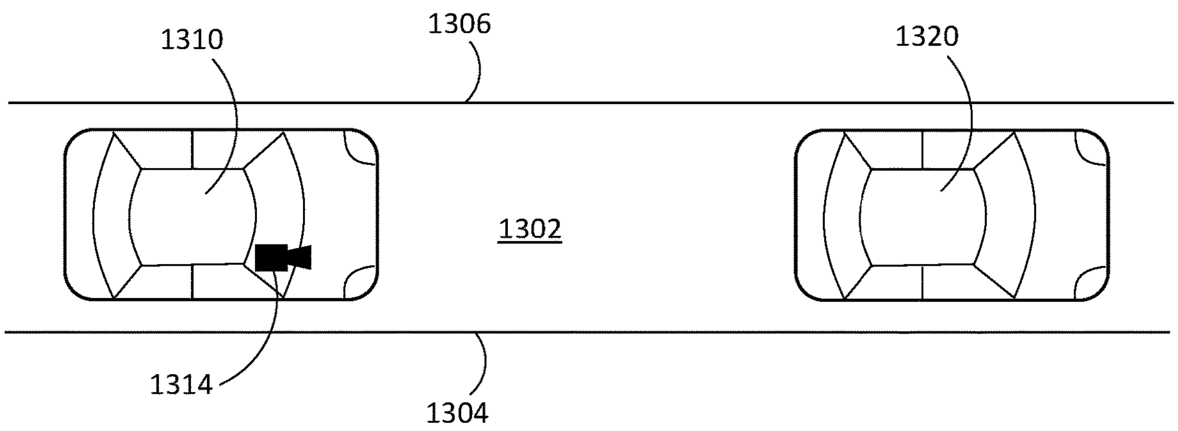
FIGS. 13A and 13B are top views of a vehicle being followed by another vehicle, in accordance with at least two exemplary implementations.
Figure 13B:
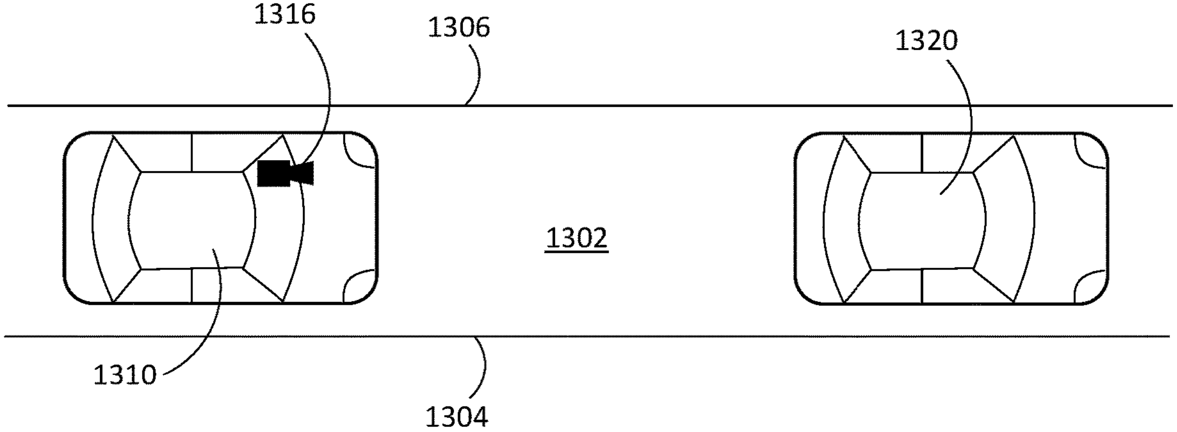

FIGS. 13A and 13B are top views of a vehicle 1320 being followed by a vehicle 1310. Vehicles 1310 and 1320 are driving on roadway 1302, defined by edges 1304 and 1306. In FIG. 13A, an image capture device 1314 (a dashcam) is positioned towards a right side of vehicle 1310. In contrast, in FIG. 13B, an image capture device 1316 is positioned towards a left side of vehicle 1310. Resulting captured images are shown in FIGS. 14A and 14B, discussed below.

Figure 14A:
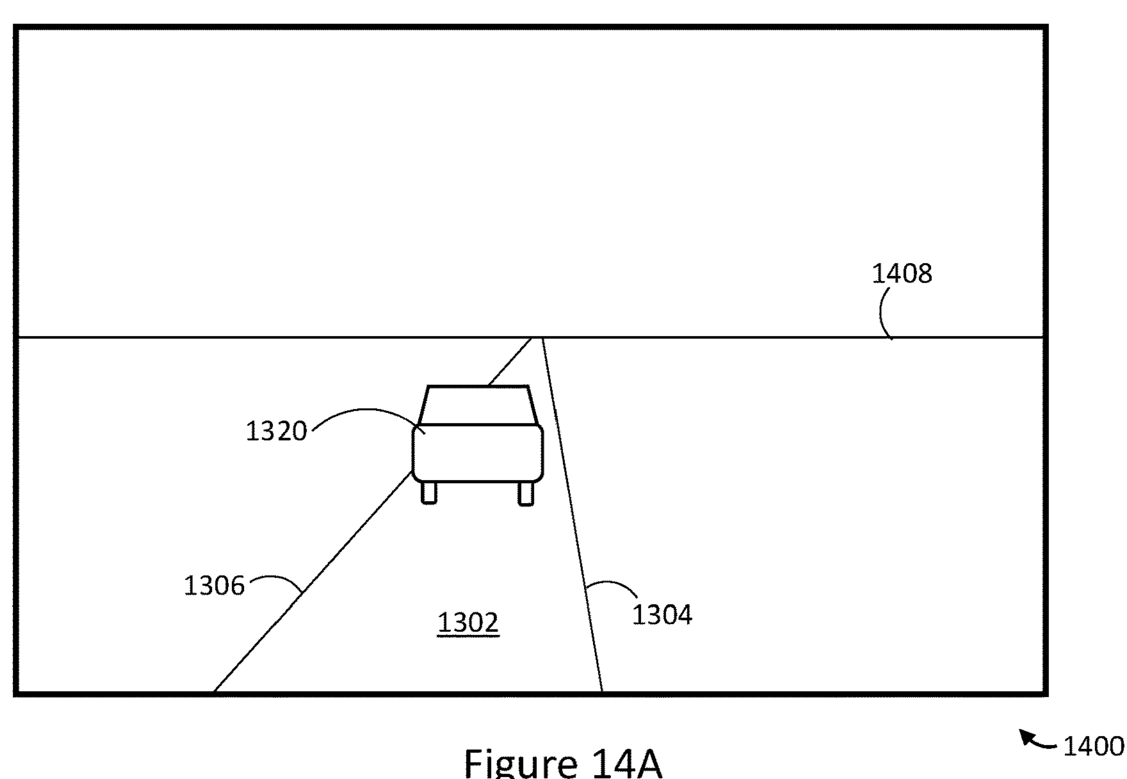
FIGS. 14A and 14B illustrate exemplary images for cameras in the scenarios illustrated in FIGS. 13A and 13B.
Figure 14B:
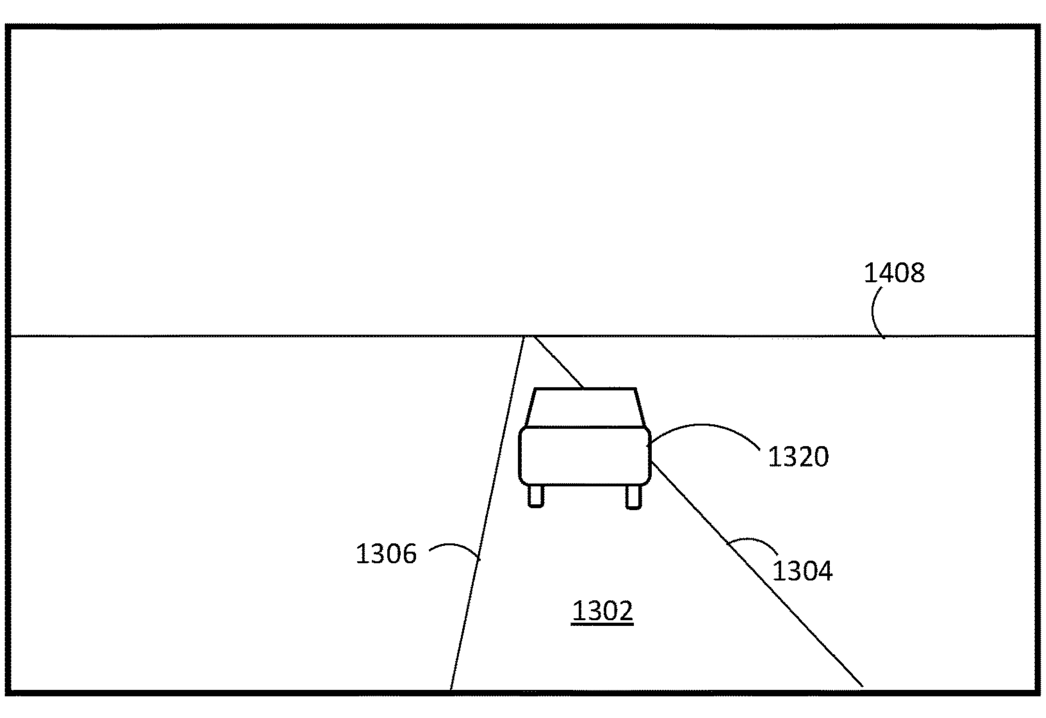

FIG. 14A shows an image 1400 captured by image capture device 1314 in FIG. 13A; that is, an image captured by an image capture device positioned towards the right side of vehicle 1310. In image 1400, vehicle 1320 can be seen, driving on roadway 1302 (as bounded by edges 1304 and 1306), toward horizon 1408. FIG. 14B shows an image 1410 captured by an image capture device 1316 in FIG. 13B; that is, an image captured by an image capture device positioned towards the left side of vehicle 1310. In image 1410, vehicle 1320 can be seen, driving on roadway 1302 (as bounded by edges 1304 and 1306), toward horizon 1408. In image 1400, the roadway 1302 appears more on the left side, due to the perspective of image capture device 1314. In contrast, in image 1410 the roadway 1302 appears more on the right side due to the perspective of image capture device 1316.

FIGS. 11A, 11B, 12A, 12B, 13A, 13B, 14A, and 14B illustrate effects of image capture device positioning within a vehicle on resulting image data which is captured. While these Figures illustrate scenarios where one vehicle follows another on a roadway, similar discussion applies to more complicated situations. For example, roadways could have more lanes, more vehicles can be present on said roadways, roadways may not be straight, etc. Generally, such complex situations are not illustrated so as to avoid cluttering the figures.

With further reference to acts 511 in method 500 and 811 in method 800, in some implementations accessed parameter data further indicates attributes of the virtual camera. Attributes impact a resulting image captured by said camera, and thus including such information with the parameter data results in more accurate training data, and thus more accurate models trained based on said data. Exemplary camera attributes indicated in the parameter data could include, for example, resolution, lens focal length, lens type, or any other appropriate attributes. This principle is illustrated with reference to FIGS. 15A and 15B discussed below.

Figure 15A:
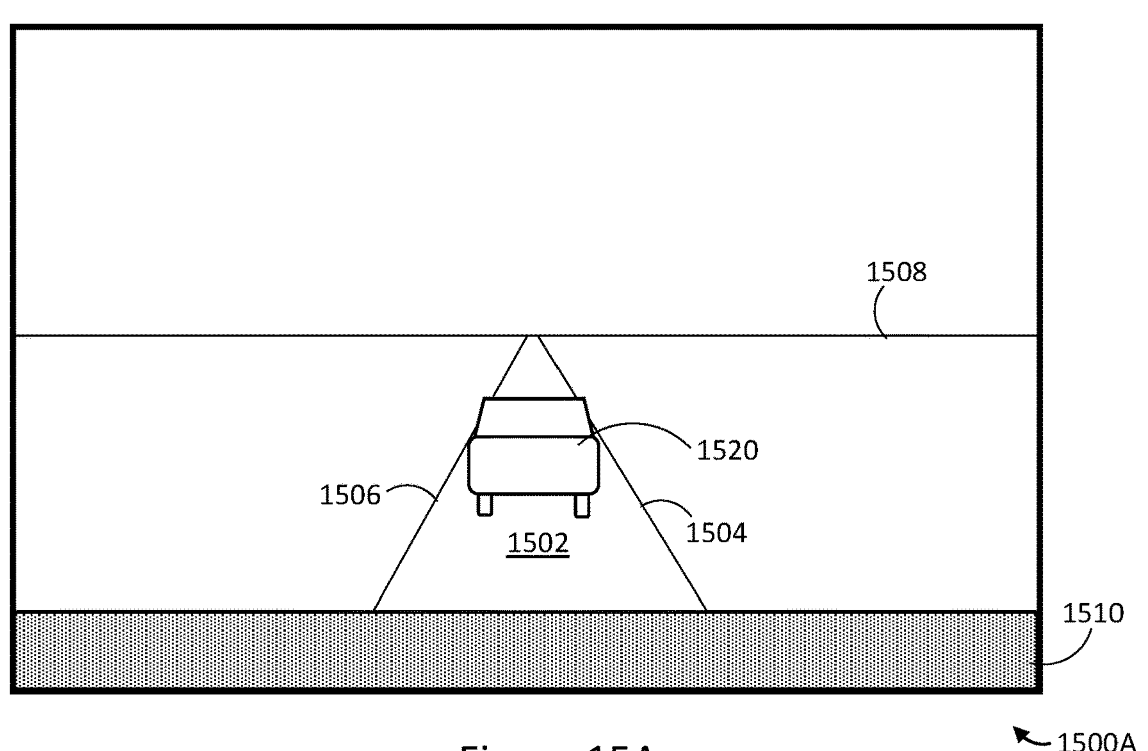
FIGS. 15A and 15B illustrate image data for cameras having different attributes in at least two exemplary implementations.
Figure 15B:
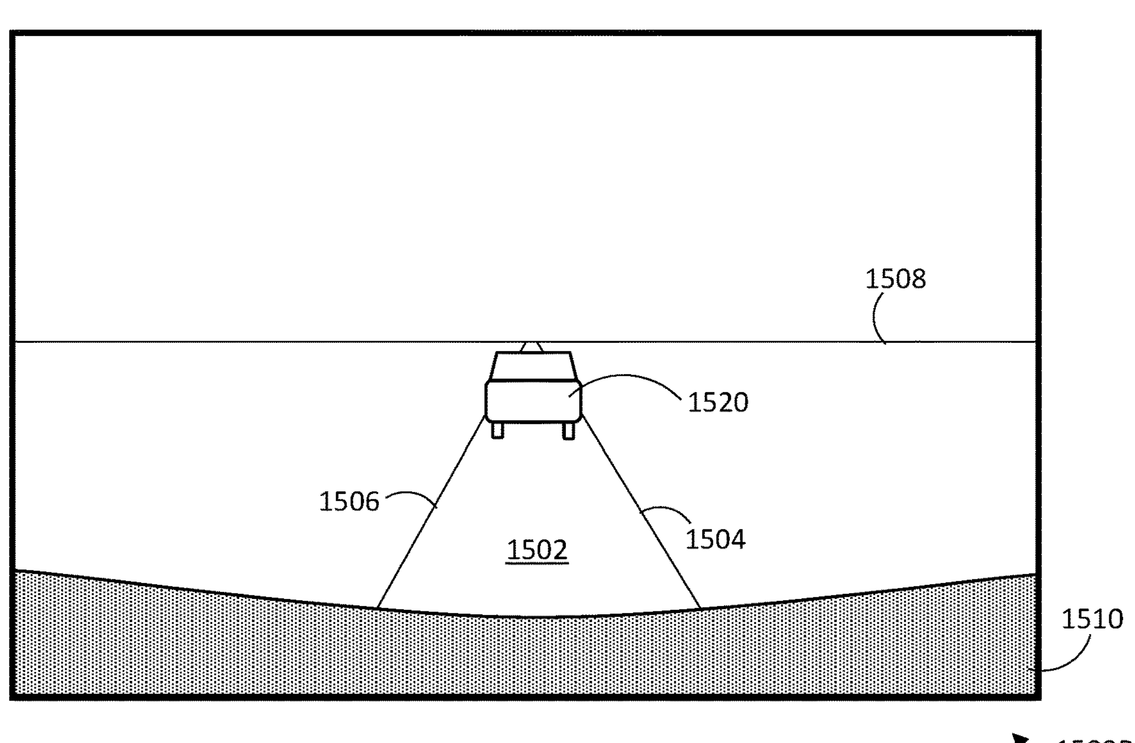

FIGS. 15A and 15B illustrate image data 1500A and 1500B, respectively, as captured by cameras having different attributes. In particular, image data 1500A and 1500B represent the same scene of a vehicle 1520 travelling on roadway 1502 defined by edges 1504 and 1506, towards horizon 1508. A dash 1510 of a vehicle behind vehicle 1520 is also shown in FIGS. 15A and 15B. Image data 1500A represents data captured using a “standard” or “normal” lens (e.g. a lens which most closely approximates human vision, typically a lens with a focal length between 35 mm and 50 mm). Image data 1500B represents data captured using a wide-angle or fish-eye lens (e.g. a lens which captures light over a wider region than a normal lens, typically with a shorter focal length than a normal lens). As a result of the different lens attributes, vehicle 1520 appears farther away from the camera in image 1500B than in image 1500A. Further, features of image 1500B appear distorted. Namely, dash 1510 of the vehicle carrying the camera appears straight in image 1500A, but is curved upwards at the periphery of image 1500B due to the difference in lens attributes.

When rendering images (as in act 513 of method 500 or act 813 of method 800), the properties of the camera can be accounted for, and images rendered as if they were captured by such a camera. Alternatively, subsets of images can be selected, and camera distortion effects applied after the image data is rendered, as discussed later with reference to FIG. 19.

With further reference to acts 511 in method 500 and 811 in method 800, in some implementations accessed parameter data further indicates environmental conditions, or information from which environmental conditions can be derived. Environmental conditions impact a resulting image captured by said camera, and thus including such information with the parameter data results in more accurate training data, and thus more accurate models trained based on said data. This principle is illustrated in FIGS. 16A, 16B, 16C, and 16D discussed below.

In some implementations, the parameter data indicates weather conditions and/or lighting conditions. For example, the parameter data could indicate rain, snow, sleet, fog, sun, clouds, or any other appropriate weather conditions. In some implementations, the parameter data indicates time of day and/or date, from which weather conditions and/or lighting conditions can be generated, estimated, or retrieved (e.g. from a weather service). When simulating vehicles in the virtual environment and rendering images (as in acts 512 and 513 of method 500 or acts 812 and 813 of method 800), the environment and environment conditions can also be simulated, which results in visible changes in the image data. Alternatively, subsets of images can be selected, and environmental distortion effects applied after the image data is rendered, as discussed later with reference to FIG. 19.

FIGS. 16A, 16B, 16C, and 16D discussed below show a variety of environmental conditions represented in image data. Each of FIGS. 16A, 16B, 16C, and 16D show image data where a vehicle 1620 is travelling on roadway 1602 (as bounded by edges 1604 and 1606), towards horizon 1608. The image data is shown from the perspective of a camera in a vehicle behind vehicle 1620. There are two (or more) taillights 1622 positioned on a rear end of vehicle 1620.

Figure 16A:
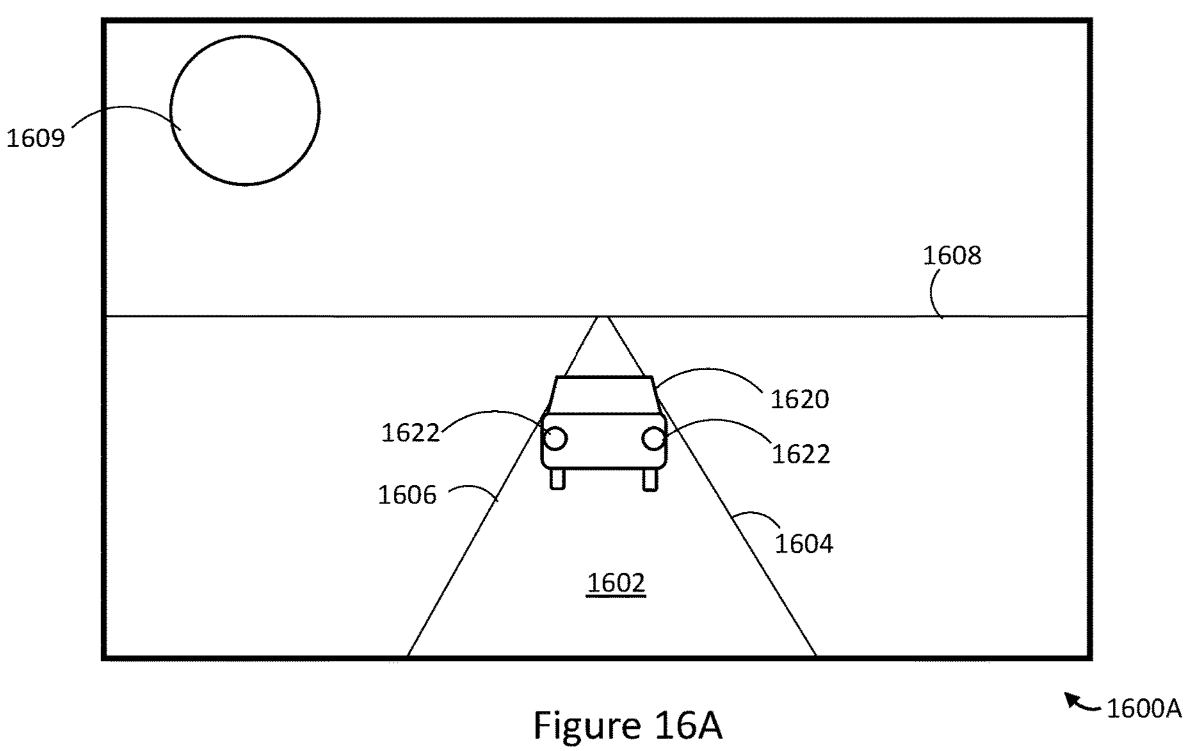
FIGS. 16A, 16B, 16C, and 16D illustrate image data where environmental conditions are represented.

FIG. 16A shows image data 1600A, which represents a clear, sunny day. Sun 1609 can be seen in the sky of image 1600A. To this end, the respective parameter data can include an indication of sun position, altitude, azimuth, intensity, or any other appropriate aspects of the sun. Further, the respective parameter data may indicate that the weather is clear or sunny, but may not indicate a position of the sun. In such cases the sun may not be included in image data 1600A, or sun position, altitude, azimuth, intensity, or other aspects could be procedurally determined by the at least one processor of the device generating image data 1600A. Alternatively, the respective parameter data may only indicate time of day and/or date, and the at least one processor of the device generating image data 1600A may determine that is it daytime, and aspects of the sun and lighting conditions can be based on historical weather data, and image data is generated accordingly.

Figure 16B:
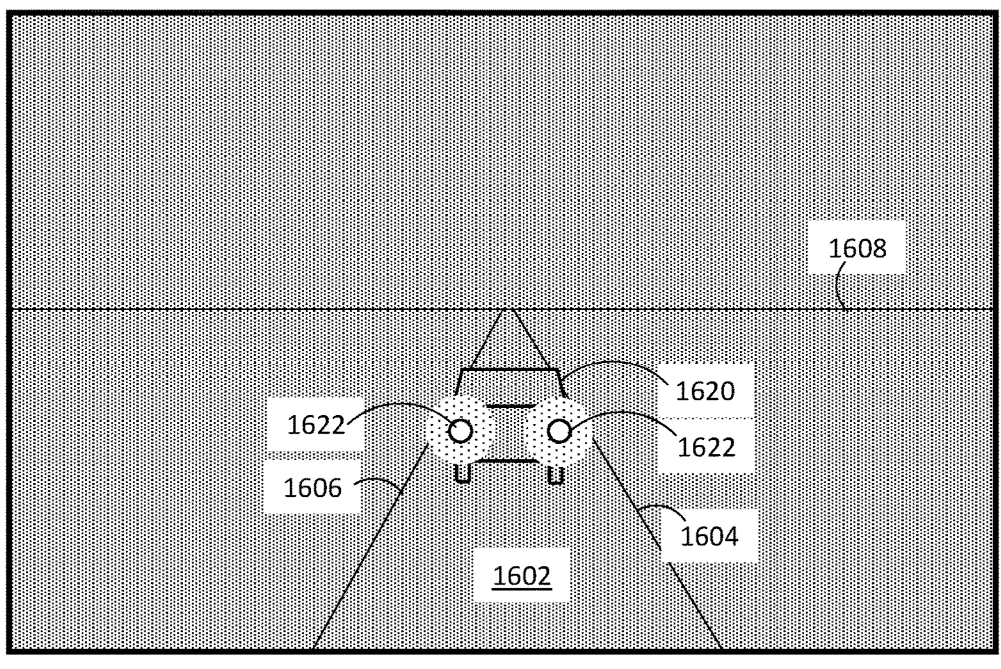

FIG. 16B shows image data 1600B, which is relatively dark compared to image 1600A. For example, the respective parameter data may indicate that it is night time, and as such image 1600B is generated to be dark. Alternatively, the respective parameter data may indicate that it is cloudy, and thus image 1600B is generated to be darker than for a sunny day as in image 1600A. FIG. 1600B is also shown with taillights 1622 emitting light, due to being active. In some implementations, the respective parameter data may only indicate time of day and/or date, and the at least one processor of the device generating image data 1600A may determine that is it nighttime, and aspects of lighting conditions (e.g. due to moon cycle) can be based on historical weather data. The at least one processor may also rendering lighting due to streetlights.

Figure 16C:
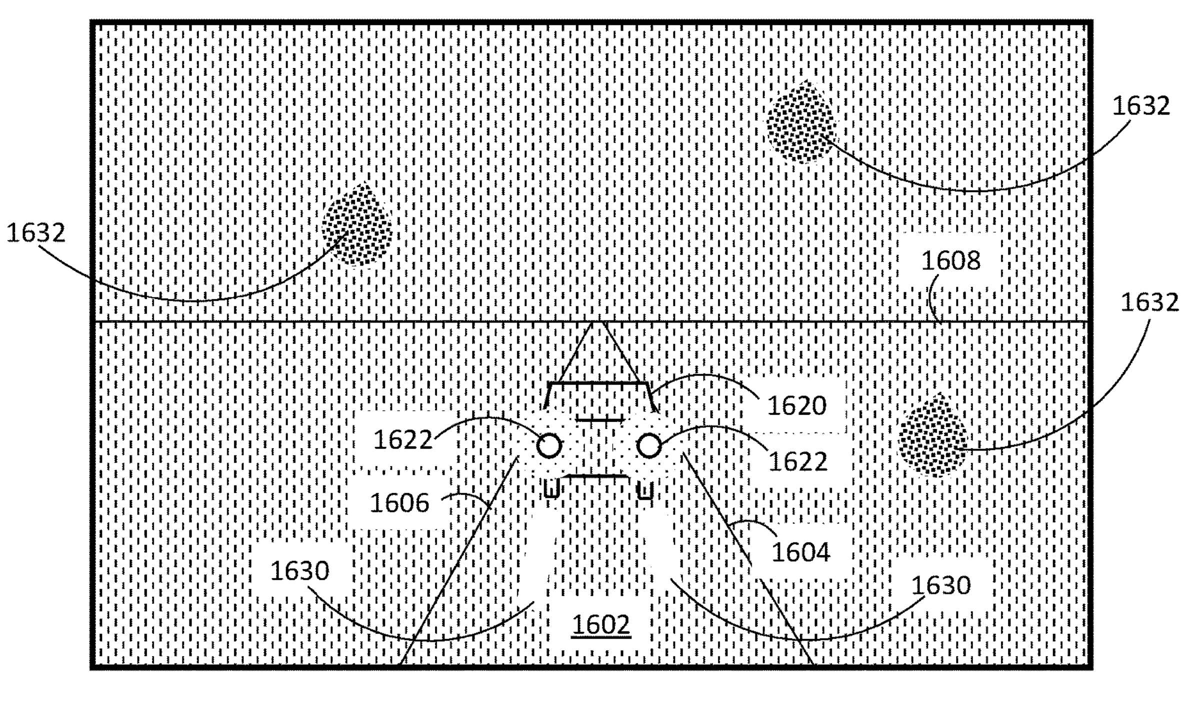

FIG. 16C shows image 1600C, which shows precipitation. For example, the respective parameter data may indicate that rain, hail, sleet, snow, or other precipitation is falling. Corresponding precipitation is rendered in image 1600C. Further, other visual effects due to precipitation can also be rendered. For example, FIG. 16C also shows spots 1632, which represent wetness (e.g. rain drops or snowflakes) in front of the camera (e.g. on the windshield or lens of the camera in the vehicle behind vehicle 1620). As another example, FIG. 16C also shows wetness 1630 (e.g. puddles or sheen from water) on roadway 1602.

Figure 16D:
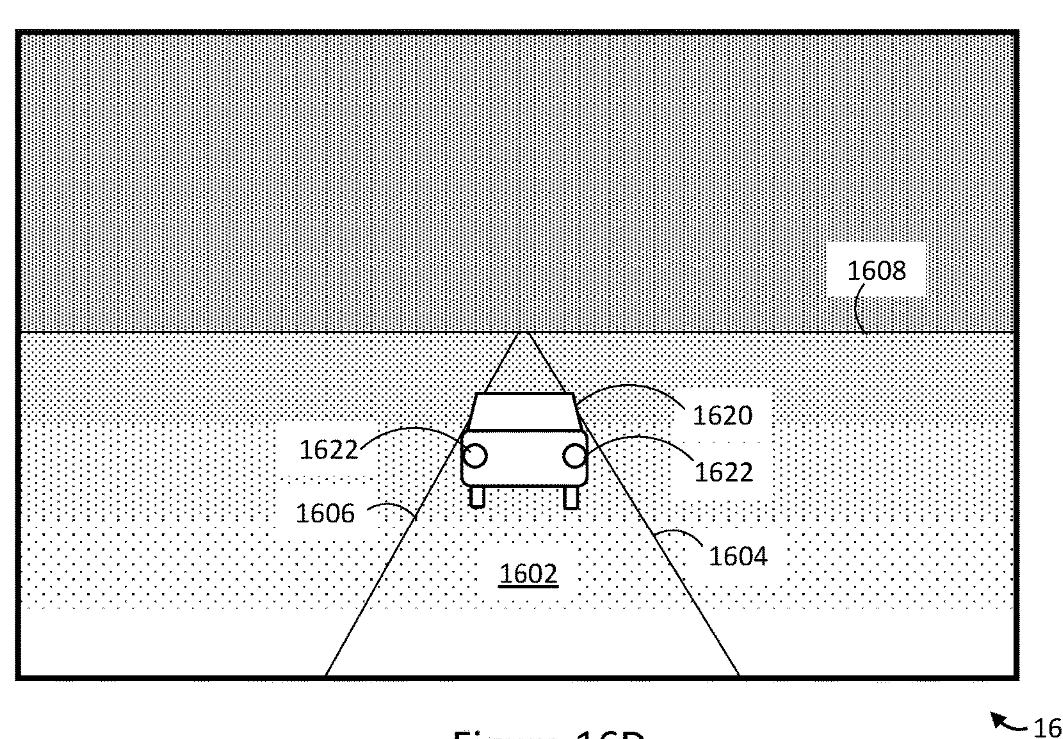

FIG. 16D shows image 1600D, which shows fog. For example, the respective parameter data may indicate fog intensity, fog distance, fog fall, and/or any other aspects related to fog. Corresponding fog is rendered in image 1600D. The fog is shown as obscuring visibility farthest from the camera, while having limited impact on visibility close to the camera.

Other attributes of the environment can also be indicated in the respective parameter data, to be rendered in image data. As an example, atmospheric light scattering properties (scattering intensity, Rayleigh Scattering scale, Mie Scattering scale, etc.) can be indicated in the respective parameter data. Rendered image data can account for such scattering properties (e.g. by rendering sky with appropriate hue, saturation, and gradient). As another example, properties of vehicle 1620 can be indicated in the respective parameter data, such as vehicle color, vehicle dimensions, and/or vehicle model. Rendered image data can account for such vehicle properties (e.g. by rendering the vehicle of appropriate size, shape, and color).

Figure 17A:
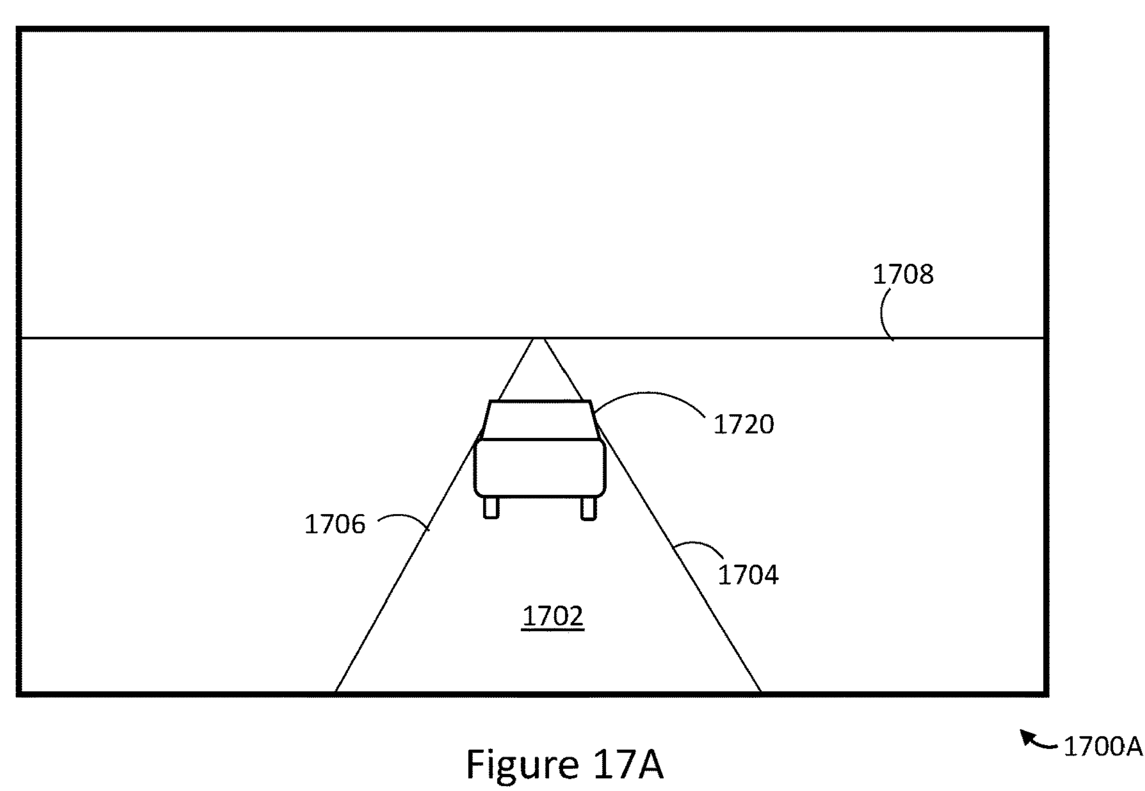
FIGS. 17A and 17B illustrate image data where technical effects are represented.
Figure 17B:
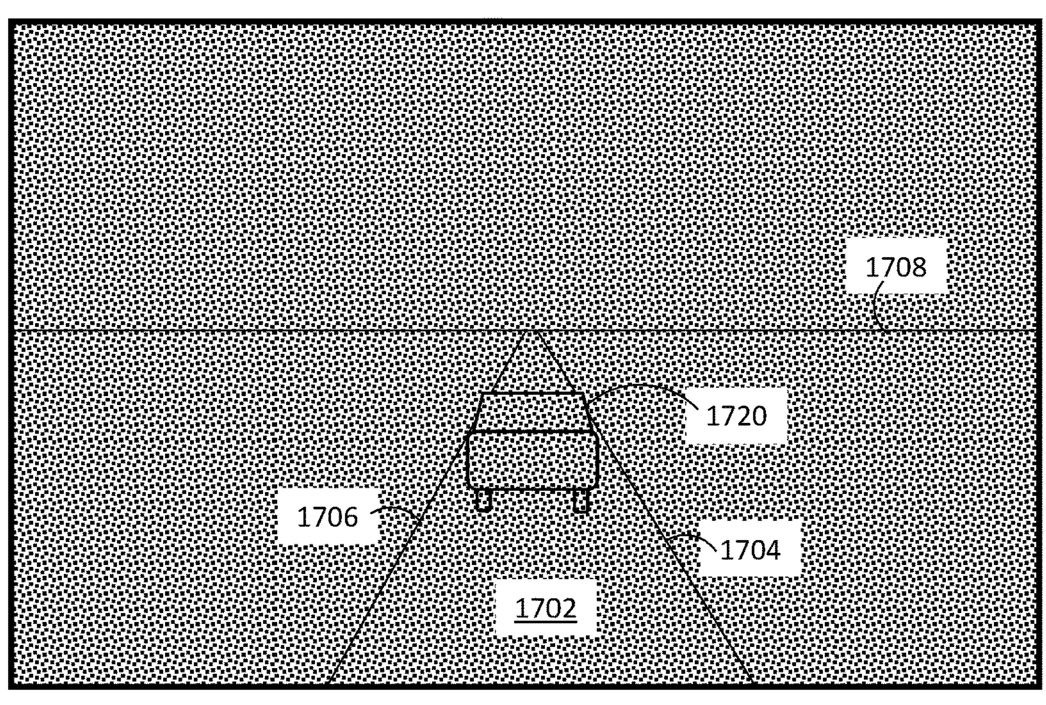

Beyond environmental effects, image data can also show rendered technical effects. FIGS. 17A and 17B discussed below show a variety of technical effects represented in image data. Each of FIGS. 17A and 17B show image data where a vehicle 1720 is travelling on roadway 1702 (as bounded by edges 1704 and 1706), towards horizon 1708. The image data is shown from the perspective of a camera in a vehicle behind vehicle 1720.

FIG. 17A shows image data 1700A, which represents clear image data with no technical artificating. For comparison, FIG. 17B shows image data 1700B, which features technical artifacting or effects. FIG. 17B in particular shows noise in image 1700B. Other technical artifacts or effects can include any of blurring, compression losses, adversarial image modification, image saturation modifications, and changes in pixel value distribution, as non-limiting examples. Respective parameter data can include an indication of any number of technical effects or artificating to be rendered in image data.

When rendering images (as in act 513 of method 500 or act 813 of method 800), technical effects can also be simulated, which results in visible changes in the image data. Alternatively, subsets of images can be selected, and technical distortion effects applied after the image data is rendered, as discussed below with reference to FIG. 19.

Respective parameter data for each generated image can be input manually; that is, an operator could input values for a number of properties for each image to be generated via a user input device such as those discussed earlier. However, in order to generate a large library of training images (which will result in a more robust model trained based on the training images), parameter data can be autonomously generated by at least one processor. To this end, instructions can be provided (e.g. by a user via a user input device) regarding ranges of parameters for image generation.

FIG. 18 is a table showing a list of parameter ranges, for automated generation of respective parameter data for a plurality of images to be generated. In the left column, a plurality of different parameters are listed. One skilled in the art will appreciate that the list of parameters is merely exemplary, and additional parameters could be added, or parameters could be removed, as appropriate for a given application.

In some implementations, prior to act 511 in method 500 or act 811 in method 800 (that is, prior to accessing respective parameter data, for subsequent generation of image data for a particular instance), individual parameter data is generated for the particular instance. That is, specific values for each parameter of interest are provided, and method 500 or method 800 proceed to generate image data for the instance based on the specific values provided.

In other implementations, in act 511 in method 500 or act 811 in method 800, general parameter data is accessed (e.g. such as the list shown in FIG. 18, where a range for each parameter of interest is provided). In act 511 or act 811, specific parameter data for the particular instance is generated within the range specific in the general parameter data.

In some implementations, image data can be generated, and image distortion effects (whether environmental or technical) can be applied afterwards to the generate image data. In particular, from the plurality of instances for which image data is generated (the first plurality of instances in method 500 and/or the second plurality of instances in method 800), a subset of instances is selected. For each instance of the subset of instances, at least one distortion effect (e.g. camera attributes as discussed with reference to FIGS. 15A and 15B; environment effects as discussed with reference to FIGS. 16A, 16B, 16C, and 16D; and/or technical effects as discussed with reference to FIGS. 17A and 17B) is applied to the at least one image output for the instance. An illustrative example is shown in FIG. 19.

Figure 19:
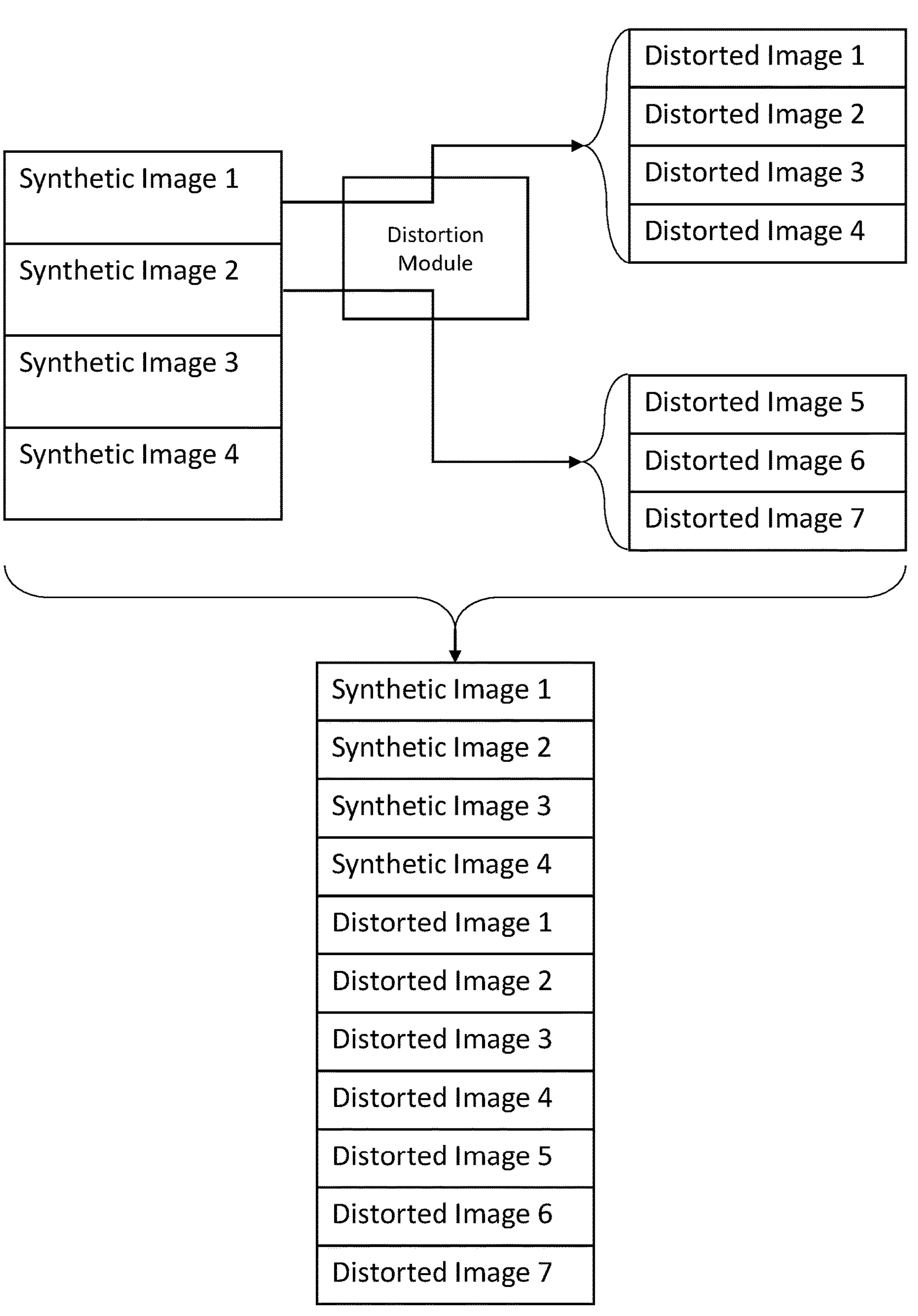
FIG. 19 is a block diagram of applying distortion effects to images, in accordance with at least one exemplary implementation.

FIG. 19 shows Synthetic image data generated for four instances, in an implementation where a single image is generated for each instance. One skilled in the art will appreciate that the disclosure of FIG. 19 is fully applicable to more or fewer instances, and to instances where a plurality of images are generated (such as discussed later with reference to FIGS. 20A, 20B, and 20C). In the example of FIG. 19, "Synthetic Image 1" represents an image generated for a first instance, "Synthetic Image 2" represents an image generated for a second instance, "Synthetic Image 3" represents an image generated for a third instance, and "Synthetic Image 4" represents an image generated for a fourth instance. A subset of instances are selected; in the illustrated example, the first and second instances (for which synthetic images 1 and 2 are generated) are selected.

Synthetic image 1 is run through a distortion module, which applies distortion effects thereto. In the illustrated example, four different distortion "schemes" are applied to Synthetic Image 1, to generate four respective distorted images, labelled "Distorted Image 1", "Distorted Image 2", Distorted Image 3", and "Distorted image 4". Distortion "scheme" refers to a specific type, collection, magnitude, or other properties of distortion, which result in different distorted images. For example, a 25% downscale-upscale distortion (described later) can be applied to Synthetic Image 1 to generate Distorted Image 1; a 50% downscale-upscale distortion can be applied to Synthetic Image 1 to generate Distorted image 2; a raindrop effect can be applied to Synthetic Image 1 to generate Distorted Image 3; a combination of a raindrop effect and a 50% downscale-upscale distortion can be applied to Synthetic Image 1 to generate Distorted Image 4.

Generally, a greater variety of distorted images, with varying distortions applied thereto, to varying degrees, and in combination with other distortions, will result in a large data set which simulates many different scenarios, camera configurations, and data pipelines, and thus will generally result in training data which, when used to a train a machine learning model, will result in the machine learning model being more robust. Every possible type of distortion, and every possible combination of distortion effects, is not listed herein for brevity. However, generally the disclosure can be applied to arrive at a set of distortion effects (and combinations of distortion effects) which result in meaningful training data representative of real-world effects. Some example distortions are discussed below.

A downscale-upscale distortion refers to a process where an image is downscaled by a certain amount (e.g. to 25%, 50%, 75%, or any other appropriate resolution), and then upscaled back to the original resolution. Such a process simulates blurring effects, artifacting, motion, low sensor quality, compression loss, and other image data effects. Generally, the lower the resolution which the image is downscaled to, the greater the resulting distortions.

A compress-decompress distortion refers to a process where an image is compressed using a lossy compression technology (i.e. a technology where some original data is lost), and subsequently decompressed. Such a process simulates compression artifacting.

A noise distortion refers to a process where random noise is introduced into an image. For example, a noise filter can be applied over the image. An adversarial effect distortion similarly introduces noise into an image, but said noise is very specific and designed to cause a trained model to produce false output when analyzing such an image.

Blur distortion refers to applying a blur filter to an image.

Pixel value distortion refers to distorting pixel values within an image (e.g. to oversaturate, undersaturate, discolor an image, brighten, or darken an image).

Motion distortion refers to applying a motion filter to an image, e.g. by blurring or skewing the image in a direction to simulate movement during image capture.

A lens-obstruction effect distortion refers to a process where effects of external substances on the camera lens are simulated. For example, water spots such as those illustrated in FIG. 1600C as 1632 can be positioned in the image to simulate water on the lens. Similar distortion effects could be applied to simulate snow on the lens, dirt on the lens, oil/smudges on the lens, humidity/fog on the lens, or any other pertinent obstructions.

Environmental distortion to simulate environment effects can be applied, such as lens flare, image level adjustments (brightness, contrast, etc.), pixel values can be adjusted, environmental filters can be applied or overlayed (e.g. precipitation filters).

Camera property distortions could also be applied, such as warping areas of the image to simulate focal length effects.

Applying effects to image data (whether the effects are related to camera properties, environmental conditions, technical effects, or other effects) can be referred to as domain randomization.

Figure 20C:
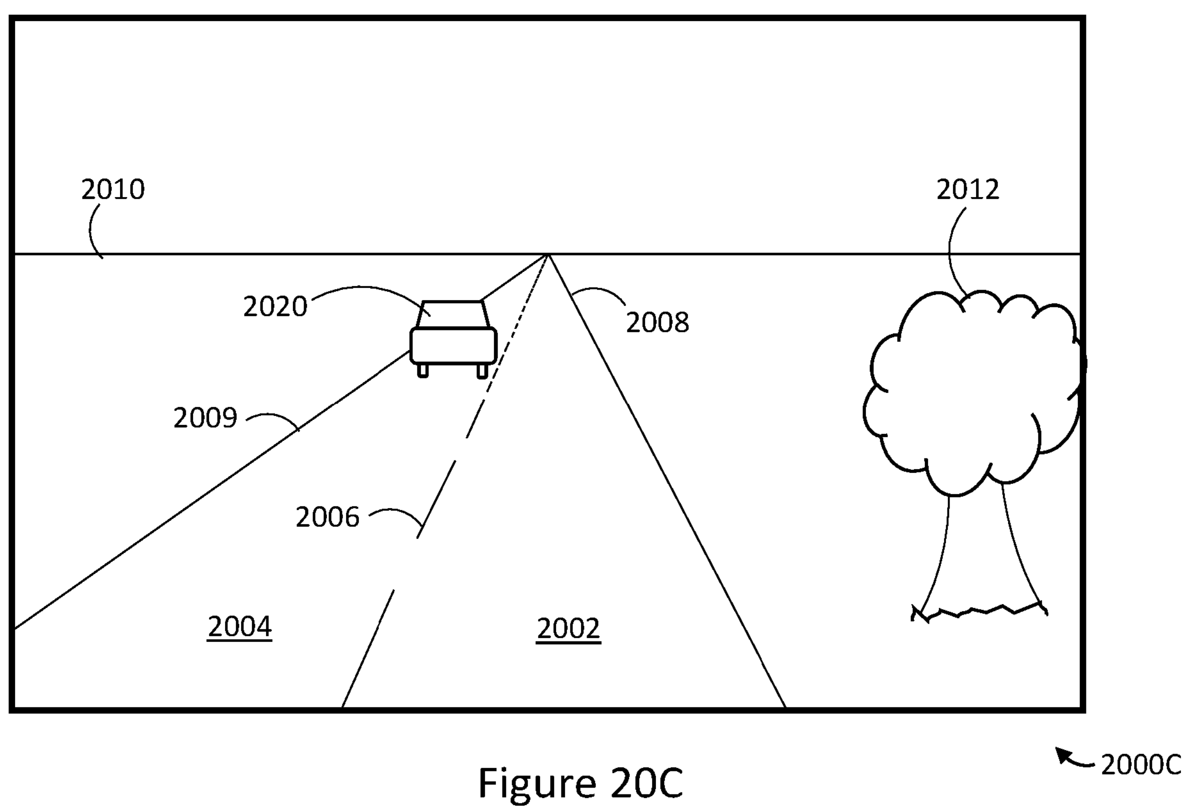

The example images rendered in acts 513 in method 500 and 813 in method 800 have thus far been illustrated as being single images rendered for each respective instance. These are valid implementations of methods 500 and 800, but in alternative implementations, a plurality of images can be rendered for respective single instances. FIGS. 20A, 20B, and 20C illustrate a plurality of respective images 2000A, 2000B, and 2000C which could be rendered in such an implementation, where images 2000A, 2000B, and 2000C represent moments in time.

FIGS. 20A, 20B, and 20C each show a vehicle 2020 driving along a roadway shown by edges 2008 and 2009, towards a horizon 2010. The roadway has two lanes 2002 and 2004, separated by dividing line 2006. A vehicle is driving behind vehicle 2020, and has the camera which the perspective of each of images 2000A, 2000B, and 2000C represents. Each of images 2000A, 2000B, and 2000C also shows tree 2012 which is stationary.

In image 2000A, vehicle 2020 is shown driving in lane 2002, relatively close to the vehicle in which the camera is positioned (relative to images 2000B and 2000C). In image 2000A, tree 2012 is shown relatively far from the vehicle in which the camera is positioned (relative to images 2000B and 2000C).

Image 2000B represents a moment in time after the moment shown in image 2000A. In image 2000B, vehicle 2020 is in the process of changing lanes, from lane 2002 to lane 2004, and is thus driving over dividing line 2006. Further, the vehicle in which the camera is positioned has moved forward, such that stationary tree 2012 appears closer to the camera than in image 2000A. Further still, vehicle 2020 is moving faster than the vehicle in which the camera is positioned, and consequently distance between the two vehicles has grown, such that vehicle 2020 appears further from the camera in image 2000B than in image 2000A.

Image 2000C represents a moment in time after the moment shown in image 2000B. In image 2000C, vehicle 2020 has finished changing lanes, and is now travelling in lane 2004. Further, the vehicle in which the camera is positioned has moved even further forward, such that stationary tree 2012 appears even closer to the camera than in image 2000B. Further still, vehicle 2020 is moving faster than the vehicle in which the camera is positioned, and consequently distance between the two vehicles has grown even more, such that vehicle 2020 appears even further from the camera in image 2000C than in image 2000B.

More or fewer images could be rendered, as appropriate for a given application. By rendering a plurality of images for each instance, training data is more detailed, such that a model trained based on such data will be capable of analyzing vehicle movement over time, instead of trying to understand a situation based on a static image.

In order to render such data, acts 512 and 812 in methods 500 and 800 entail simulating movement of the first vehicle (vehicle 2020 in FIGS. 20A-20C) and the virtual camera over each respective moment in time represented by the plurality of images for the instance. To achieve this, the parameter data accessed at 511 or 811 may further indicate speed, direction of travel, movement path, or any other appropriate information for the vehicles being simulated (the first vehicle, virtual camera, and third vehicles listed in methods 500 and 800).

Figure 21:
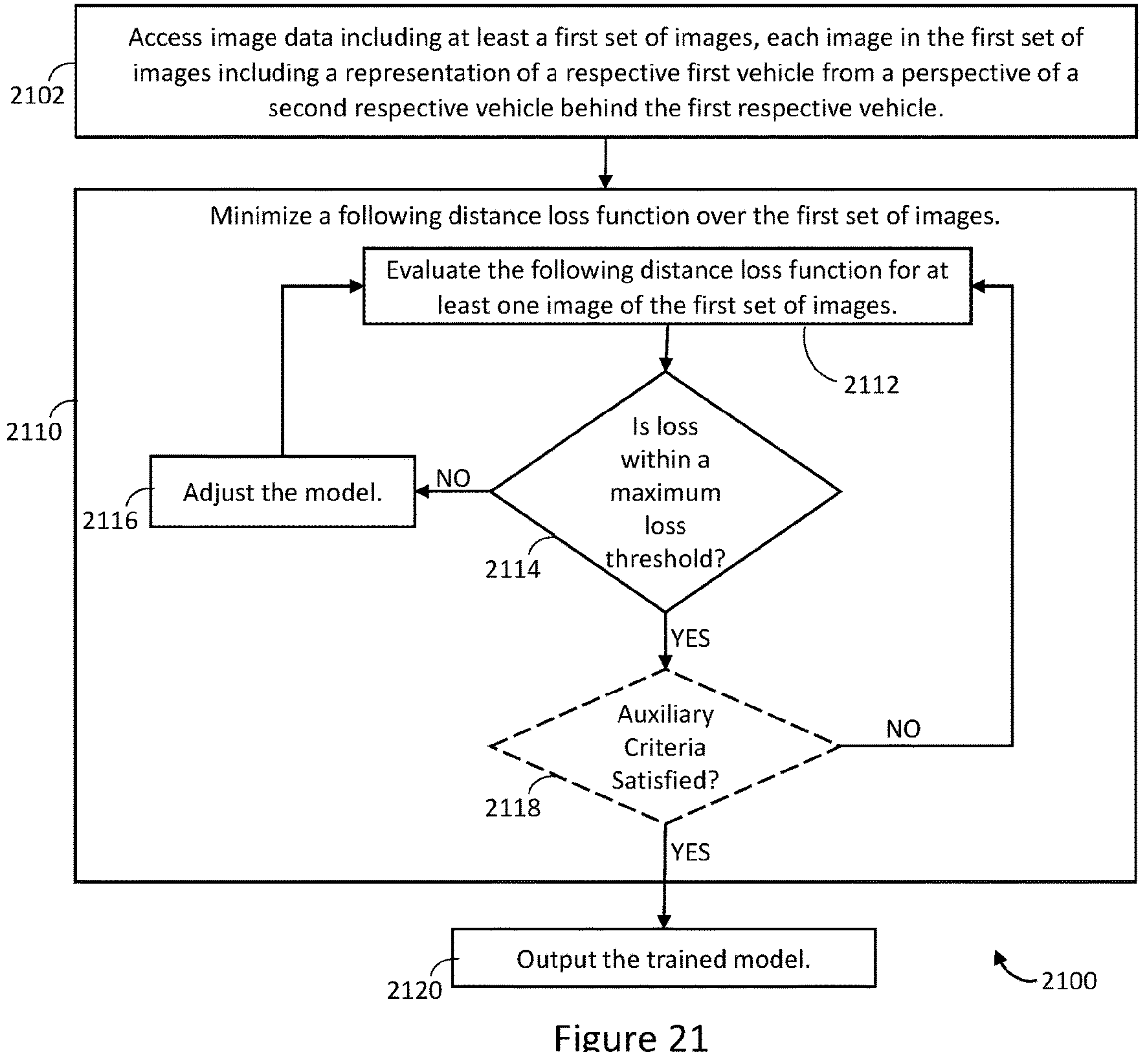
FIG. 21 is a flowchart diagram which illustrates a method for training a machine learning model, in accordance with at least one exemplary implementation.

Returning to method 400 in FIG. 4, at 406 a following distance is determined between a first vehicle and second vehicle based on image data. To achieve this, a machine learning model is trained to determine following distance. FIG. 21 illustrates one example of how such a machine learning model can be trained. FIG. 21 is one exemplary implementation, and other implementations for training the machine learning model can be implemented instead.

FIG. 21 is a flowchart diagram which illustrates an exemplary method 2100 for training a machine learning model. Method 2100 as illustrated includes acts 2102, 2110 (including sub-acts 2112, 2114, 2116, and 2118), and 2120. One skilled in the art will appreciate that additional acts could be added, acts could be removed, or acts could be reordered as appropriate for a given application. As an example, sub-act 2118 is shown in dashed lines to highlight that this sub-act is optional. Acts of method 2100 can be performed by appropriate components of the systems or devices discussed earlier, similar to as discussed with reference to method 500 in FIG. 5, and not repeated for brevity. Importantly, a system or device which performs method 2100 is not necessarily the same hardware which generates training data (as in methods 500 and 800 discussed earlier) or the same hardware which applies the trained model (e.g. as in method 2200 discussed later with reference to FIG. 22). In this way, training data generation, model training, and model execution can be performed by discrete systems or devices most suited to the task. For example, a central server (e.g. any of client device 104, cloud server 106, or local server 118) can perform training data generation and model training, and a device at a vehicle (e.g. image capture device 108A or peripheral device 220) can apply the model based on image data captured at the vehicle. However, in some implementations, a single device or system can perform all of generating training data, training a machine learning model, and applying the machine learning model.

At 2102, image data is accessed by at least one processor of the device performing method 2100. The image data includes at least a first set of images, such as the first plurality of images output at 524 in method 500 discussed with reference to FIG. 5. The accessed image data can be labelled real-world data, or as discussed above can be image data generated via simulation. As above, each image in the first set of images includes a representation of a respective first vehicle from a perspective of a second respective vehicle behind the first vehicle. That is, each image represents a respective instance where a second vehicle is positioned behind (following) a first vehicle. Further, each image in the first set of images is associated with a distance label indicating a distance between the respective first vehicle and the respective second vehicle. Further still, each image in the first set of images is associated with a respective vehicle presence label which indicates whether the first vehicle is present within a meaningful following situation with the second vehicle. In particular, the vehicle presence label can indicate one or both of (i) whether the first vehicle and the second vehicle are within a presence threshold distance of each other, or (ii) whether the first vehicle and the second vehicle are travelling in a same lane of travel. That is, the vehicle presence label indicates whether the second vehicle is actually following the second vehicle (i.e. is within a close enough distance to be meaningful, and/or the second vehicle is actually behind the second vehicle and not in a different lane).

At 2110, a following distance loss function is minimized over the first set of images. Equation (1) below shows the loss function for this exemplary implementation:

$$L = P * |D - d| + (P - p)^2 \tag{1}$$

In Equation (1), L represents loss. P is the vehicle presence label, where a label of 0 indicates the first vehicle is not within the vehicle presence threshold, and a label of 1 indicates the first vehicle is within the vehicle presence threshold. Vehicle presence as determined by the model is indicated by p, and is a decimal number between 0 and 1 which represents confidence by the model that the first vehicle is within the vehicle presence threshold (where a higher value means greater confidence, and vice-versa). D is the value for distance indicated in the distance label, and d is the value for distance as determined by the model.

The first term in Equation (1), $P*|D-d|$, represents the distance regression loss. That is, the difference between the distance as indicated in the label and the distance determined by the model. Where P=1, (vehicle presence label for a particular image indicates that the first vehicle is within the vehicle presence threshold), the first term becomes $|D-d|$, which represents difference between the distance label and the distance determined by the model (i.e., how accurately the model determined distance, where a higher value indicates greater inaccuracy than a low value). Where P=0, (vehicle presence label for a particular image indicates that the first vehicle is not within the vehicle presence threshold), the first term becomes 0, such that loss L becomes only the second term.

The second term in Equation (1), $(P-p)^2$, represents classification loss. That is, the difference between the vehicle presence as indicated in the vehicle presence label and as determined by the model (i.e., how inaccurately the model classifies whether a vehicle is within the vehicle presence threshold).

In the process of generating training data as discussed earlier with reference to FIGS. 5 and 8, which can be used to train a model using Equation (1), outputting at least one image for an instance (as in acts 515 and 815) further comprises outputting the at least one image associated with a vehicle presence label indicative of whether the distance between the first vehicle and the second vehicle with within the vehicle presence threshold. In some cases, the vehicle presence label is input by a user, whereas in other the vehicle presence label for a given instance is generated as part of method 500 or 800, based on the distance between the first vehicle and the second vehicle (the distance between the first position and the second position).

In some exemplary implementations, the vehicle presence threshold is set to 40 meters. However, any vehicle presence threshold could be used, as appropriate for a given application.

In the example of FIG. 21, act 2110 includes sub-acts 2112, 2114, 2116, 2118. At 2112, the following distance loss function is evaluated for at least one image of the first set of images. That is, for the at least one image, the model is applied to determine p and d, and subsequently loss L is determined in accordance with Equation (1).

At 2114, the determined loss L is compared to a maximum loss threshold. If determined loss L is not within the maximum loss threshold, method 2100 proceeds to act 2116 where the model is adjusted (e.g. by adjusting weights and biases of the model with the aim of reducing loss). In one exemplary implementation, backpropagation is implemented to adjust weights and biases of the model. One skilled in the art can implement any appropriate model structure and means for adjusting the model, as appropriate for a given application. After the model is adjusted at 2116, method 2100 returns to act 2112, where the following distance function is evaluated for at least one image of the first set of images. The at least one image for which the following distance loss function is evaluated can be the same at least one image as before, such that the adjustments to the model are "tested" against the same image data. Alternatively, the at least one image for which the following distance loss function is evaluated can be a different at least one image, such that the model is adjusted by moving through the first set of images.

Acts 2112, 2114, and 2116 can be iterated any appropriate number of times, until loss is within the maximum loss threshold at 2114, in which case method 2100 proceeds to 2118. At 2118, auxiliary criteria for the model are evaluated. If the auxiliary criteria are not satisfied, method 2100 returns to act 2112, where the following distance loss function is evaluated. Auxiliary criteria can include various criteria. As one example, auxiliary criteria can require that the loss function be within a maximum loss threshold for each image in the first set of images. That is, even if the loss function is within a maximum loss threshold for a first image, the auxiliary criteria can require that each image be evaluated prior to outputting the trained model. As another example, auxiliary criteria can require that the loss function be within a maximum loss threshold for at least a defined amount of images in the first set of images. That is, even if the loss function is within a maximum loss threshold for a first image, the auxiliary criteria can require that the loss function be within the maximum loss threshold for a defined amount (e.g. 90%) of the images in the first set of images. As another example, auxiliary criteria can require that the loss function be evaluated for at least a defined amount of images (e.g. 90%) in the first set of images.

Act 2118 is optional. In one exemplary implementation, evaluating the following distance loss function for at least one image of the first set of images in act 2112 comprises evaluating the following distance loss function for each image of the first set of images (or for a defined amount of images in the first set of images), such that criteria regarding quantity of images to be evaluated are inherently satisfied.

If the auxiliary criteria are satisfied at 2118 (or if act 2118 is not included), method 2100 proceeds to act 2120. At 2120, the model is considered as a "trained" model, and is output for use. For example, the trained model can be sent to another device for storage, distribution, and/or application, or can be stored at a non-transitory processor-readable storage of the device which performed the training.

Exemplary implementations and usage scenarios for method 2100 (in particular act 2110) are discussed below.

In a first example, at 2112 the distance loss function is determined for a first image. The first image is associated with vehicle presence label $P_1=1$ and distance label $D_1=3$ m. In this case, the model determines vehicle presence $p_1=0.9$ and distance as $d_1=2.5$ m. With these values, evaluating Equation (1) results in a distance loss $L_1=0.51$. At 2114, loss $L_1$ is compared to a maximum loss threshold, which in this example is 0.25. Since 0.51 is greater than 0.25, loss $L_1$ is not within the maximum loss threshold, and method 2100 proceeds to act 2116. At 2116, the model is adjusted per a machine learning adjustment process, after which method 2100 proceeds to a second iteration of act 2112. In this first example, the second iteration of act 2112 is run again on the first image. As a result of the adjustments to the model at 2116, the model now determines vehicle presence $p_2=0.95$ and distance as $d_2=2.9$ m. As a result, Equation (1) evaluates to loss $L_2=0.1025$. In a second iteration of act 2114, loss $L_2$ is compared to the maximum loss threshold of 0.25. Since 0.1025 is less than 0.25, loss $L_2$ is within the maximum loss threshold. If no auxiliary criteria are specified (i.e. act 2118 is not included), method 2100 proceeds to act 2120, where the trained model is output.

For a case where an auxiliary criteria is specified in the first example, which requires that the loss be within the maximum loss threshold for each image in the first set of images, at 2118 the method returns to 2112. The following distance function is evaluated for a second image at 2112, and method 2100 proceeds to sub-act 2114 (and 2116 if appropriate) similar to as discussed regarding the first image. This cycle is repeated for each image in the first set of images.

In the first example, the model is trained by repeating evaluation of the distance loss function for a first image. As discussed above, this can be performed for each image in the first set of images, until the distance loss function as evaluated for each image is within the maximum loss threshold. Alternatively, this can be performed until the distance loss function as evaluated for a threshold amount of images, such as 90% of the images, is within the maximum loss threshold. In this way, loss can be minimized for each image (or a satisfactory amount of images) in the first set of images.

In a second example, at 2112 the distance loss function is determined for the first image similarly as discussed above for the first example. As above, evaluating Equation (1) results in a distance loss $L_1=0.51$. At 2114, loss $L_1$ is compared to a maximum loss threshold, which in this example is 0.25. Since 0.51 is greater than 0.25, loss $L_1$ is not within the maximum loss threshold, and method 2100 proceeds to act 2116. At 2116, the model is adjusted per a machine learning adjustment process, after which method 2100 proceeds to a second iteration of act 2112. In this second example, the second iteration of act 2112 is run instead on a second image. The second image is associated with vehicle presence label $P_2=1$ and distance label $D_2=2$ m. In this case, the model determines vehicle presence $p_2=0.93$ and distance as $d_2=1.7$ m. With these values, evaluating Equation (1) results in a distance loss $L_2=0.3049$. At 2114, loss $L_2$ is compared to a maximum loss threshold, which in this example is 0.25. Since 0.3049 is greater than 0.25, loss $L_2$ is not within the maximum loss threshold, and method 2100 proceeds to act 2116. At 2116, the model is again adjusted per a machine learning adjustment process, after which method 2100 proceeds to a third iteration of act 2112. In this second example, the third iteration of act 2112 is run instead on a third image. The third image is associated with vehicle presence label $P_3=1$ and distance label $D_3=3.5$ m. In this case, the model determines vehicle presence $p_3=0.95$ and distance as $d_3=3.3$ m. With these values, evaluating Equation (1) results in a distance loss $L_3=0.2025$. In a third iteration of act 2114, loss $L_3$ is compared to the maximum loss threshold of 0.25. Since 0.2025 is less than 0.25, loss $L_3$ is within the maximum loss threshold. If no auxiliary criteria are specified (i.e. act 2118 is not included), method 2100 proceeds to act 2120, where the trained model is output.

For a case where an auxiliary criteria is specified in the second example, which requires that the loss be within the maximum loss threshold for each image in the first set of images, at 2118 the method returns to 2112. The following distance function is evaluated for a fourth image at 2112, and method 2100 proceeds to sub-act 2114 (and 2116 if appropriate) similar to as discussed regarding the first image. This cycle is repeated for each image in the first set of images. Further, because the loss function for the first and second images was determined as being greater than the maximum loss threshold, sub-acts 2112, 2114, and 2116 (as appropriate) are performed again for the first and second images.

In the second example, the model is trained by iteratively evaluating the distance loss function, on different images. In this way, loss can be minimized for a plurality of images (or a satisfactory amount of images) in the first set of images.

Figure 22:
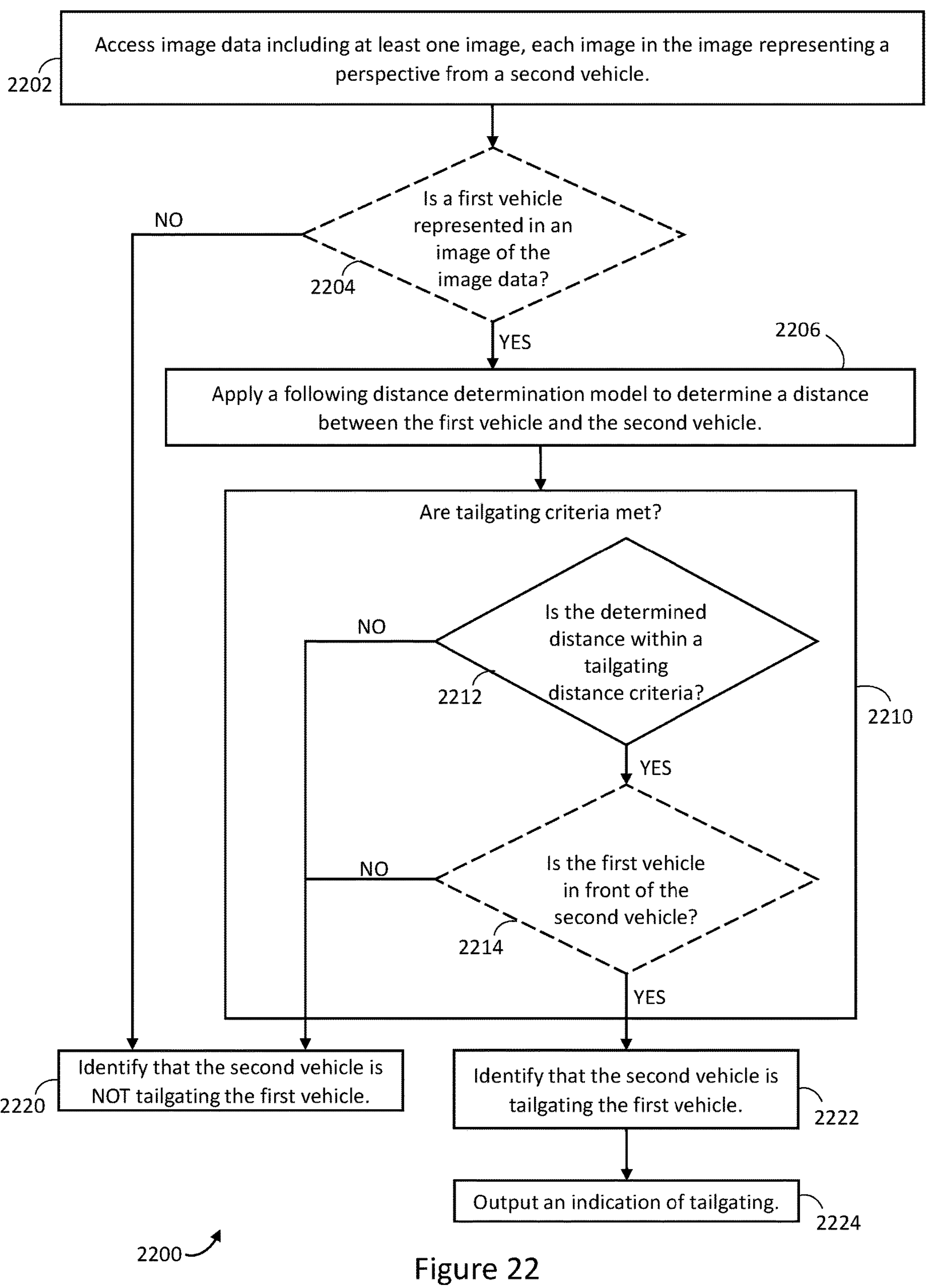
FIG. 22 is a flowchart diagram which illustrates a method for detecting tailgating, in accordance with at least one exemplary implementation.

Once the model is trained, it can be used in detection of tailgating. In this regard, FIG. 22 is a flowchart diagram which illustrates an exemplary method 2200 for detecting tailgating. Method 2200 can be applied to real-world images (images captured by an image sensor) to detect real-world tailgating. Further, method 2200 can also be applied to simulated images (images generated by simulation), for the purposes of testing, validation, training of other models, or any other appropriate application. Method 2200 as illustrated includes acts 2202, 2204, 2206, 2210 (including sub-acts 2212 and 2214), 2220, 2222, and 2224. One skilled in the art will appreciate that additional acts could be added, acts could be removed, or acts could be reordered as appropriate for a given application. As one example, act 2204 is shown in dashed lines to highlight that this act is optional (e.g. identifying whether the first vehicle is represented in the image data may be inherently performed as part of sub-act 2212 later). As another example, sub-act 2214 is shown in dashed lines to highlight that this sub-act is optional (e.g. for single lane roadways). Acts of method 2200 can be performed by appropriate components of the systems or devices discussed earlier, similar to as discussed with reference to method 500 in FIG. 5, and not repeated for brevity. Importantly, a system or device which performs method 2200 is not necessarily the same hardware which generates training data (as in methods 500 and 800 discussed earlier) or the same hardware which trains the model (as in method 2100 discussed earlier). In this way, training data generation, model training, and model execution can be performed by discrete systems or devices most suited to the task. For example, a central server (e.g. any of client device 104, cloud server 106, or local server 118) can perform training data generation and model training, and a device at a vehicle (e.g. image capture device 108A or peripheral device 220) can apply the model based on image data captured at the vehicle. However, in some implementations, a single device or system can perform all of generating training data, training a machine learning model, and applying the machine learning model.

At 2202, image data including at least one image is accessed. Each image in the image data represents a perspective from a second vehicle (which may be following a first vehicle, as is to be determined by method 2200). FIGS. 7, 10A, 10B, 12A, 12B, 14A, 14B, 15A, 15B, 16A, 16B, 16C, 16D, 17A, 17B, 20A, 20B, and 20C discussed earlier show images from the perspective of a second vehicle, which may or may not be travelling behind a first vehicle. While these images are discussed in the context of simulation, the discussion of the nature of the images also applies to real-world images, and what is visually expressed in the Figures is also fully applicable to real world images.

In some implementations, accessing the image data in act 2202 comprises accessing stored image data (e.g. simulated or captured image data which is stored at a non-transitory processor-readable storage medium). In other implementations, accessing the image data in act 2202 comprises capturing the image data (e.g. image data from an image capture device is provided directly to at least one processor which applies the tailgating detection algorithm). In yet other implementations, accessing the image data comprises receiving the image data by a communication interface of the system or device which is performing method 2200 (e.g. from a remote device or datastore).

At 2204, the at least one processor determines whether a first vehicle is represented in an image of the image data. For example, the at least one processor can run a feature or object detection model (such as a YOLO model) to detect vehicles in the image data. If a first vehicle is not represented in an image of the image data, then method 2200 proceeds to act 2220, where the at least one processor determines that the second vehicle is not tailgating the first vehicle (since there is no first vehicle to tailgate). If a first vehicle is detected in the image data at 2204 (or if act 2204 is not performed), method 2200 proceeds to act 2206.

At 2206, the at least one processor applies a following distance determination model to determine a distance between the first vehicle and the second vehicle. The applied model can be any of the models discussed herein, such as a model trained as discussed with reference to FIG. 21. "Applying" a model generally refers to providing the at least one image to the model as input, and received a determined distance between the first vehicle and the second vehicle as output. As mentioned above, in some implementations the model may also be used to determine whether the first vehicle is represented in the image data (at least in a manner which is useful for determining distance between the first vehicle and the second vehicle), in place of act 2204 discussed above. For example, the model can be trained to output a null value (or a value which indicates a distance so great tailgating is not possible), which indicates that the second vehicle is not following the first vehicle to any extent close to tailgating.

At 2210, the at least one processor determines whether tailgating criteria are met. In method 2200 in FIG. 22, two tailgating criteria are discussed with reference to sub-acts 2212 and 2214, though one skilled in the art will appreciate that any number of tailgating criteria could be implemented as appropriate for a given application. Further, both of the tailgating criteria shown in sub-acts 2212 and 2214 are not required; in particular sub-act 2214 is shown in dashed lines to illustrate optionality of this criteria. Further, although FIG. 22 shows sub-act 2212 followed by sub-act 2214, tailgating criteria can be evaluated in any appropriate order.

At 2212, the at least one processor determines whether the distance determined at 2206 is within tailgating distance criteria. That is, the at least one processor determines whether the distance between the first vehicle and the second vehicle is an unsafe distance.

Generally, tailgating distance criteria is dependent on speed of travel of the vehicles. Equation (2) below illustrates an exemplary tailgating threshold distance. For implementations which use tailgating threshold distance as tailgating distance criteria, when a distance between two vehicles is less than the tailgating threshold distance, the tailgating distance criteria is satisfied.

$$D_T = \frac{4\ m * v}{10\ \text{km/h}} \quad (2)$$

In Equation (2), $D_T$ represents tailgating threshold distance, and v represents speed (typically of the second vehicle) in kilometers per hour (km/h). Stated differently, in Equation (2), a safe following distance is approximately four meters for every 10 km/h of speed of the vehicle. In the example, v represents speed of the second vehicle. This is because the speed of the second vehicle is more readily available (e.g. is collected by a telematics monitoring device installed in the second vehicle, or by hardware associated with the image capture device in the second vehicle). Speed of the first vehicle is often more difficult to obtain, because the first vehicle may not be associated with the same telematics system as the second vehicle, and therefore data may not be collected from the first vehicle. However, in some implementations the speed of the first vehicle could be determined relative to the speed of the second vehicle, by determining a difference in distance between the first vehicle and the second vehicle over time. In other implementations, the speed of the first vehicle could be determined by a machine learning model trained to estimate vehicle speed. In yet other implementations, the first vehicle can be part of the same telematics system as the first vehicle, and therefore speed data for the first vehicle may be accessible.

Figure 23:
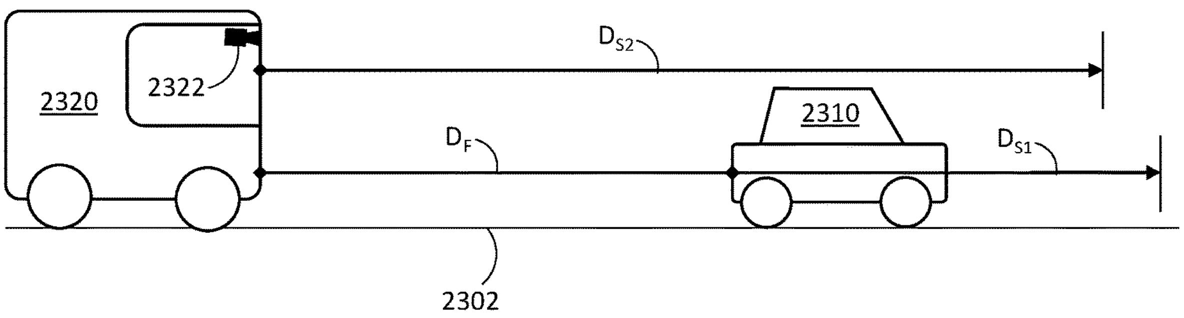
FIG. 23 is a side view of a vehicle being followed by another vehicle, in accordance with at least one exemplary implementation.

Equation (2) above is a generalization. More factors can be taken into account to arrive at a more specific tailgating distance criteria, thus reducing false positive and false negative tailgating determinations. FIG. 23 and Equation (3) discussed below provide an example.

FIG. 23 is a side view of a second vehicle 2320 having image capture device 2322, positioned behind a first vehicle 2310. Both vehicles 2310 and 2320 are travelling in the same direction on ground surface 2302. FIG. 23 shows a following distance $D_F$ between the first vehicle and the second vehicle. FIG. 23 also shows a minimum stopping distance $D_{S1}$ of vehicle 2310 (i.e., in how short a distance is vehicle 2310 capable of stopping) and a maximum stopping distance $D_{S2}$ of vehicle 2320 (i.e., what is the longest distance vehicle 2320 is expected to be able to stop within). $D_{S1}$ is shown as starting from the rear of vehicle 2310, such that $D_{S1}$ represents the point of vehicle 2310 which vehicle 2320 would hit if a collision were to occur. However, $D_{S1}$ can start from any appropriate point of vehicle 2310, where a distance between the rear of vehicle 2310 and the start point of $D_{S1}$ is taken into account in determining tailgating in Equation (3) below. $D_{S1}$ and $D_{S2}$ are discussed in more detail later. In this example, the tailgating criteria for distance is evaluated based on Equation (3) below.

$$\text{Tailgating when: } D_{S2} > (D_F + D_{S1})$$

In Equation (3), if vehicle 2320 is not able to stop within the distance presently between the vehicles, plus the distance for vehicle 2310 to stop, then the following distance $D_F$ is considered as within tailgating distance criteria.

Stopping distances for vehicles (such as $D_{S1}$ and $D_{S2}$ above, collectively $D_S$) can take into account a number of factors, such as vehicle speed, vehicle weight (weight of vehicle itself, possibly including load), road coefficient of friction (e.g. based on weather data indicating good weather, rain, snow, etc.), driver response time (e.g. based on a historical driver profile), or any other appropriate factors.

In the interests of safety, it is generally preferred to bias determination of a stopping distance for a lead vehicle (e.g. vehicle 2310 in FIG. 23) with factors in favor of the vehicle stopping quickly. For example, as it is generally difficult to determine a load weight of a vehicle based on image data, the lead vehicle can be assumed to be unloaded, such that the vehicle weight is estimated only as the weight of the vehicle itself. In this regard, the weight of the vehicle could be determined (or approximated) by identifying the model of the vehicle (or at least class of the vehicle) using a feature or object detection model. As another example, the driver of the lead vehicle may be assumed to have fast reaction times (e.g. above average reaction times), since actual reaction times of the driver of the lead vehicle are likely unknown.

Similarly in the interests of safety, it is generally preferred to bias determination of a stopping distance for a following vehicle (e.g. vehicle 2320 in FIG. 23) with factors in favor of the vehicle stopping slowly. For example, vehicle load can be estimated based on acceleration, vehicle RPM, and actual speed (see for example U.S. Patent Application Nos. 63/279,737; 17/532,209; 17/979,119; 63/413,035; 63/430,514; 63/445,753; and Ser. No. 18/111,951, the entirety of which are incorporated by reference herein); when estimating vehicle load for the purpose of determining stopping distance, this determination can be biased to estimate the vehicle to be heavier than it may actually be. As another example, road coefficient of friction can be assumed to be low if a weather service says that there is a moderate chance of rain, even if water on the road is not explicitly identified based on image data.

Returning to method 2200 in FIG. 22, if the following distance is NOT within a tailgating distance criteria, method 2200 proceeds to act 2220, where the at least one processor identifies that the second vehicle is not tailgating the first vehicle. If the following distance IS within a tailgating distance criteria, and if sub-act 2214 (or any other tailgating criteria) are not included, method 2200 proceeds to act 2222, where the at least one processor identifies that the second vehicle is tailgating the first vehicle. If on the other hand sub-act 2214 is included, then method 2200 proceeds to act 2214, where the at least one processor determines whether the first vehicle is in front of the second vehicle. Examples are discussed below with reference to FIGS. 24A, 24B, and 24C. Although method 2200 in FIG. 22 shows sub-act 2212 before sub-act 2214, the order of these acts can be reverse in alternative implementations. That is, prior to whether determined distance is within tailgating criteria (or even prior to even applying the following distance model in act 2206), the at least one processor can first determine whether the first vehicle is in front of the second vehicle. Alternatively, in some implementations act 2214 can be included inherently in the following distance determination model applied at 2206. As an example, where the model is trained based on a loss function which includes vehicle presence detection (as discussed earlier with reference to Equation (1)), and such vehicle presence detection accounts for vehicle lane of travel (or whether the second vehicle is actually following the first vehicle), distance determination by the model as in act 2206 may only produce meaningful distance determinations for situations where the first vehicle is in front of the second vehicle. In such an implementation, acts 2214 would be redundant, and can be omitted.

Figure 24A:
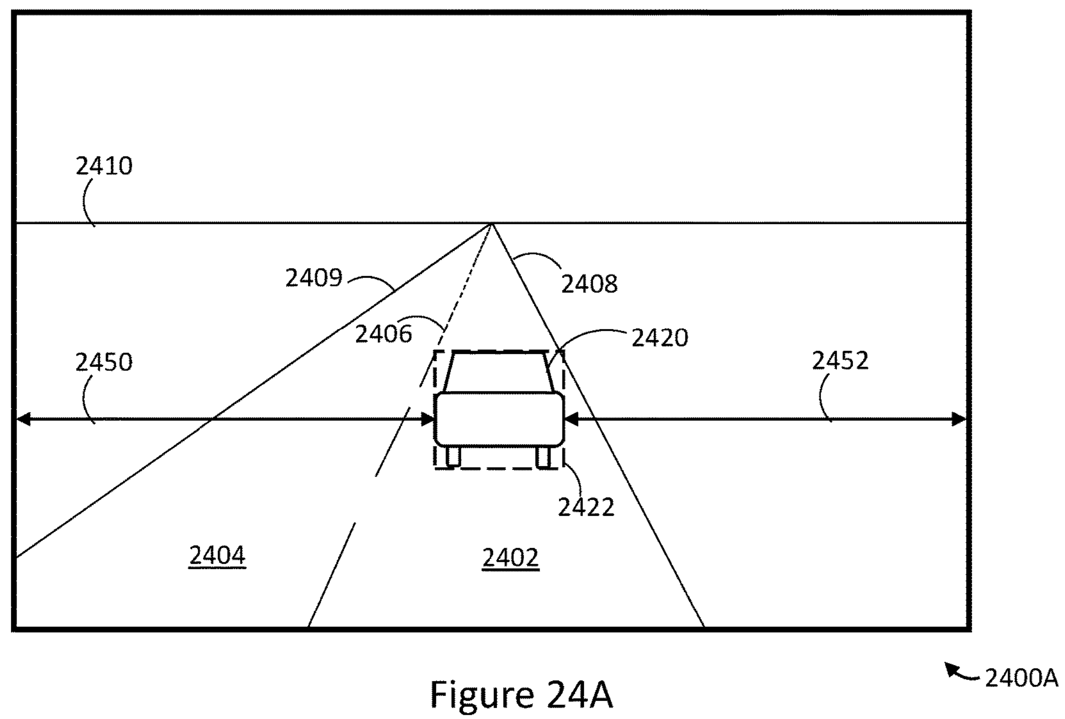
FIGS. 24A, 24B, and 24C illustrate exemplary images for cameras, showing a lead vehicle in different horizontal positions.
Figure 24B:
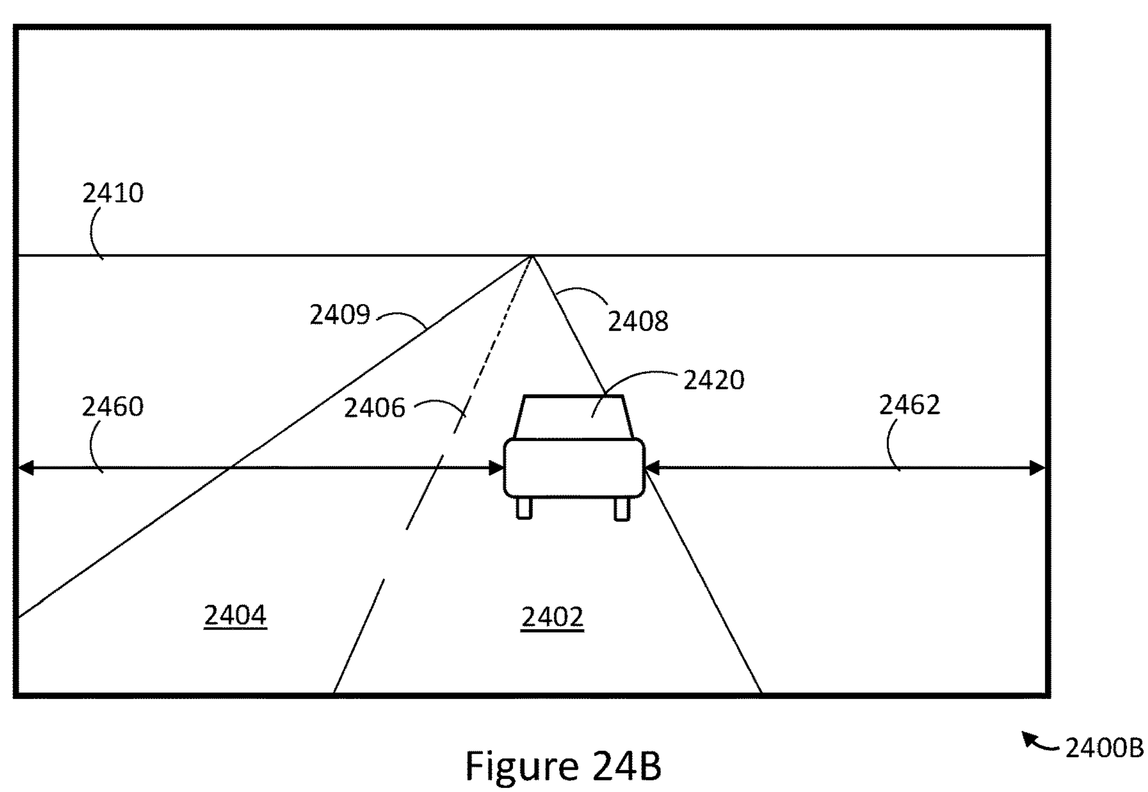
Figure 24C:
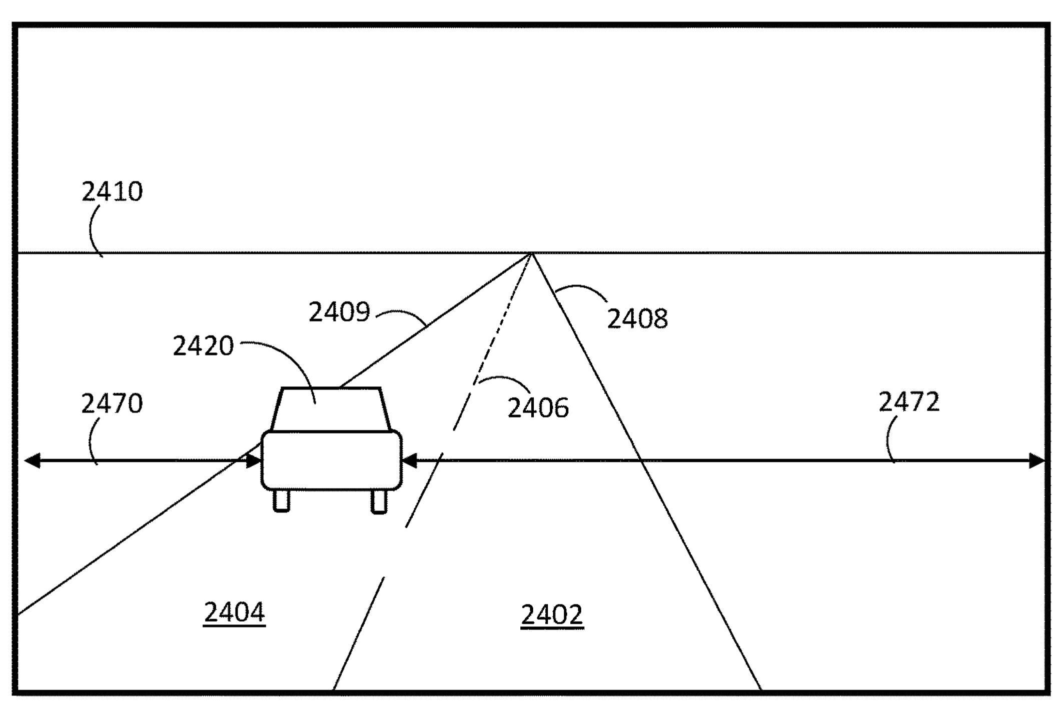

FIGS. 24A, 24B, and 24C each show a vehicle 2420 driving along a roadway shown by edges 2408 and 2409, towards a horizon 2410. The roadway has two lanes 2402 and 2404, separated by dividing line 2406. A vehicle is driving behind vehicle 2420, and has the camera which the perspective of each of images 2400A, 2400B, and 2400C represents.

In accordance with act 2204 of method 2200, vehicle 2420 is identified in images 2400A. In FIG. 24A, bounding box 2422 is shown around vehicle 2420, representing where a feature detection model determines vehicle 2420 as being. Vehicle 2420 can be identified with a similar bounding box in FIGS. 24B and 24C as well, but such a bounding box is not illustrated to reduce clutter.

In one exemplary implementation, a feature detection model is applied to identify road lanes (e.g. based on road edges 2408, 2409, and dividing line 2406). Once lanes are identified, the at least one processor determines a lane of travel of the vehicle carrying the image capture device (in the illustrated example, lane 2402). Vehicles travelling in the same lane as the vehicle with the image capture device are considered to be "in front" of the second vehicle in the context of sub-act 2214 in method 2200. In this exemplary implementation, vehicle 2420 in image 2400A and vehicle 2420 in image 2400B are considered "in front" of the second vehicle, whereas vehicle 2420 in image 2400C is not considered "in front" of the second vehicle.

In another exemplary implementation, distances from the edges of captured images are used to determine whether the lead vehicle (vehicle 2420 in the illustrated example) are travelling "in front" of the second vehicle in the context of method 2200.

In this regard, FIG. 24A shows a left-distance 2450 representing a distance of vehicle 2420 from the left edge of image 2400A. Such a left-distance 2450 can be determined as a distance from the left edge of bounding box 2422 to the left edge of image 2400A. Alternatively, such a left-distance 2450 can be determined as a distance from a feature on the left side of vehicle 2420 to the left edge of image 2400A. FIG. 24A also shows a right-distance 2452 representing a distance of vehicle 2420 from the right edge of image 2400A. Such a right-distance distance 2452 can be determined as a distance from the right edge of bounding box 2422 to the right edge of image 2400A. Alternatively, such a right-distance 2452 can be determined as a distance from a feature on the right side of vehicle 2420 to the right edge of image 2400A. The left-distance and right-distance can be represented, for example, as numbers of pixels in the image data. A difference between the left-distance and the right-distance is determined by the at least one processor (e.g. by subtraction). If the determined distance is within a horizontal distance threshold, the first vehicle (vehicle 2420 in the example) is determined as being in front of the second vehicle in sub-act 2214 in method 2200.

In the example of FIG. 24A, left-distance 2450 and right-distance 2452 are nearly identical, such that a difference therebetween is small (and within the horizontal distance threshold). As a result, in the example of FIG. 24A, vehicle 2420 is determined as being in front of the second vehicle in sub-act 2214 in method 2200, such that (provided the second vehicle is determined to be within a tailgating distance in sub-act 2212) method 2200 proceeds to act 2222, where the at least one processor identifies that the second vehicle is tailgating the first vehicle.

FIG. 24B shows a left-distance 2460 representing a distance of vehicle 2420 from the left edge of image 2400B, and shows a right-distance 2462 representing a distance of vehicle 2420 from the right edge of image 2400B. In this example, vehicle 2420 is positioned further to the right than in FIG. 24A. As a result, left-distance 2460 and right distance 2462 have some difference. However, this difference is relatively small (representing less than half a road lane), such that the difference is within the horizontal distance threshold. As a result, in the example of FIG. 24B, vehicle 2420 is determined as being in front of the second vehicle in sub-act 2214 in method 2200, such that (provided the second vehicle is determined to be within a tailgating distance in sub-act 2212) method 2200 proceeds to act 2222, where the at least one processor identifies that the second vehicle is tailgating the first vehicle.

FIG. 24C shows a left-distance 2470 representing a distance of vehicle 2420 from the left edge of image 2400C, and shows a right-distance 2472 representing a distance of vehicle 2420 from the right edge of image 2400C. In this example, vehicle 2420 is positioned further to the left than in FIGS. 24A and 24B. As a result, left-distance 2470 and right-distance 2472 have a significant difference (representing an entire road lane), such that the difference is outside of the horizontal distance threshold. As a result, in the example of FIG. 24C, vehicle 2420 is determined as NOT being in front of the second vehicle in sub-act 2214 in method 2200. As a result, method 2200 proceeds to act 2220, where the at least one processor identifies that the second vehicle is NOT tailgating the first vehicle.

In some scenarios, the first vehicle driving in front of a second vehicle does not necessarily result in image data where the first car appears horizontally centered in the image data. For example, as discussed above with reference to FIGS. 13A, 13B, 14A, and 14C, a horizontal positioning of an image capture device at the second vehicle results in different perspectives of the first vehicle as represented in captured image data. One way to address this is to install image capture devices to be as close as possible to a horizontal center of vehicles. However, this is not always possible or practical. For example, obstructions may prevent installation of an image capture device near a horizontal center of a vehicle; image capture devices may already be installed away from the horizontal center; or installers may not always install image capture devices in horizontal central location for any number of reasons.

In view of the above, calibration can be performed such that the horizontal distance threshold accounts for non-centered bias of the image data (e.g. due to the image capture device being positioned away from a horizontal center of the second vehicle in the context of method 2200 of FIG. 22). This is discussed below with reference to FIGS. 25A and 25B.

Figure 25A:
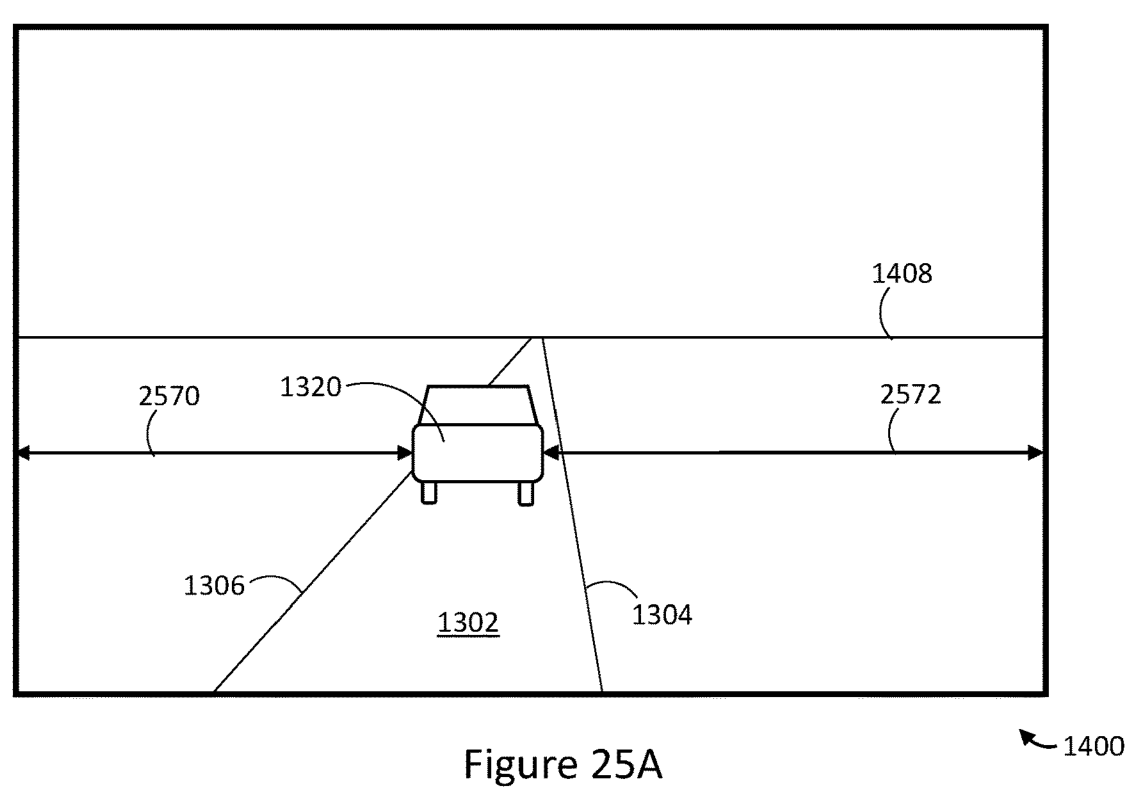
FIGS. 25A and 25B illustrate exemplary images for cameras in the scenarios illustrated in FIGS. 13A and 13B, highlighting horizontal position of a lead vehicle.
Figure 25B:
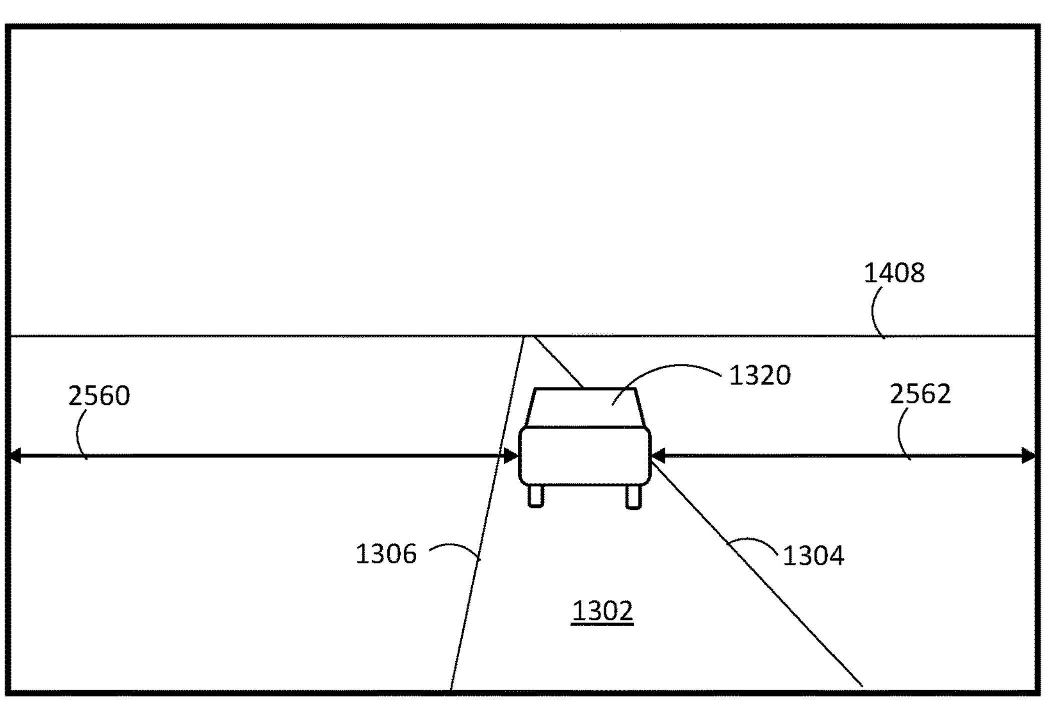

FIGS. 25A and 25B illustrate image data 1400 and 1410, as shown in FIGS. 14A and 14B respectively. The description of FIGS. 14A and 14B is applicable to FIGS. 25A and 25B, and is not repeated for brevity. In addition to what is discussed with reference to FIG. 14A, FIG. 25A also shows a left-distance 2570 from the left edge of image data 1400, and a right-distance 2572 from the right edge of image 1400.

In the case of FIG. 25A, the second vehicle (vehicle 1310 in FIG. 13A) is travelling behind the first vehicle (vehicle 1320), but left-distance 2570 is smaller than right-distance 2572, due to the perspective of image capture device 1314 in FIG. 13A. To address this, for determining whether the first vehicle is in front of the second vehicle at 2214 in method 2200, the system can be calibrated, such that the horizontal distance threshold represents a value around a difference between left-distance 2570 and right-distance 2572. For example, an actual "center" which represents horizontal alignment in front of vehicle 1310 in image data 1400 is a positive value resulting from subtracting left-distance 2570 from right-distance 2572. In this example, the horizontal distance threshold represents a threshold around said positive value. As another example, an actual "center" which represents horizontal alignment in front of vehicle 1310 in image data 1400 is a negative value resulting from subtracting right-distance 2572 from left-distance 2570. In this example, the horizontal distance threshold represents a threshold around said negative value.

In the case of FIG. 25B, the second vehicle (vehicle 1310 in FIG. 13A) is travelling behind the first vehicle (vehicle 1320), but left-distance 2560 is larger than right-distance 2562, due to the perspective of image capture device 1316 in FIG. 13B. To address this, for determining whether the first vehicle is in front of the second vehicle at 2214 in method 2200, the system can be calibrated, such that the horizontal distance threshold represents a value around a difference between left-distance 2560 and right-distance 2562. For example, an actual "center" which represents horizontal alignment in front of vehicle 1310 in image data 1410 is a negative value resulting from subtracting left-distance 2560 from right-distance 2562. In this example, the horizontal distance threshold represents a threshold around said negative value. As another example, an actual "center" which represents horizontal alignment in front of vehicle 1310 in image data 1410 is a positive value resulting from subtracting right-distance 2562 from left-distance 2560. In this example, the horizontal distance threshold represents a threshold around said positive value.

Generally, an optimal horizontal distance threshold is determined as appropriate for a specific application or implementation. This is because different camera hardware, different camera positioning, different vehicle features, or any number of other factors can influence optimal horizontal distance threshold.

Returning to method 2200 in FIG. 22, after the second vehicle is identified as tailgating the first vehicle at 2222, method 2200 proceeds to act 2224. At 2224, an indication of tailgating is output. Such output can take any appropriate form, but some non-limiting examples are discussed below.

Figure 26:
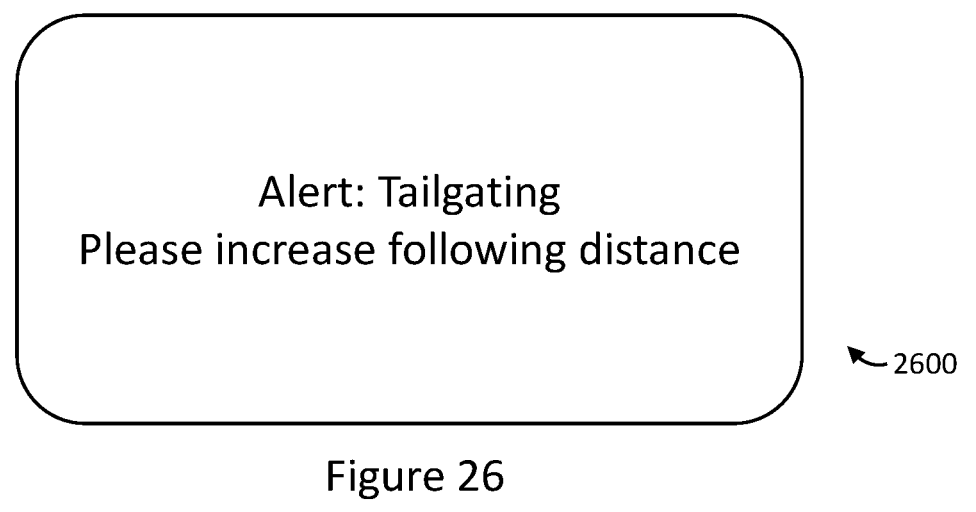

In some implementations, outputting the indication of tailgating comprises outputting an alert to a driver of the second vehicle. Such an alert serves to warn the driver of the dangerous situation, so that the driver can take action to remedy it. In this regard, FIG. 26 illustrates an exemplary user interface 2600 where a visual alert is displayed indicating the tailgating situation. Such a visual user interface could comprise any appropriate display in the second vehicle, such as an infotainment display built into the second vehicle, an accessory device (such as a tablet or smartphone) used by the driver (e.g. for navigation, logging, or vehicle management), a navigation device, or any other display appropriate for a given application. In some implementations, an audio output device can present an audio alert to the driver, such as a statement of the situation, or an alarm sound. In some implementations, multiple forms of alert can be presented in tandem. For example, a visual alert can be displayed as shown in FIG. 26, and an audio alarm can be sounded which prompts the user to look at the visual alert.

In some implementations, outputting the indication of tailgating comprises transmitting an alert, notification, or report of the tailgating situation to a management device (such as any of client device 104, cloud server 106, or local server 118 discussed with reference to FIG. 1A or 1B). Such an alert is useful for evaluating driver performance, providing rewards for safe driving (e.g. for drivers where minimal dangerous situations are reported), and taking disciplinary or training action for unsafe driving (e.g. for drivers where excess dangerous situations are reported). Such reporting does not necessarily need to be in real-time (although it can be), since administrative actions based on driver performance are typically taken some time after any instances of poor driving. Consequently, in some implementations, act 2224 in method 2222 comprises storing an indication or report of tailgating, and later reported any stored indications to a management device together in a scheduled (or requested) report.

Outputting an indication of tailgating as in act 2224 is not limited to outputting a single indication of tailgating. In some implementations, an indication of tailgating can be output to the driver (e.g. as discussed with reference to FIG. 26), and can be output to a management device as discussed above.

While the present invention has been described with respect to the non-limiting embodiments, it is to be understood that the invention is not limited to the disclosed embodiments. Persons skilled in the art understand that the disclosed invention is intended to cover various modifications and equivalent arrangements included within the scope of the appended claims. Thus, the present invention should not be limited by any of the described embodiments.

Throughout this specification and the appended claims, infinitive verb forms are often used, such as "to operate" or "to couple". Unless context dictates otherwise, such infinitive verb forms are used in an open and inclusive manner, such as "to at least operate" or "to at least couple".

The Drawings are not necessarily to scale and may be illustrated by phantom lines, diagrammatic representations, and fragmentary views. In certain instances, details that are not necessary for an understanding of the exemplary embodiments or that render other details difficult to perceive may have been omitted.

The specification includes various implementations in the form of block diagrams, schematics, and flowcharts. A person of skill in the art will appreciate that any function or operation within such block diagrams, schematics, and flowcharts can be implemented by a wide range of hardware, software, firmware, or combination thereof. As non-limiting examples, the various embodiments herein can be implemented in one or more of: application-specific integrated circuits (ASICs), standard integrated circuits (ICs), programmable logic devices (PLDs), field-programmable gate arrays (FPGAs), computer programs executed by any number of computers or processors, programs executed by one or more control units or processor units, firmware, or any combination thereof.

The disclosure includes descriptions of several processors. Said processors can be implemented as any hardware capable of processing data, such as application-specific integrated circuits (ASICs), standard integrated circuits (ICs), programmable logic devices (PLDs), field-programmable gate arrays (FPGAs), logic circuits, or any other appropriate hardware. The disclosure also includes descriptions of several non-transitory processor-readable storage mediums. Said non-transitory processor-readable storage mediums can be implemented as any hardware capable of storing data, such as magnetic drives, flash drives, RAM, or any other appropriate data storage hardware. Further, mention of data or information being stored at a device generally refers to the data information being stored at a non-transitory processor-readable storage medium of said device.

What is claimed is:

1. A method for creating training data for training an artificial intelligence to predict a distance between two vehicles, the method comprising:

for each instance in a first plurality of instances:

accessing respective parameter data, the respective parameter data indicating at least a first position of a first virtual vehicle and a second position of a virtual camera, the first position and the second position specific to the instance, the virtual camera representing a perspective from a second virtual vehicle positioned behind the first virtual vehicle, facing towards the first virtual vehicle;

simulating, by at least one processor in a spatial virtual environment, the first virtual vehicle at the first position and the virtual camera at the second position;

rendering, by the at least one processor based on the spatial virtual environment as simulated, at least one image for the instance from the perspective represented by the virtual camera; and outputting the at least one image for the instance, associated with a label indicative of a distance between the first virtual vehicle and the second virtual vehicle; and storing, by at least one non-transitory processor-readable storage medium, a first plurality of images including each at least one image output for each instance of the plurality of instances associated with the respective label indicating distance between the first virtual vehicle and the second virtual vehicle for the respective instance.

2. The method of claim 1, wherein for each instance in the first plurality of instances:

the respective parameter data further indicates the distance between the first virtual vehicle and the second virtual vehicle; and the label indicative of the distance between the first virtual vehicle and the second virtual vehicle indicates the distance between the first virtual vehicle and the second virtual vehicle as included in the respective parameter data.

3. The method of claim 1, further comprising, for each instance in the first plurality of instances:

determining, by the at least one processor, the distance between the first virtual vehicle and the second virtual vehicle by determining a difference between the first position and the second position.

4. The method of claim 1, wherein for each instance in the first plurality of instances, accessing the respective parameter data comprises receiving the respective parameter data as user input via a user input device.

5. The method of claim 1, wherein for each instance in the first plurality of instances, accessing the respective parameter data comprises autonomously generating, by the at least one processor, the respective parameter data.

6. The method of claim 1 wherein, for each instance in the first plurality of instances, outputting the at least one image for the instance comprises outputting the at least one image for the instance associated with a distance label indicative of a distance between the first virtual vehicle and the second virtual vehicle and associated with a vehicle presence label indicative of whether the first virtual vehicle is within a vehicle presence threshold of the second virtual vehicle.

7. The method of claim 6, further comprising, for each instance in the first plurality of instances:

generating, by the at least one processor, the vehicle presence label indicative of whether the first virtual vehicle is within a vehicle presence threshold of the second virtual vehicle, based on relative positions of the first virtual vehicle and the second virtual vehicle.

8. The method of claim 1, wherein for each instance in the first plurality of instances:

the respective parameter data further indicates a resolution for the virtual camera; and rendering, by the at least one processor based on the spatial virtual environment as simulated, at least one image for the instance from the perspective represented by the virtual camera comprises rendering the at least one image for the instance at the resolution for the virtual camera.

9. The method of claim 1, wherein for each instance in the first plurality of instances, the respective parameter data further indicates at least one parameter selected from a group of parameters consisting of:

type of the first virtual vehicle;

type of the second virtual vehicle;

dimensions of the first virtual vehicle;

dimensions of the second virtual vehicle;

properties of the first virtual vehicle;

properties of the second virtual vehicle;

position and orientation of the virtual camera relative to the second virtual vehicle;

lens attributes of the virtual camera;

weather conditions;

lighting conditions;

time of day; and date.

10. The method of claim 1, further comprising:

selecting a subset of instances from the first plurality of instances;

for each instance in the subset of instances:

autonomously applying a distortion effect to the at least one image output for the instance.

11. The method of claim 10, wherein the distortion effect includes at least one distortion effect selected from a group of distortion effects comprising:

image compression loss;

pixel value distribution;

adversarial effect;

image noise;

image saturation; and image blur.

12. The method of claim 1, further comprising:

selecting a subset of instances from the first plurality of instances;

for each instance in the subset of instances:

autonomously applying an environmental effect to the at least one image output for the instance.

13. The method of claim 12, wherein the environmental effect includes at least one environmental effect selected from a group of environmental effects comprising:

rain;

snow; and fog.

14. The method of claim 1, wherein for each instance in the first plurality of instances, rendering, by the at least one processor based on the spatial virtual environment as simulated, at least one image for the instance from the perspective represented by the virtual camera comprises:

rendering, by the at least one processor based on the spatial virtual environment, a single image for the instance from the perspective represented by the virtual camera.

15. The method of claim 1, wherein for each instance in the first plurality of instances, rendering, by the at least one processor based on the spatial virtual environment, at least one image for the instance from the perspective represented by the virtual camera comprises:

rendering, by the at least one processor based on the spatial virtual environment, a plurality of images for the instance from the perspective represented by the virtual camera, each image of the plurality of images for the instance representing a respective moment in time.

16. The method of claim 15, wherein for each instance in the first plurality of instances, simulating, by the at least one processor in the spatial virtual environment, the first virtual vehicle at the first position and the virtual camera at the second position comprises:

simulating, by the at least one processor in the spatial virtual environment, movement of the first virtual vehicle and movement of the virtual camera over each respective moment in time represented by the plurality of images for the instance.

17. The method of claim 1, wherein for each instance in the first plurality of instances, the first position of the first virtual vehicle indicates a longitudinal position and lateral position of the first virtual vehicle.

18. The method of claim 1, wherein for each instance in the first plurality of instances, the second position of the virtual camera indicates a longitudinal position and a lateral position of the virtual camera within a road lane and a height of the virtual camera.

19. A method for creating training data for training an artificial intelligence to predict a distance between two vehicles, the method comprising:

for each instance in a first plurality of instances:

accessing respective parameter data, the respective parameter data indicating at least a first position of a first vehicle and a second position of a virtual camera, the first position and the second position specific to the instance, the virtual camera representing a perspective from a second vehicle positioned behind the first vehicle, facing towards the first vehicle;

simulating, by at least one processor in a virtual environment, the first vehicle at the first position and the virtual camera at the second position;

rendering, by the at least one processor in the virtual environment, at least one image for the instance from the perspective represented by the virtual camera; and outputting the at least one image for the instance, associated with a label indicative of a distance between the first vehicle and the second vehicle;

storing, by at least one non-transitory processor-readable storage medium, a first plurality of images including each at least one image output for each instance of the plurality of instances associated with the respective label indicating distance between the first vehicle and the second vehicle for the respective instance;

for each instance in a second plurality of instances:

accessing respective parameter data, the respective parameter data indicating at least a third position of a virtual camera representing a perspective from a third vehicle;

simulating, by the at least one processor in the virtual environment, the virtual camera at the third position;

rendering, by the at least one processor in the virtual environment, at least one image for the instance from a perspective represented by the virtual camera at the third position; and outputting the at least one image for the instance, associated with a label indicative of a distance between two vehicles which is a null value; and storing, by the at least one non-transitory processor-readable storage medium, a second plurality of images including each at least one image output for each instance of the second plurality of instances associated with the respective label indicating a distance between two vehicles which is a null value.

20. A method for creating training data for training an artificial intelligence to predict a distance between two vehicles, the method comprising:

for each instance in a first plurality of instances:

accessing respective parameter data, the respective parameter data indicating at least a first position of a first vehicle and a second position of a virtual camera, the first position and the second position specific to the instance, the virtual camera representing a perspective from a second vehicle positioned behind the first vehicle, facing towards the first vehicle;

simulating, by at least one processor in a virtual environment, the first vehicle at the first position and the virtual camera at the second position;

rendering, by the at least one processor in the virtual environment, at least one image for the instance from the perspective represented by the virtual camera; and outputting the at least one image for the instance, associated with a label indicative of a distance between the first vehicle and the second vehicle; and storing, by at least one non-transitory processor-readable storage medium, a first plurality of images including each at least one image output for each instance of the plurality of instances associated with the respective label indicating distance between the first vehicle and the second vehicle for the respective instance;

wherein for each instance in the first plurality of instances, accessing the respective parameter data comprises autonomously generating, by the at least one processor, the respective parameter data; and wherein for each instance in the first plurality of instances, autonomously generating the respective parameter data comprises: autonomously determining random values for the first position and the second position, within a defined distance threshold.

* * * * *